US011856142B2

(12) United States Patent
Moller et al.

(10) Patent No.: US 11,856,142 B2
(45) Date of Patent: Dec. 26, 2023

(54) ADAPTIVE CLOUD CONVERSATION ECOSYSTEM

(71) Applicant: Virtual Hold Technology Solutions, LLC, Akron, OH (US)

(72) Inventors: Matthew Donaldson Moller, Petaluma, CA (US); Matthew DiMaria, Brentwood, TN (US); Shannon Lekas, Cushing, TX (US)

(73) Assignee: Virtual Hold Technology Solutions, LLC, Akron, OH (US)

( * ) Notice: Subject to any disclaimer, the term of this patent is extended or adjusted under 35 U.S.C. 154(b) by 32 days.

(21) Appl. No.: 17/895,955

(22) Filed: Aug. 25, 2022

(65) Prior Publication Data

US 2023/0056573 A1   Feb. 23, 2023

Related U.S. Application Data

(63) Continuation-in-part of application No. 17/895,651, filed on Aug. 25, 2022, which is a continuation-in-part of application No. 17/895,573, filed on Aug. 25, 2022, which is a continuation of application No. 17/893,006, filed on Aug. 22, 2022, now Pat. No. 11,611,658, which is a continuation-in-part of application No. 17/358,331, filed on Jun. 25, 2021, now Pat. No. 11,546,472, which is a continuation-in-part of application No. 17/336,405, filed on Jun. 2, 2021, now Pat. No. 11,522,997, said application No. 17/893,006 is a continuation-in-part of application No. 17/235,408, filed on Apr. 20, 2021, now Pat. No. 11,489,964, said application No. 17/336,405 is a continuation of (Continued)

(51) Int. Cl.
*H04M 3/523* (2006.01)
*H04L 67/306* (2022.01)
*H04M 3/51* (2006.01)

(52) U.S. Cl.
CPC ........ *H04M 3/5231* (2013.01); *H04L 67/306* (2013.01); *H04M 3/5183* (2013.01)

(58) Field of Classification Search
CPC ............ H04M 3/5231; H04M 3/5183; H04M 2203/2072; H04L 67/306
USPC ............ 379/265.02, 265.01, 265.05, 265.11, 379/265.13, 210.01, 266.01
See application file for complete search history.

(56) References Cited

U.S. PATENT DOCUMENTS 10,051,011 B2    8/2018   Boerjesson et al.
2006/0256949 A1  11/2006  Noble, Jr.
2017/0331946 A1* 11/2017  Mumick ............... H04M 15/08

* cited by examiner

*Primary Examiner* — Thjuan K Addy

(57) ABSTRACT

An adaptive cloud conversation ecosystem that expands on the capabilities of an adaptive cloud conversation platform by allowing for integration of conversations across brands with a single consumer account and incorporation of edge computing data from multiple consumer devices into brand and consumer decision-making. The core of the ecosystem is an adaptive cloud conversation platform capable of making automated decisions regarding when and how to establish on-going communications with consumers so as to maximize the relationship between the consumer and a given brand. Adaptive ecosystem applications expand on the capabilities of platform by providing context-specific utilities that are compatible with platform and therefore capable of applying the adaptive conversation platform's capabilities to a variety of subject matters.

12 Claims, 35 Drawing Sheets

Related U.S. Application Data application No. 17/011,248, filed on Sep. 3, 2020, now Pat. No. 11,032,424, which is a continuation-in-part of application No. 16/995,424, filed on Aug. 17, 2020, now abandoned, which is a continuation-in-part of application No. 16/896,108, filed on Jun. 8, 2020, now abandoned, which is a continuation-in-part of application No. 16/836,798, filed on Mar. 31, 2020, now Pat. No. 10,992,811, said application No. 17/235,408 is a continuation of application No. 16/836,798, filed on Mar. 31, 2020, now Pat. No. 10,992,811, said application No. 17/358,331 is a continuation-in-part of application No. 16/591,096, filed on Oct. 2, 2019, now Pat. No. 11,431,847, said application No. 16/836,798 is a continuation of application No. 16/542,577, filed on Aug. 16, 2019, now Pat. No. 10,609,218, said application No. 16/896,108 is a continuation-in-part of application No. 16/152,403, filed on Oct. 4, 2018, now abandoned, which is a continuation-in-part of application No. 16/058,044, filed on Aug. 8, 2018, now Pat. No. 11,012,568, said application No. 16/591,096 is a continuation of application No. 15/411,534, filed on Jan. 20, 2017, now Pat. No. 10,455,090, said application No. 16/058,044 is a continuation-in-part of application No. 14/532,001, filed on Nov. 4, 2014, now Pat. No. 10,375,245, which is a continuation-in-part of application No. 13/659,902, filed on Oct. 24, 2012, now Pat. No. 8,938,221, which is a continuation-in-part of application No. 13/479,870, filed on May 24, 2012, now Pat. No. 9,055,149, and a continuation-in-part of application No. 13/446,758, filed on Apr. 13, 2012, now Pat. No. 8,792,866, which is a continuation of application No. 12/320,517, filed on Jan. 28, 2009, now Pat. No. 8,213,911, said application No. 13/479,870 is a continuation-in-part of application No. 12/320,517, filed on Jan. 28, 2009, now Pat. No. 8,213,911.

(60) Provisional application No. 62/858,454, filed on Jun. 7, 2019, provisional application No. 62/820,190, filed on Mar. 18, 2019, provisional application No. 62/291,049, filed on Feb. 4, 2016.

Machine Learning Algorithm Training and Operation for Consumer Context Analysis

Machine Learning Algorithm Training and Operation for Callback Planning

Machine Learning Algorithm Training and Operation for Event Context Analysis

Callback Use Case Examples

Standard Callback

Proactive Callback

Media-Switching Callback

Consumer Event-Based Callback

Rule-Based Callback

Machine Learning Algorithm Training and Operation for Survey Context Analysis

Behavioral Pairing AI Training and Operation

ADAPTIVE CLOUD CONVERSATION ECOSYSTEM

CROSS-REFERENCE TO RELATED APPLICATIONS

Priority is claimed in the application data sheet to the following patents or patent applications, the entire written description of each of which is expressly incorporated herein by reference in its entirety:
Ser. No. 17/895,651
Ser. No. 17/895,573
Ser. No. 17/893,006
Ser. No. 17/235,408
Ser. No. 17/358,331
Ser. No. 16/836,798
Ser. No. 16/591,096
Ser. No. 17/336,405
Ser. No. 17/011,248
Ser. No. 16/995,424
Ser. No. 16/896,108
Ser. No. 16/542,577
62/820,190
62/858,454
Ser. No. 16/152,403
Ser. No. 16/058,044
Ser. No. 14/532,001
Ser. No. 13/659,902
Ser. No. 13/479,870
Ser. No. 12/320,517
Ser. No. 13/446,758
Ser. No. 15/411,534
62/291,049

BACKGROUND OF THE INVENTION

Field of the Art

The disclosure relates to the field of contact center technology, specifically to the field of cloud-implemented automated callback systems.

Discussion of the State of the Art

While various types of callback scheduling systems exist, they are limited to basic scheduling functions such as queuing for callbacks by the next available agent or callbacks based on consumer indications of appropriate callback times. These systems can keep track of repeated interactions with consumers either by identifying the consumer's phone number or account, or by assigning repeated interactions to ticket numbers specific to a particular reason for the interaction. However, other than tracking these repeated interactions so that agents can see the history of interactions, these systems do not account for the complexity of on-going conversations with consumers and have no ability to determine when and how to establish further communications with consumers so as to maximize the relationship between the consumer and a given brand.

Further, existing systems are not integrated into an ecosystem that allows for integration of conversations across brands with a single account or for application of the ecosystem's capabilities across a variety of subject matters.

What is needed is an adaptive cloud conversation ecosystem that expands on the capabilities of an adaptive cloud conversation platform by allowing for integration of conversations across an adaptive cloud conversation ecosystem combined with a set of adaptive ecosystem applications that expand on the capabilities of platform by providing context-specific utilities that are compatible with platform and therefore capable of applying the adaptive conversation platform's capabilities to a variety of subject matters.

SUMMARY OF THE INVENTION

Accordingly, the inventor has conceived and reduced to practice, an adaptive cloud conversation ecosystem that expands on the capabilities of an adaptive cloud conversation platform by allowing for integration of conversations across brands with a single consumer account and incorporation of edge computing data from multiple consumer devices into brand and consumer decision-making. The core of the ecosystem is an adaptive cloud conversation platform capable of making automated decisions regarding when and how to establish on-going communications with consumers so as to maximize the relationship between the consumer and a given brand. Adaptive ecosystem applications expand on the capabilities of platform by providing context-specific utilities that are compatible with platform and therefore capable of applying the adaptive conversation platform's capabilities to a variety of subject matters.

According to a preferred embodiment, an adaptive cloud conversation platform is disclosed, comprising: an adaptive platform client application operating on a first computing device comprising a first memory and a first processor, the adaptive platform client application configured to cause the first computing device to: receive input regarding a subject matter; retrieve a first consumer profile for a consumer operating the first computing device from a local consumer profile database stored on the first computing device, the first consumer profile comprising a consumer identifier and one or more attributes of the consumer; compare the input to the one or more attributes to determine whether a conversation should be initiated with a brand; and where the determination is that a conversation should be initiated, send a request for initiation of a conversation to the conversation manager, the request comprising the consumer identifier and the subject matter; a second computing device comprising a second memory, a second processor, and a non-volatile data storage device; a cloud consumer profile database stored on the non-volatile data storage device, the cloud consumer profile database comprising a plurality of consumer profiles, each comprising a plurality of consumer data and a plurality of consumer contact preferences pertaining to a specific consumer; a brand database stored on the non-volatile data storage device, the brand database comprising brand information comprising product information, service information, or both, for a plurality of brands and one or more contact channels for each brand; the conversation manager comprising a first plurality of programming instructions stored in the second memory which, when operating on the second processor, causes the second computing device to: receive the request for initiation of the conversation from the adaptive ecosystem application; using the consumer identifier, retrieve a second consumer profile for the consumer from the cloud consumer profile database, the second consumer profile comprising a plurality of consumer data about the consumer and a plurality of consumer contact preferences for the consumer; retrieve brand information for a plurality of brands from the brand database; process the consumer data of the second consumer profile, the subject matter, and the brand information through a first machine learning algorithm to obtain a brand recommendation for initiating a conversation with the consumer; process the consumer contact preferences of the consumer profile and the contact channels of the brand information through a second machine learning algorithm to obtain a recommended callback time and a recommended callback channel for a callback from the brand to the consumer about the subject matter; schedule the callback from the brand to the consumer about the subject matter at the callback time through the callback channel; and send the scheduled callback to a callback manager for implementation; the callback manager comprising a second plurality of programming instructions stored in the first memory which, when operating on the first processor, causes the first computing device to: receive the callback schedule; and execute the callback schedule by establishing communications between the brand and the consumer at the selected time through the selected channel as indicated in the callback schedule.

According to a preferred embodiment, a method for operating an adaptive cloud conversation platform is disclosed, comprising the steps of: using an adaptive platform client application operating on a first computing device to: receive input regarding a subject matter; retrieve a first consumer profile for a consumer operating the first computing device from a local consumer profile database stored on the first computing device, the first consumer profile comprising a consumer identifier and one or more attributes of the consumer; compare the input to the one or more attributes to determine whether a conversation should be initiated with a brand; and where the determination is that a conversation should be initiated, send a request for initiation of a conversation to a conversation manager operating on a second computing device, the request comprising the consumer identifier and the subject matter; using the conversation manager to: receive the request for initiation of the conversation from the adaptive ecosystem application; using the consumer identifier, retrieve a second consumer profile for the consumer from a cloud consumer profile database stored on the second computing device, the cloud consumer profile database comprising a plurality of consumer profiles, each comprising a plurality of consumer data and a plurality of consumer contact preferences pertaining to a specific consumer, and the second consumer profile comprising a plurality of consumer data about the consumer and a plurality of consumer contact preferences for the consumer; retrieve brand information for a plurality of brands from a brand database stored on the second computing device, the brand database comprising brand information comprising product information, service information, or both, for a plurality of brands and one or more contact channels for each brand; process the consumer data of the second consumer profile, the subject matter, and the brand information through a first machine learning algorithm to obtain a brand recommendation for initiating a conversation with the consumer; process the consumer contact preferences of the consumer profile and the contact channels of the brand information through a second machine learning algorithm to obtain a recommended callback time and a recommended callback channel for a callback from the brand to the consumer about the subject matter; schedule the callback from the brand to the consumer about the subject matter at the callback time through the callback channel; and send the scheduled callback to a callback manager operating on the second computing device for implementation; using the callback manager to: receive the callback schedule; and execute the callback schedule by establishing communications between the brand and the consumer at the selected time through the selected channel as indicated in the callback schedule.

According to an aspect of an embodiment, the adaptive platform application is downloaded to the first computing device from a set of applications stored in and compatible with the platform, each application of the set of applications having a different subject matter.

According to an aspect of an embodiment, the adaptive platform application comprises concierge functionality configured to: monitor the consumer's usage of other applications on the first computing device; identify a common theme of the consumer's usage; and include the common theme in the subject matter of the request.

According to an aspect of an embodiment, the adaptive platform application comprises health functionality configured to: receive biometric data for the consumer; detect an anomaly suggesting a possible health problem by comparing the biometric data to the one or more attributes in the first consumer profile; and include the anomaly in the subject matter of the request.

According to an aspect of an embodiment, the adaptive platform application comprises real estate functionality configured to: determine a location of the first consumer device; suggest real estate properties nearby the location that match the one or more attributes in the first consumer profile; and include the suggested nearby real estate properties in the subject matter of the request.

According to an aspect of an embodiment, the adaptive platform application comprises brand-specific functionality configured to: provide information about a brand-specific product or service; receive an interaction from the consumer indicating interest in the brand-specific product or service; and include the brand-specific product or service and the consumer's interest in the subject matter of the request.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
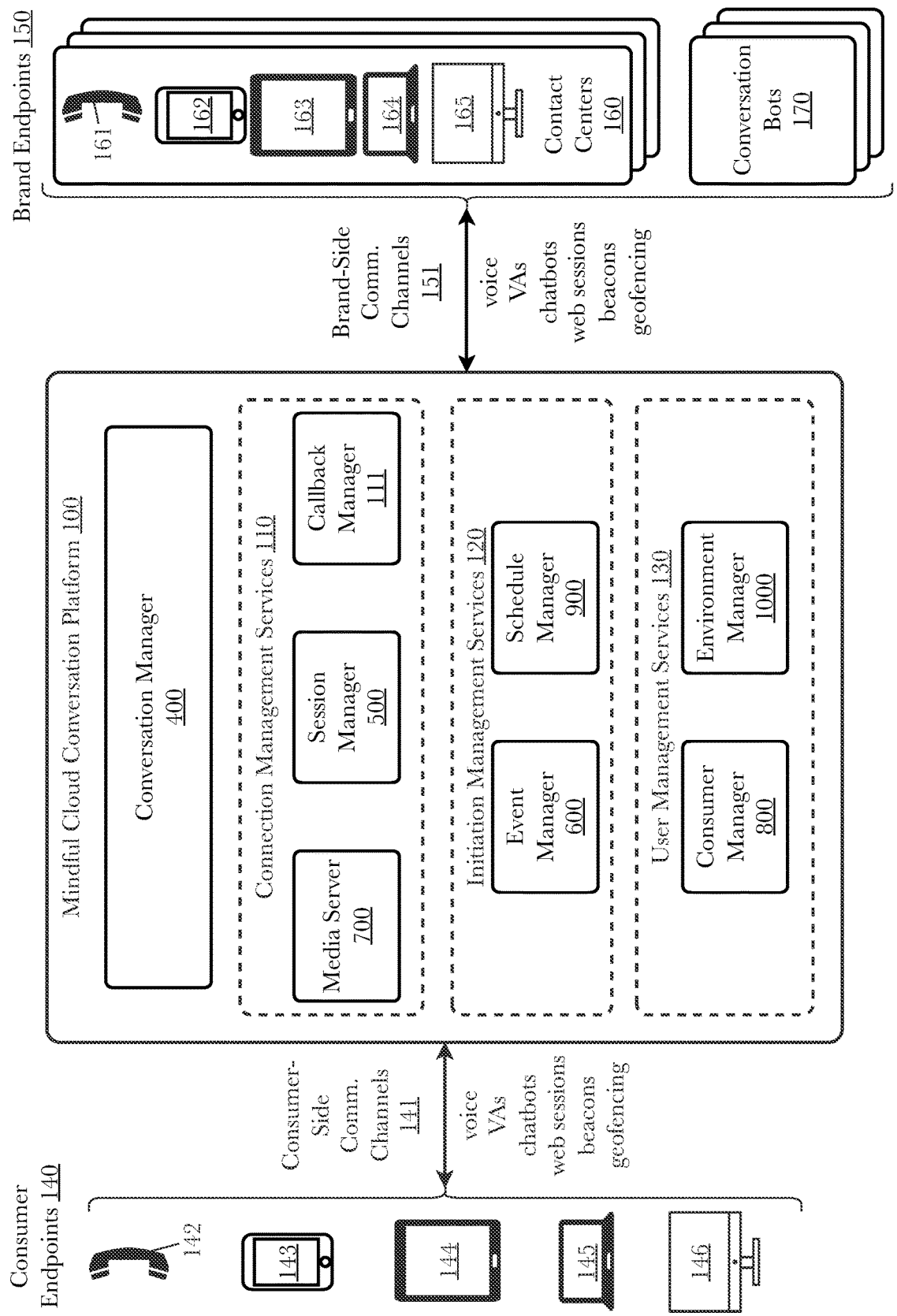
FIG. 1 is a block diagram illustrating an exemplary system architecture for an adaptive cloud conversation platform connected to brand endpoints comprising contact centers.

The inventor has conceived, and reduced to practice, an adaptive cloud conversation ecosystem that expands on the capabilities of an adaptive cloud conversation platform by allowing for integration of conversations across brands with a single consumer account and incorporation of edge computing data from multiple consumer devices into brand and consumer decision-making. The core of the ecosystem is an adaptive cloud conversation platform capable of making automated decisions regarding when and how to establish on-going communications with consumers so as to maximize the relationship between the consumer and a given brand. Adaptive ecosystem applications expand on the capabilities of platform by providing context-specific utilities that are compatible with platform and therefore capable of applying the adaptive conversation platform's capabilities to a variety of subject matters.

The platform is made adaptive through the use of one or more machine learning algorithms, each trained to analyze data pertaining to a particular set of aspects of a conversation and make recommendations within the context of those aspects. In certain embodiments, each machine learning algorithm is part of one or more platform components, and configured as a context manager for that component, receiving data pertaining to the particular set of aspects of a conversation for which that component is designed, and making recommendations within the context of that component. For example, a session manager component may have a machine learning algorithm which receives a real-time transcript of an on-going audio conversation between a consumer and agent, and which proposes responses for the agent based on current consumer statements, history of interactions with the consumer, consumer stored preferences, databases of similar conversations with other consumers, etc. The outputs of the machine learning algorithm of one components may be used an inputs to a machine learning algorithm of another component, creating a network of machine learning algorithms. In this way, the system adapts to conversations by listening to current conversations, learning from the current conversation and past conversations, changing its operation in response to changes in context or conditions, and adapting to new situations through the inherent predictive capabilities of machine learning algorithms. On shorter time scales, the platform adapts in response to incoming data by recommending proactive conversation actions such as a current conversation or recent interactions. On a longer time scale, the platform adapts (or evolves) by gradually incorporating newer information into its machine learning algorithms by periodic or continuous re-training based on the newer information. The platform thus become smarter over time about conversations in general and about conversations with specific consumers in particular. These adaptations over short and long time scales about how to call, who to call, and when to call allow the platform to be "mindful" of context and circumstances from the largest scales (all consumers across all brands or large groups/representative averages, etc.), through mid-sized scales (certain types or groups of consumers across brands, consumers for certain brands, certain types of conversations with a certain consumer, etc.), to the smallest scales (a current conversation with a certain consumer, etc.). This "mindfulness" provides a level of personalization and authenticity lacking in existing customer relationship management systems, and enables consumers to get the help they need from the brands they love on the terms they choose.

Callback scheduling has traditionally been performed on a queuing system which pairs agents with consumers on a first come, first served basis. However, while this can be a time-efficient method of pairing, it is considerably sub-optimal in terms of consumer satisfaction. Consumers are simply paired with the next available agent, regardless of the agent's compatibility with the consumer in terms of attributes such as demeanor, typical vocabulary used, the level of knowledge and/or expertise of the consumer and agent regarding the brand's products and services, the language(s) spoken by the consumer and agent, personality traits such as extroversion or introversion, tone of voice, loudness of voice, and other such issues. An adaptive cloud conversation platform that incorporates a machine-learning-based behavioral analysis will facilitate pairing of agents with consumers such that the agent and consumer are compatible with one another in terms of personality and behaviors, substantially improving consumer satisfaction with the conversation and/or callback. Further, consumers prefer to have control over the circumstances of their conversations including, but not limited to, choice of agents, choice of communication channels, and choice of days and times of communication. Thus, including negotiation of such circumstances in the consumer conversation will result in better overall consumer experience (CX) and/or transaction experience (TX).

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Callback" as used herein refers to contact by a brand to a consumer after some interaction or attempted interaction between the consumer and the brand. The term callback is not limited to telephone communications, and includes any form of communication whether in person or via electronic means such as, but not limited to, phone, voice-over-Internet-protocol (VOIP), email, short message service (SMS), and online messaging platforms.

"Consumer" as used herein means a potential buyer or consumer of products and/or services. A consumer may be a person, group of persons, or a legal entity such as a company.

"Conversation" as used herein means a series of communications between at least one brand and at least one consumer. A conversation may comprise many sessions, may use many different forms of communication (e.g., phone, email, SMS), and may span long periods of time. In some cases, conversations may be grouped into themes (e.g., a "ticket" related to a problem as used in some technical service systems), but the term conversation as used herein is not so limited and may span any number of themes. A conversation involves communication between at least one consumer and one brand, but is not limited to communications between single brand and a single consumer, and may involve other brands or third parties, as well. For example, in a real estate transaction, a conversation may involve two consumers (a buyer and a seller), as well as multiple brands (the seller's agent or broker, the buyer's agent or broker, a lender, a title company, an escrow company, etc.).

"Session" as used herein means a single communication between at least one brand and at least one consumer. A session involves communication between at least one consumer and one brand, but is not limited to communications between single brand and a single consumer, and may involve other brands or third parties, as well. For example, in a real estate transaction, a session may involve two consumers (a buyer and a seller), as well as multiple brands (the seller's agent or broker, the buyer's agent or broker, a lender, a title company, an escrow company, etc.).

Conceptual Architecture

FIG. 1 is a block diagram illustrating an exemplary system architecture for an adaptive cloud conversation platform connected to brand endpoints comprising contact centers. The adaptive cloud conversation platform (ACCP) 100 is designed to provide automated, machine-learning-algorithm-supported complex conversation support to brands to establish, enhance, and maintain relationships with their consumers. Its capabilities exceed those of traditional callback systems or customer relationship management systems in that it is designed not just to keep records of past interactions between a given brand and a given consumer and schedule callbacks from the brand to the consumer, but to manage the entirety of complex conversations that may occur between consumers and brands, including conversations involving multiple consumers and multiple brands.

The adaptive cloud conversation platform 100, therefore, manages complex conversations, possibly over an extended period of time, between one or more brand endpoints 150 of a brand and one or more consumer endpoints 140 of a consumer or consumers. The consumer endpoints 140 may be any device used by a consumer for communications including, but not limited to plain old telephone service (POTS) 142, mobile phones or smartphones 143, tablet computers 144, laptop computers 145, and desktop computers 146. While not shown here, in-person communications (without devices) is also considered to be a consumer endpoint 140 (e.g., in some cases, the adaptive cloud conversation platform 100 may recommend in-person communications for certain sessions). Consumer-side communication channels 141 between the consumer endpoints 140 and the adaptive cloud conversation platform 100 may be established or triggered through any means supported by the consumer endpoints 140 including, but not limited to, voice, virtual assistants (VAs), chatbots, web sessions, electronic beacons placed in physical locations such as store displays, and geofenced triggers.

The brand endpoints 140 may be any device used by a consumer for communications including, but not limited to plain old telephone service (POTS) 161, mobile phones or smartphones 162, tablet computers 163, laptop computers 164, and desktop computers 165. While not shown here, in-person communications (without devices) is also considered to be a brand endpoint 140 (e.g., in some cases, the adaptive cloud conversation platform 100 may receive data from an in-person purchase at a brand-owned store). In this embodiment, the brand endpoints 150 are located at a contact center 160 which handles consumer relations for the brand, either as a brand-owned contact center or a third party contact center service. Further, the brand endpoints in some cases may be conversation bots 170 (also known as chatbots or interactive voice response (IVR) systems) instead of human agents. Brand-side communication channels 151 between the brand endpoints 150 and the adaptive cloud conversation platform 100 may be established or triggered through any means supported by the brand endpoints 150 including, but not limited to, voice, virtual assistants (VAs), chatbots, web sessions, electronic beacons placed in physical locations such as store displays, and geofenced triggers.

In this embodiment, the system can be conceived of as comprising a conversation manager 400, a connection management services layer 110, an initiation management services layer 120, and a user management services layer 130. However, certain components within each of these layers may perform some aspects of other layers, so there can be cross-over between layers in some cases. Further, in other embodiments, the functionalities of certain components described herein may be performed by other components, depending on platform configuration.

The conversation manager 400 is the component that determines the scope of each conversation and manages overall communications between the components at each layer accordingly, although data may still be passed directly from component to component. The connection management services layer 110 generally determines what communications should be established and how they should be established (often referred to herein as a "mode" of communications). The connection management services layer 110 comprises a media server 700 which establishes communications between consumer endpoints 140 and brand endpoints 150 and performs any necessary media translations (e.g., automated speech recognition, text to speech, etc.), a session manager 500 which assigns session identifiers, instructs the media server 700 to establish connections, and handles all incoming, outgoing, and stored data associated with each session, and a callback manager 111 which executes callbacks initiated by the initiation management services layer 120 by instructing the session manager 500 to initiate a callback.

The initiation management services layer 120 determines when communications should be established. The initiation management services layer 120 comprises an event manager 600 which initiates callbacks based on events occurring outside of a session, and a schedule manager 900 which determines when communications should be established and schedules callbacks based on the determinations. Callbacks initiated by the event manager 600 and schedule manager 900 are passed up to the connection management service layer 110 and executed by the callback manager 111.

The user management services layer 130 stores information about consumers and brands for determination of when and how communications should be established. The user management services layer 130 comprises a consumer manager 800 which manages the profiles of consumers for use in establishing effective conversations with them, and an environment manager 1000 which stores information about brands including operations information and analysis, locations and status of communications infrastructure, and customer relationship management (CRM) information, plus and event thrower which can trigger scheduling of callbacks by sending instructions up to the initiation management services layer 120 for event rule establishment by the event manager 600 or scheduling by the schedule manager 900.

Certain of these services have machine learning algorithms incorporated into them trained to perform analyses of the particular type of operation handled by that service. The outputs of each service can be used as inputs to other services, such that a network of machine learnings algorithms is created which, when operated together, determines when and how to establish on-going communications with consumers so as to maximize the relationship between the consumer and a given brand.

Figure 2:
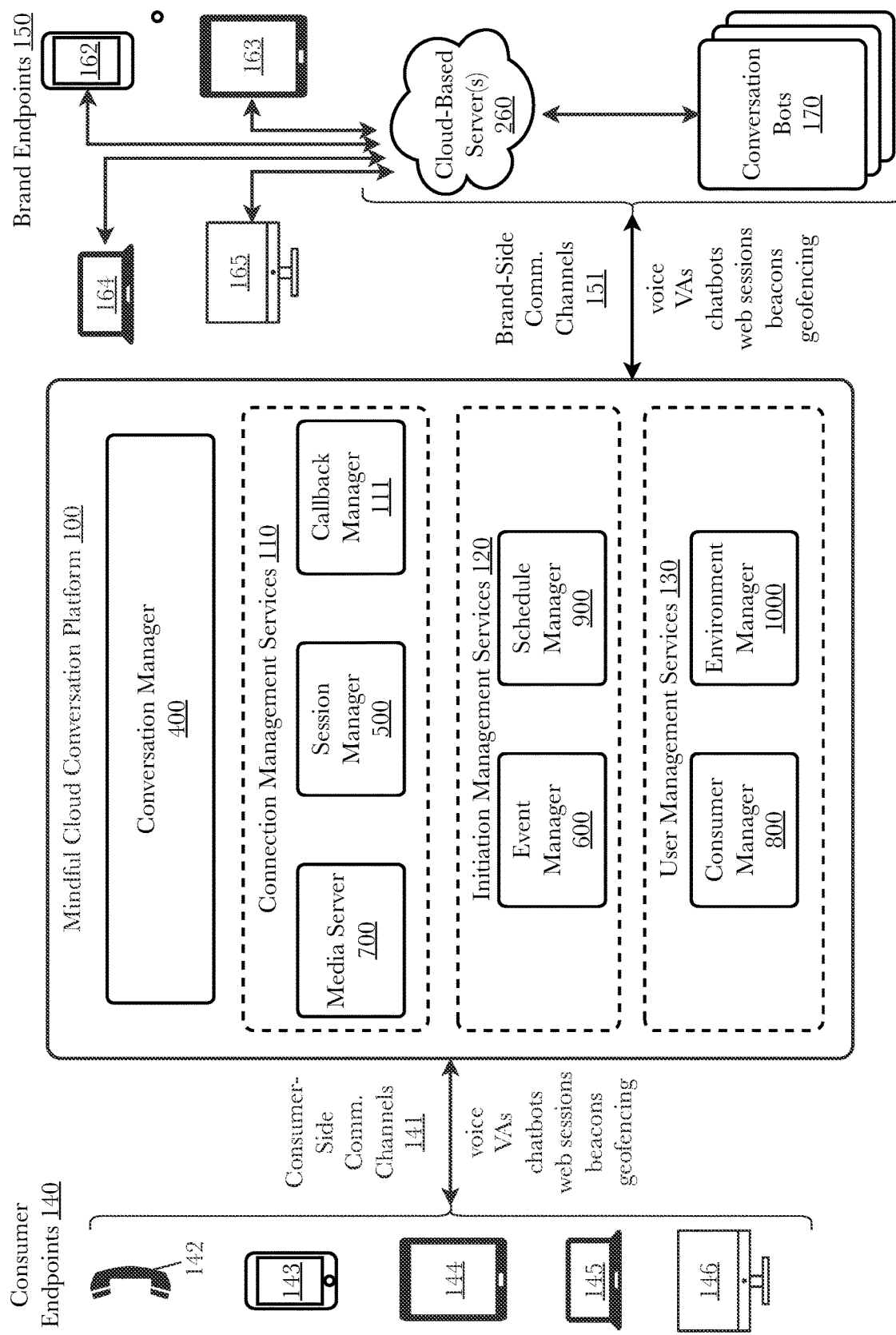
FIG. 2 is a block diagram illustrating an exemplary system architecture for an adaptive cloud conversation platform connected to brand endpoints comprising a cloud-based server with remote agents.

FIG. 2 is a block diagram illustrating an exemplary system architecture for an adaptive cloud conversation platform connected to brand endpoints comprising a cloud-based server with remote agents. In this embodiment, the adaptive cloud conversation platform 100 is the same as described above in FIG. 1, but the interface with the brand endpoints is different. In this embodiment, the brand endpoints 150 are remote agents managed through a cloud-based server 260 instead of being on-site agents at a contact center 160.

Figure 3:
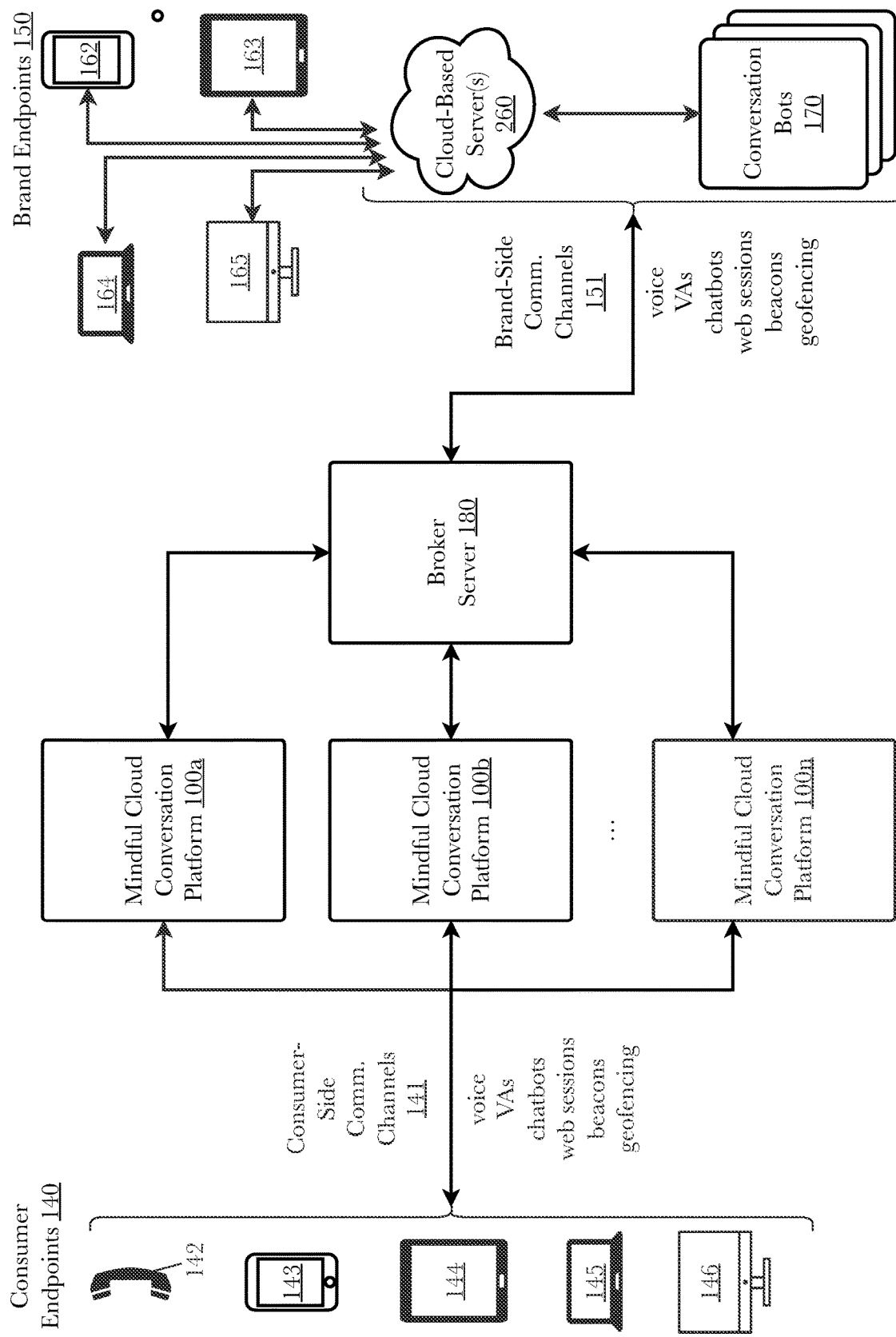
FIG. 3 is a block diagram illustrating an exemplary architecture for a multiple-instance adaptive cloud conversation platform connected to brand endpoints comprising a cloud-based server with remote agents and a broker server intermediary.

FIG. 3 is a block diagram illustrating an exemplary architecture for a multiple-instance adaptive cloud conversation platform connected to brand endpoints comprising a cloud-based server with remote agents and a broker server intermediary. In this embodiment, a plurality of adaptive cloud conversation platforms (ACCPs) 100a-n, each having capabilities the same as or similar to that described in FIG. 1, are managed by a broker server 180. In this embodiment, the broker server 180 mediates between brands and adaptive cloud conversation platform instances 100a-n. Depending on configuration, this embodiment supports a federated conversation arrangement where a consumer can interact with multiple brands through a single ACCP, or where one brand can use different ACCP instances to handle callbacks, or a combination of the two.

Figure 4:
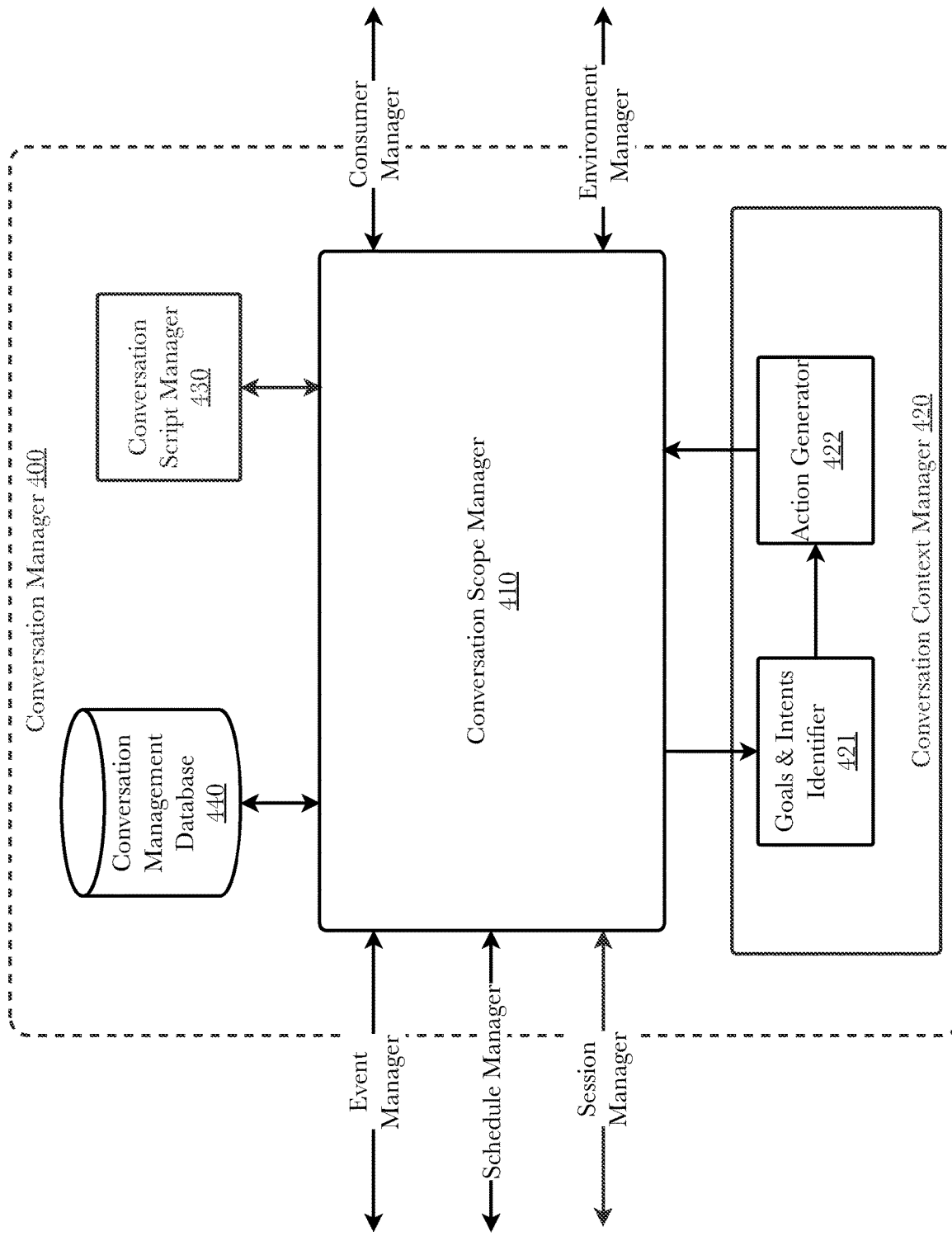
FIG. 4 is a block diagram illustrating an exemplary system architecture for a conversation manager aspect of an adaptive cloud conversation platform.

FIG. 4 is a block diagram illustrating an exemplary system architecture for a conversation manager aspect of an adaptive cloud conversation platform. The conversation manager 400 is responsible for determining the scope of conversations and for overall coordination of conversations with other components of the platform based on the scope. In this embodiment, the conversation manager 400 comprises a conversation scope manager 410, a conversation context manager 420, a conversation script manager 430, and a conversation management database 440.

The conversation scope manager 410 is responsible for determining and managing the scope of conversations. The conversation scope manager interfaces with other components of the system to either receive information about current or scheduled conversations or to direct initiation of conversations. In this embodiment, the conversation scope manager interfaces with the event manager to establish rules for triggering events and to receive notification of events that have been triggered, the schedule manager to schedule callbacks and receive notification of callbacks due for initiation, the session manager to initiate callbacks and receive data regarding on-going callbacks, the consumer manager to store and retrieve consumer profile data, and the environment manager to receive brand-established rules, fitness parameters, and other brand-related information. As conversations may involve multiple themes, extend over many sessions and over extended periods of time, and may involve more than one consumer and/or more than one brand, the conversation scope manager 410 is responsible for determining the scope of a given conversation through the use of global and local variables. For example, consumers may be assigned a global variable such that they are recognized throughout all components of the platform and at all stages. However, local scope variables may be assigned for each conversation, session, event, brand campaign, etc., to decrease dependencies within the platform, to separate conversations, to decrease the likelihood of data corruption, and to reduce overall complexity of the platform. For example, if a conversation starts between a buyer's real estate agent (brand) and the buyer (consumer), a scope will be assigned to that conversation. If and when the conversation extends to include other parties such as a seller's real estate agent (brand) and the seller, the seller's agent and seller may be recognized by the platform due to their global scope, but will be incorporated into the conversation's local scope for purposes of negotiating and completing that particular real estate transaction. Other scope variables may be assigned, such as session scope variables for communications between parties within the overall scope of the conversation about the real estate transaction. The conversation scope manager 410 keeps track of conversations, sessions, participants, and scopes, and stores them in the conversation management database 440 for later use.

The conversation context manager 420 is responsible for analyzing the context of conversations and, in particular, for determining the goals, needs, or intents of consumers for the purpose of recommending an action (e.g., scheduling a callback, changing modes of conversation, etc.). The conversation context manager incorporates a trained machine learning algorithm which receives conversation related data and determines a goal, need, or intent of the consumer using a goals and intents identifier 421 and recommends a corresponding action using an action generator 422. The training and operation of the machine learning algorithm is described later herein. The output of the conversation context manager 420 may be fed to other components for actions to be taken (e.g., a recommendation to schedule a callback by phone with a particular agent may be sent to the schedule manager to schedule the callback) or may be fed to the machine learning algorithms of other components for further analysis (e.g., a determination that a consumer is dissatisfied with the current line of discussions with an agent may be sent to the session context manager 520 for proposal of a different set of responses). In this way, the outputs of the machine learning algorithm(s) of each component of the platform may be acted on separately, or may be used as part of a network of machine learning algorithms, or some combination of the two.

The conversation script manager 430 contains a library of conversation scripts against which transcripts of conversations may be compared for analysis purposes or from which conversation scripts can be drawn in order to respond to on-going sessions. Conversation scripts may be in the form of relational databases which associate consumer queries with agent (or chatbot) responses, and may further include associations with context such as the goals, needs, and intents of a consumer, which may be used with the outputs of the conversation context manager 420 to provide appropriate responses to consumer queries.

Figure 5:
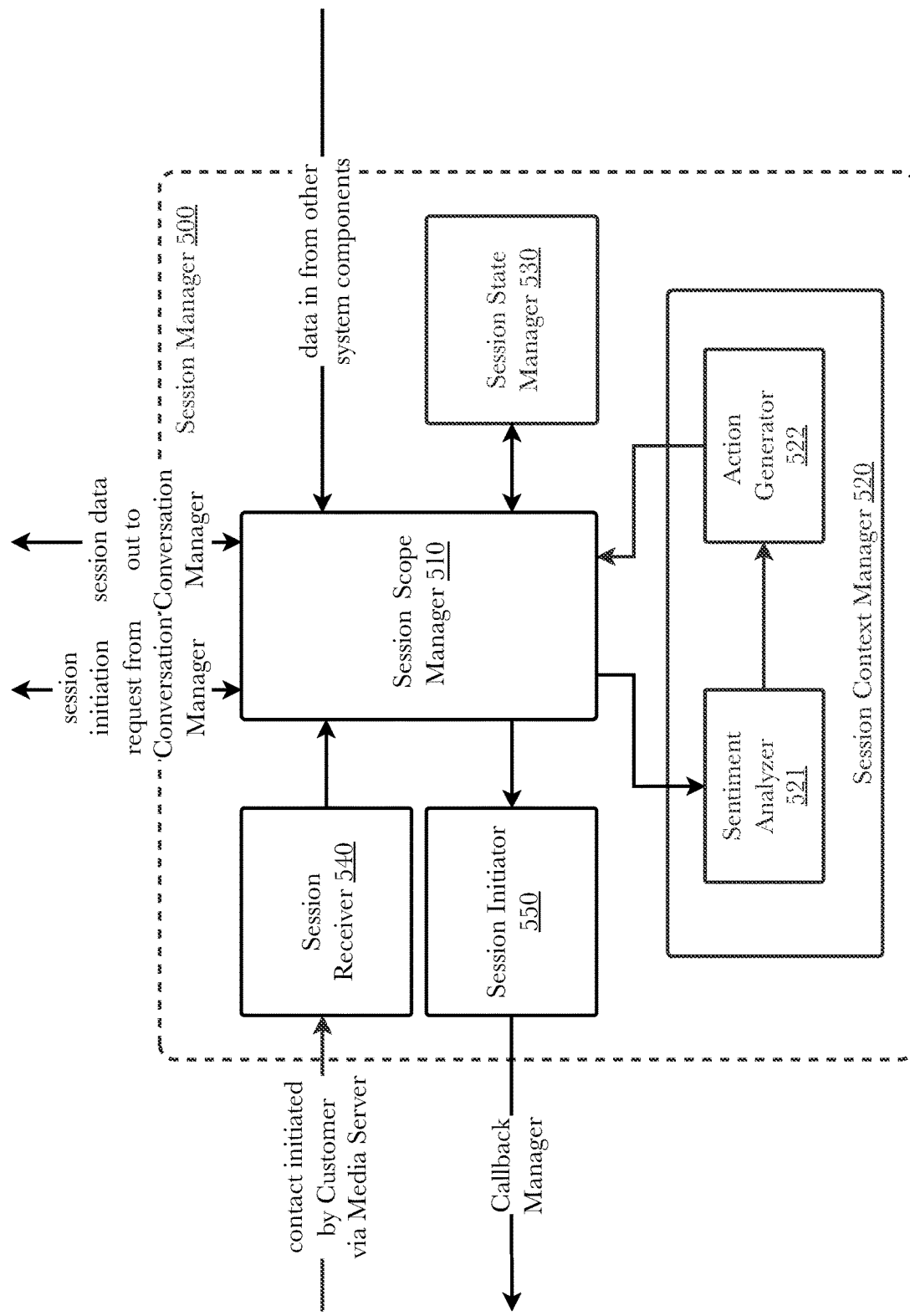
FIG. 5 is a block diagram illustrating an exemplary system architecture for a session manager aspect of an adaptive cloud conversation platform.

FIG. 5 is a block diagram illustrating an exemplary system architecture for a session manager aspect of an adaptive cloud conversation platform. The session manager is responsible for handling of communication sessions including assigning of session identifiers, instructing the media server 700 to establish connections, and handling all incoming, outgoing, and stored data associated with each session. In this embodiment, the session manager comprises a session scope manager 510, a session context manager 520, a session state manager 530, a session receiver 540, and a session initiator 550.

The session scope manager 510 is responsible for implementing the session within its defined scope as determined by the conversation scope manager 510. In the case where the conversation manager 400 directs the session scope manager 510 to initiate communications with a consumer, the directions from the conversation manager 400 will contain the session scope. In the event that contact is initiated by a consumer, the session scope manager 510 will send session data to the conversation manager 400 for determination of the session scope. For example, the session scope may be a phone call between a buyer and a buyer's agent in the context of a larger conversation about a real estate transaction.

The session context manager 520 is responsible for analyzing the context of conversations and, in particular, for determining the sentiment of a consumer during the session using text of the session provided by the media server 700. The session context manager 520 incorporates a trained machine learning algorithm which receives session related data and determines a sentiment of the consumer using a sentiment analyzer 521 and recommends a corresponding action using an action generator 522. The training and operation of the machine learning algorithm is described later herein. The output of the session context manager 520 may be fed to other components for actions to be taken (e.g., a recommendation to escalate a conversation by switching modes from chat to a voice-based phone call) or may be fed to the machine learning algorithms of other components for further analysis (e.g., a determination that a consumer is satisfied with the current line of discussions with the current call, and may be receptive to additional offers, which action may be sent to the environment manager 1000 for consideration of follow up offers). In this way, the outputs of the machine learning algorithm(s) of each component of the platform may be acted on separately, or may be used as part of a network of machine learning algorithms, or some combination of the two.

The session state manager 530 stores state information such as the current session scope, whether the session is on-going or completed, what type of connection(s) are being used at the consumer endpoints 140 and brand endpoints 150, the contact information used to establish the connection(s), etc. When a session is completed, the data stored in the session state manager 530 is sent to the conversation manager 400 for storage within the overall conversation (e.g., updates to the consumer profile, the brand CRM information, etc.).

The session receiver 540 receives communications initiated by the consumer and initiates a session by notifying the session scope manager 510. For example, if a consumer makes a phone call to a brand, the session receiver receives data about the phone call (e.g., consumer's phone number) from the media server, and notifies the session scope manager 510 which coordinates with the session scope with the conversation manager 400.

The session initiator 550 receives directions from the session scope manager 510 to initiate a session, and directs the media server 700 to make the appropriate communication connections.

Figure 6:
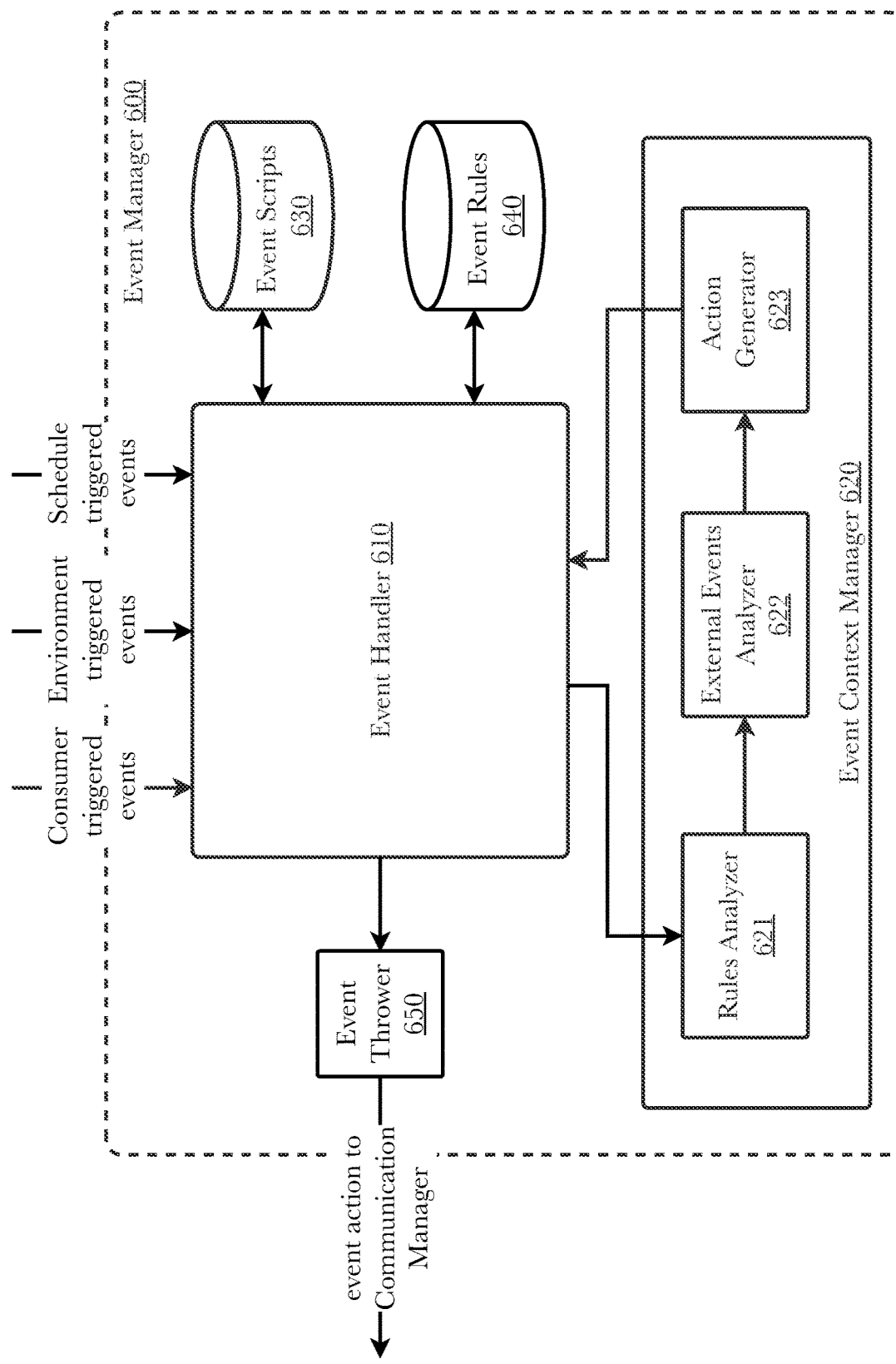
FIG. 6 is a block diagram illustrating an exemplary system architecture for an event manager aspect of an adaptive cloud conversation platform.

FIG. 6 is a block diagram illustrating an exemplary system architecture for an event manager aspect of an adaptive cloud conversation platform. The event manager 600 initiates callbacks based on events occurring outside of a session based on established event rules (e.g., callbacks on a consumer's birthday; promotional events established by a brand) or external events (e.g., a consumer's purchase of a product from a brand; weather events in the consumer's area that might suggest purchase of a product such as snow tires prior to a snow storm). Callbacks initiated by the event manager 600 are passed up to the connection management service layer 110 and executed by the callback manager 111. In this embodiment, the event manager 600 comprises an event handler 610, an event context manager 620, an event script database 630, an event rules database 640, and an event thrower 650.

The event handler 610 is responsible for triggering communication sessions based on events outside of a current session based on established event rules or external events. It does so by monitoring event notifications received from other components in the system, from outside sources (e.g., news websites, weather websites, etc.), or from schedules to determine whether any of the event notifications trigger a rule stored in the event rules database 640. Such rules may be simple (e.g., contact a consumer on his/her birthday) or complex (e.g., offer snow tires to consumers living in a certain geographical area during the winter season when weather reports indicate snow in that geographical area within the next week). When a rule is triggered by an event notification, a corresponding event script is retrieved from an event script database 630, the event script providing instructions for handling of the event (e.g., send out a broadcast email to all affected consumers), which instructions are sent to an event thrower 650 which implements the script by throwing an event with an event action to the communication manager 400.

The event context manager 620 analyzes established rules and external events to identify additional relationships between the rules, external events, and consumers. The event context manager 620 incorporates a trained machine learning algorithm which receives conversation related data and identifies additional relationships (possibly unknown or hidden) using a rules analyzer 621 and an external events analyzer 622, and recommends a corresponding action using an action generator 322. The training and operation of the machine learning algorithm is described later herein. The output of the event context manager 620 may be fed to other components for actions to be taken (e.g., a recommendation offer other winter-related products to certain consumers in addition to snow tires) or may be fed to the machine learning algorithms of other components for further analysis (e.g., forwarding of the identified additional relationships to the environment manager 1000 for analysis). In this way, the outputs of the machine learning algorithm(s) of each component of the platform may be acted on separately, or may be used as part of a network of machine learning algorithms, or some combination of the two.

Figure 7:
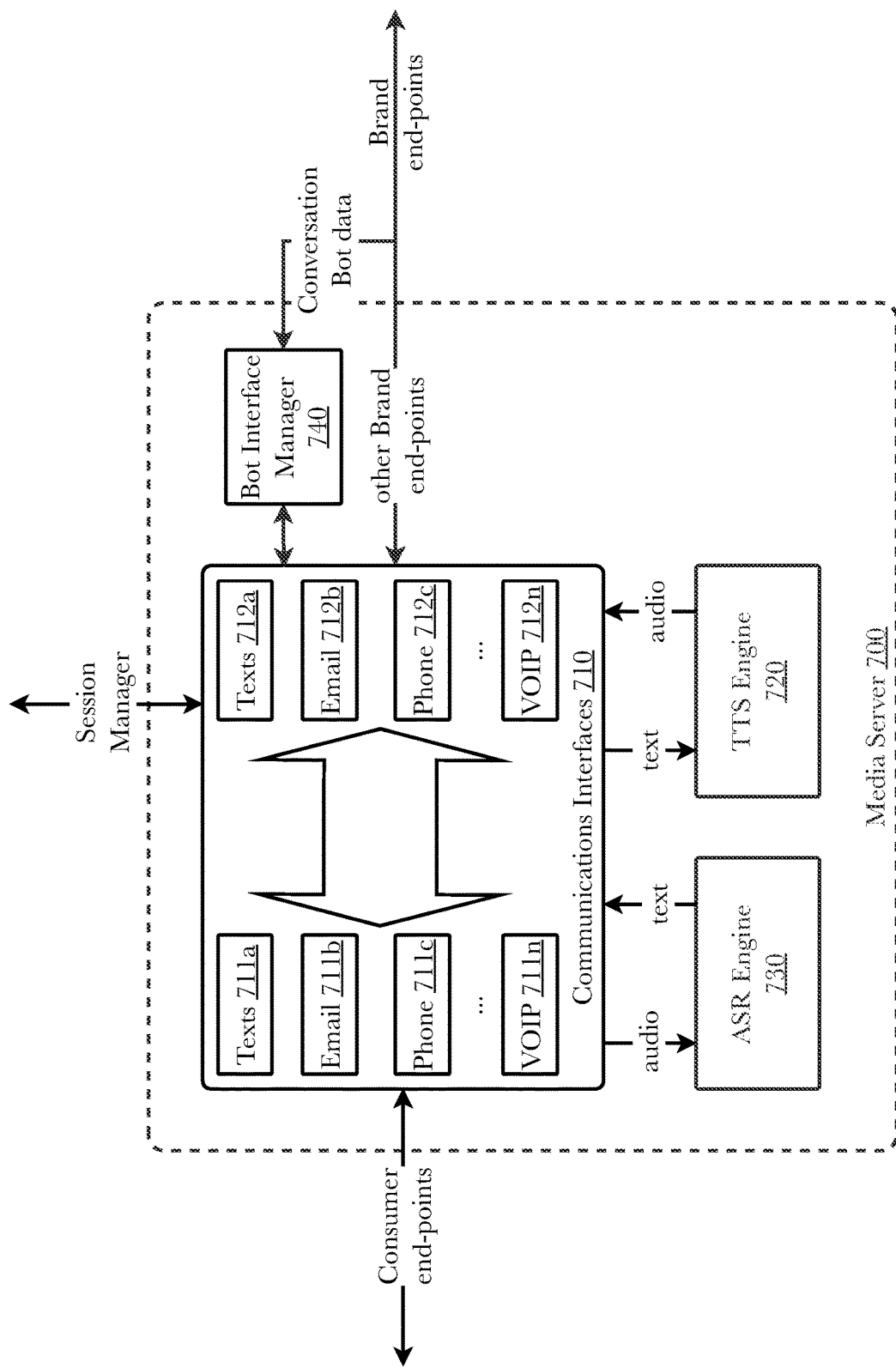
FIG. 7 is a block diagram illustrating an exemplary system architecture for a media server aspect of an adaptive cloud conversation platform.

FIG. 7 is a block diagram illustrating an exemplary system architecture for a media server aspect of an adaptive cloud conversation platform. The media server 700 establishes communications between consumer endpoints 140 and brand endpoints 150 and performs any necessary media translations (e.g., automated speech recognition, text to speech, etc.). In this embodiment, the media server 700 comprises communications interfaces 710, a text-to-speech engine 720, an automated speech recognition engine 730, and a bot interface manager 740.

The communications interfaces 710 comprise communications channels on both the consumer side 711a-n and the brand endpoint side 712a-n, including, but not limited to text channels 711a, 711b for chat windows and short message service (SMS) messages, email channels 711b, 712b for sending and receipt of communications via email, phone channels 711c, 712c for communications via plain old telephone service (POTS) lines, and voice-over-Internet-protocol (VOIP) channels 711n, 712n for voice communications over the Internet. Note that the communications interfaces 710 may also contain hardware and software for conversion of one type of channel on one end to a different type of channel on the other end. For example, the audio of a call from a consumer who calls using a POTS phone channel 711c may be converted to a VOIP channel 712n on the brand end, and vice-versa, so as to facilitate communications between different channels on either end. In some cases, text-based channels 711a-b, 712a-b may be converted to audio channels 711c-n, 712c-n and vice-versa by using the automated speech recognition (ASR) engine 730 to convert spoken audio to text and by using the text-to-speech (ITS) engine 720 to convert text to spoken audio.

The text-to-speech engine 720 may further be used to convert spoken audio to text for analysis by other components such as the session manager 500 or the conversation manager 400. This may be done in near-real-time or may be done with a delay such as by recording the audio and converting the recorded audio at a later time.

The bot interface manager 740 is used to relay communications from the brand-side communications interfaces 712a, b to an appropriate conversation bot (e.g., a text-based chatbot or to an appropriate audio-based interactive voice response (IVR) system or virtual assistant such as Siri, Alexa, or similar). Where the conversation bot is a third party conversation bot such as Siri or Alexa, the bot interface manager 740 also forwards the consumer-bot communications the brand for integration into its CRM database and other systems, or for handling by an agent at a brand endpoint 150 if the call is later transferred to such agent.

Figure 8:
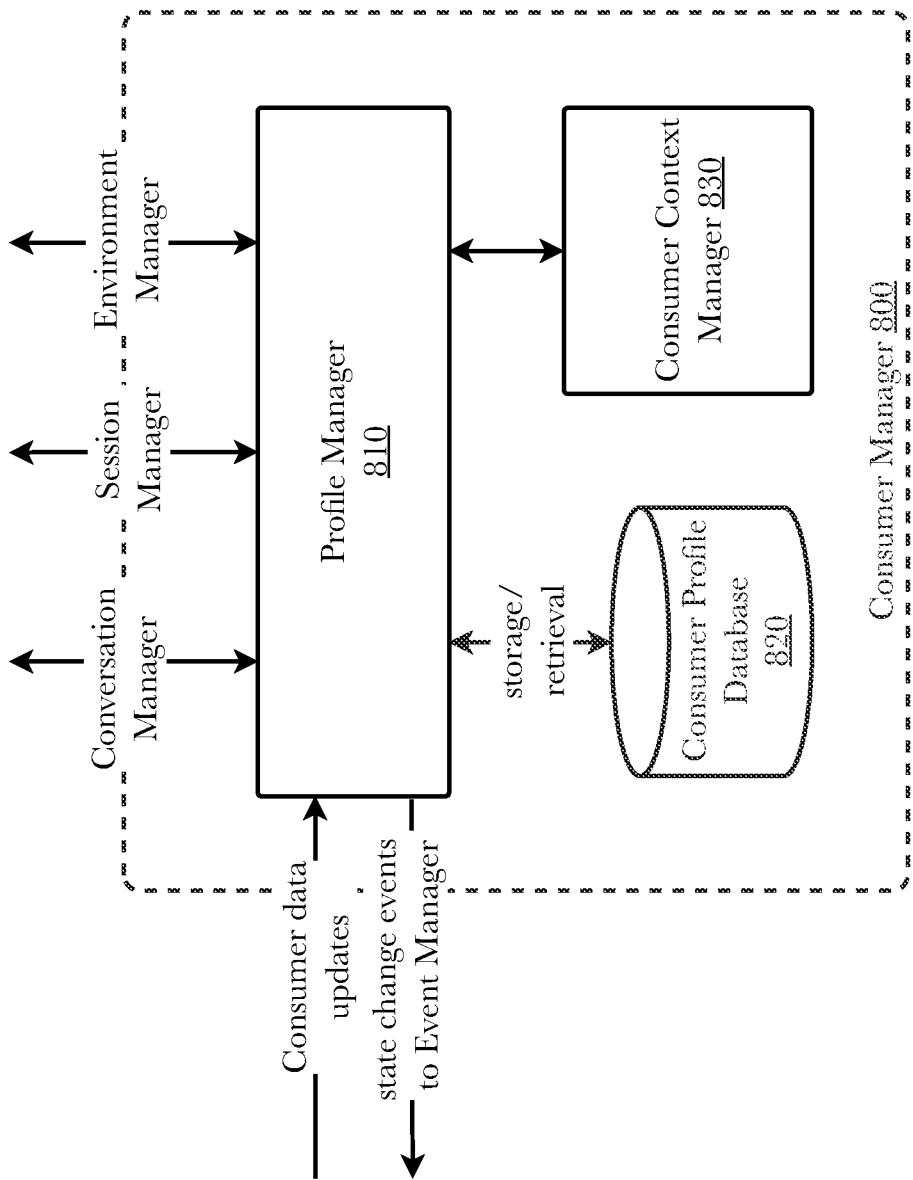
FIG. 8 is a block diagram illustrating an exemplary system architecture for a consumer manager aspect of an adaptive cloud conversation platform.

FIG. 8 is a block diagram illustrating an exemplary system architecture for a consumer manager aspect of an adaptive cloud conversation platform. The consumer manager 800 manages the profiles of consumers for use in establishing effective conversations with them, and engages in proactive conversation analysis to determine whether a proactive communication with a consumer should be initiated. In this embodiment, the consumer manager 800 comprises a profile manager 810, a consumer profile database 820, and a consumer context manager 830.

The profile manager 810 handles all consumer data updates received either from the consumer or from other components of the system, and stores and retrieves information from consumer profiles in the consumer profile database 820 and forwards this information to other platform components, as needed. Consumer profiles may contain any information relevant to a consumer, his or her relationships with one or more brands, and any conversations in which the consumer has taken part. This includes, but is not limited to, the name, address, phone number, and other identifying information of the consumer; brands with whom the consumer has interacted and histories of such interactions, including product/service inquiries, product/service purchases and returns, and product/service reviews and comments; and logs and recordings of conversations, analyses of such conversations to determine wants, needs, intents, and goals, and lists of other consumers with whom the consumer has had conversations and their relationships. In some embodiments, each consumer will have a single, unique profile for all conversations and all brands. In other embodiments, more than one profile may be established for a given consumer, depending on the configuration (e.g., a profile may be established for each brand with whom the consumer has had one or more conversations). The profile manager 810 notifies the event manager 810 of changes to the state of the profile (e.g., a change in a consumer's address) that may impact event rules.

The consumer context manager 830 learns about the consumer's behaviors and preferences in relation to events and brand attributes that are associated with consumer behaviors. Consumer behaviors and preferences include, but are not limited to, types and amounts of products and services purchased, dates and times of purchases, types and amounts of entertainment media consumed (e.g., computer games, television crime series, documentaries), interests indicated by certain purchases (e.g., purchases of season tickets to a baseball stadium indicate an interest in sports, especially baseball). Consumer behaviors and preferences may be implied (e.g., the purchase of baseball tickets implies an interest in baseball) or expressed (e.g., "I like watching baseball."). The consumer behaviors and preferences are likely to be associated with certain events and/or brand attributes. The consumer context manager 830 incorporates a trained machine learning algorithm which recommends conversations with consumers based on predicted associations between consumer behaviors and preferences and events and/or brand attributes. The training and operation of the machine learning algorithm is described later herein. The output of the consumer context manager 830 may be fed to other components for actions to be taken (e.g., scheduling of a sales call based on an upcoming event to which the consumer may be responsive) or may be fed to the machine learning algorithms of other components for further analysis (e.g., to the conversation manager to determine the best mode of starting the a conversation based on the upcoming event). In this way, the outputs of the machine learning algorithm(s) of each component of the platform may be acted on separately, or may be used as part of a network of machine learning algorithms, or some combination of the two.

Figure 9:
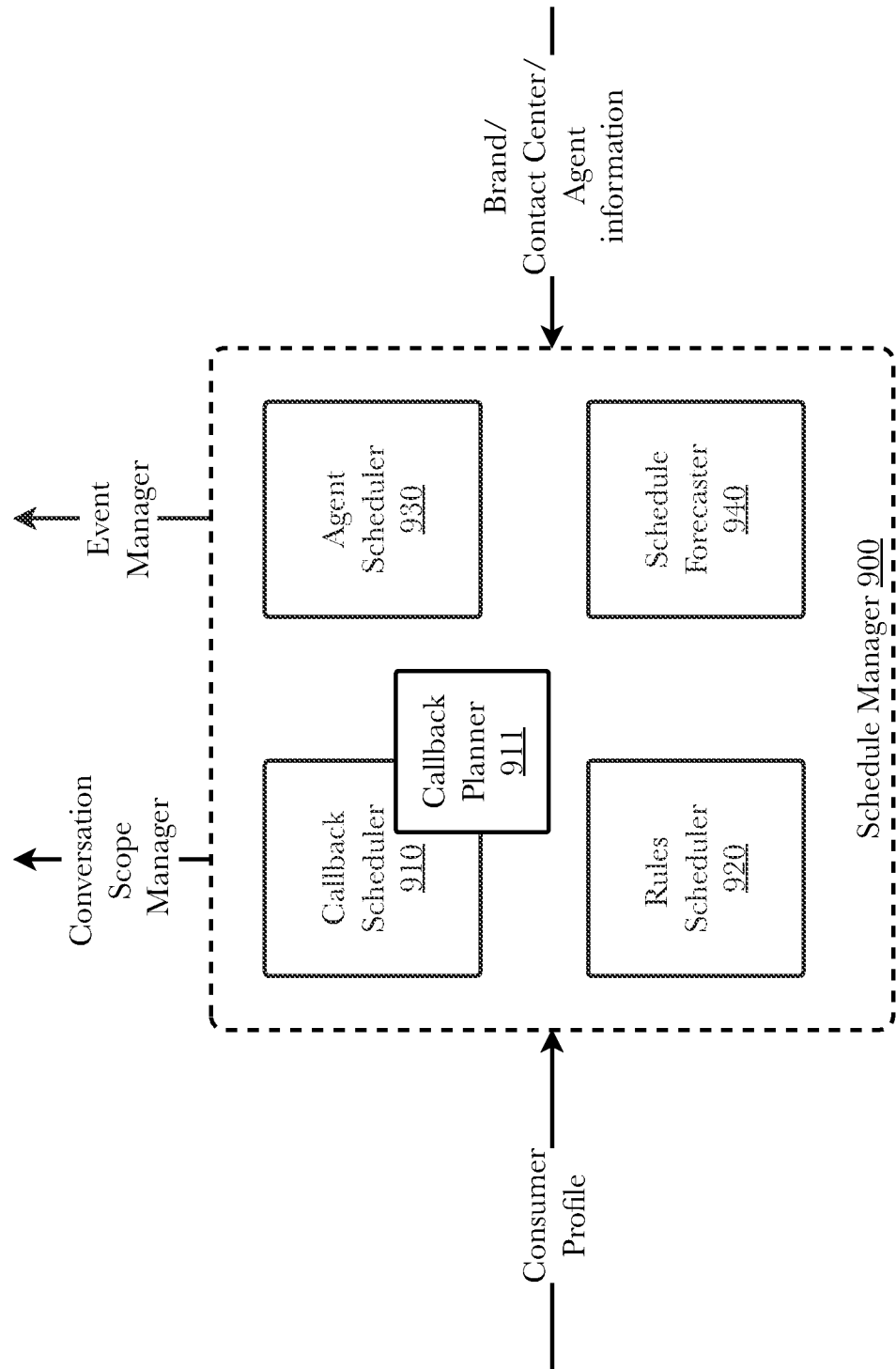
FIG. 9 is a block diagram illustrating an exemplary system architecture for a schedule manager aspect of an adaptive cloud conversation platform.

FIG. 9 is a block diagram illustrating an exemplary system architecture for a schedule manager aspect of an adaptive cloud conversation platform. The schedule manager 900 determines when communications should be established and schedules callbacks based on the determinations. In this embodiment, the schedule manager 900 comprises a callback scheduler 910, a callback planner 911, a rules scheduler 920, an agent scheduler 930, and a schedule forecaster.

The callback scheduler 910 receives requests to schedule callbacks from other platform components and determines when the callback should be made based on consumer preferences and availability from the consumer profile, rules for scheduling callbacks set forth in the rules scheduler 920, agent availabilities set forth in an agent scheduler 930, and forecasts made by the schedule forecaster 940 of when the consumer and agent will be mutually available if and when certain rules are active. The determination of when the callback should be made is performed by the callback planner 911. The callback planner 911 is responsible for analyzing the data set forth above and determining when to schedule the call. The callback planner 911 incorporates a trained machine learning algorithm which receives the above data and predicts one or more preferred callback times, which are then placed into the schedule by the callback scheduler 910. The training and operation of the machine learning algorithm is described later herein. The output of the callback planner 911 may be fed to other components for actions to be taken (e.g., a change in event rules of the event manager 600) or may be fed to the machine learning algorithms of other components for further analysis although, in this embodiment, the callback scheduler is the final destination of the determinations of all other machine learning algorithms. In this way, the outputs of the machine learning algorithm(s) of each component of the platform may be acted on separately, or may be used as part of a network of machine learning algorithms, or some combination of the two.

Figure 10:
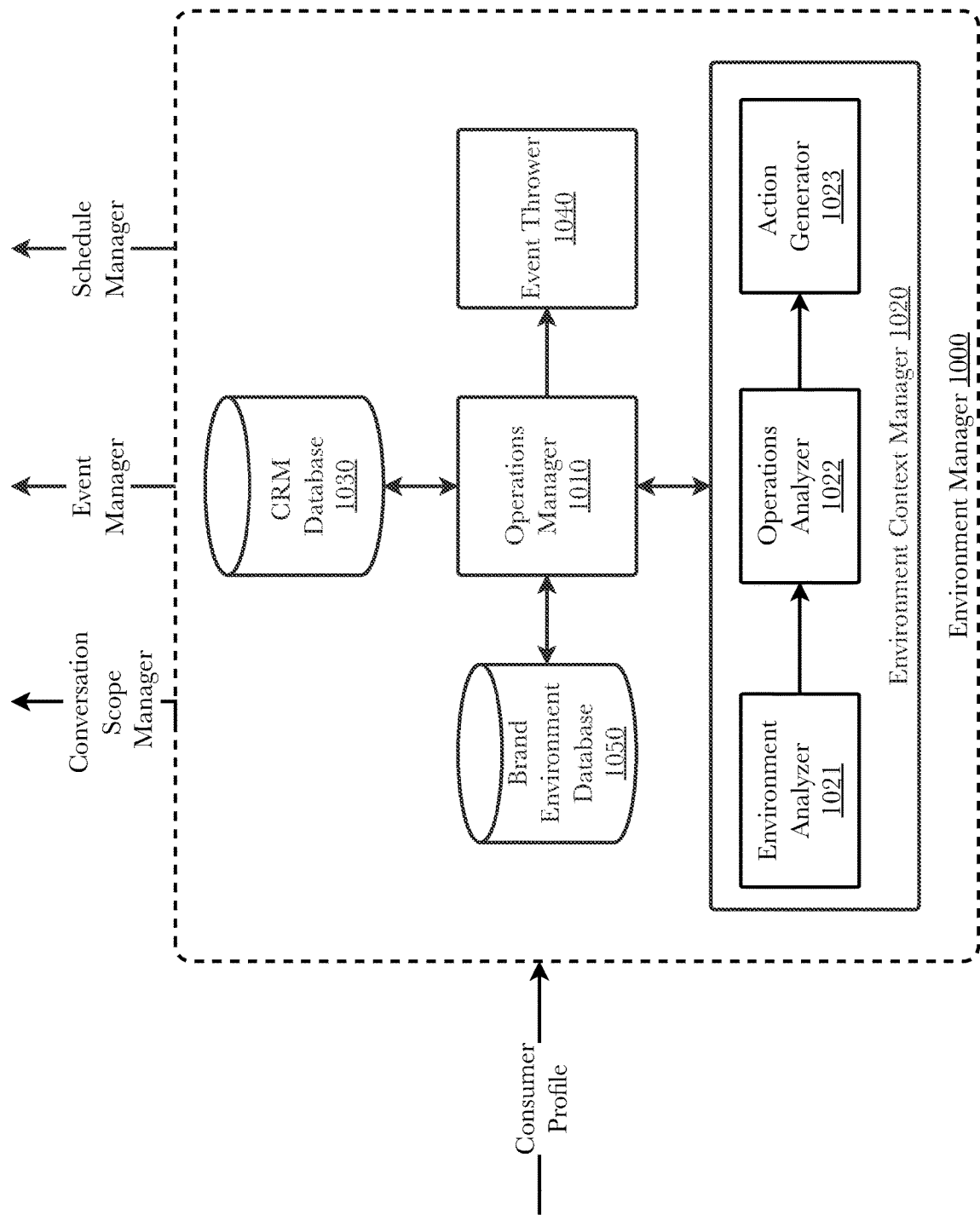
FIG. 10 is a block diagram illustrating an exemplary system architecture for an environment manager aspect of an adaptive cloud conversation platform.

FIG. 10 is a block diagram illustrating an exemplary system architecture for an environment manager aspect of an adaptive cloud conversation platform. The environment manager 1000 stores information about brands including operations information and analysis, locations and status of communications infrastructure, and customer relationship management (CRM) information, which can be used to trigger scheduling of callbacks by sending instructions up to the initiation management services layer 120 for event rule establishment by the event manager 600 or scheduling by the schedule manager 900. In this embodiment, the environment manager 1000 comprises an operations manager 1010, an environment context manager 1020, a customer relationship management (CRM) database 1030, an event thrower 1040, and a brand environment database 1050.

The operations manager 1010 contains an interface through which brands can enter or upload their brand environment data and customer relationship management (CRM) data. The brand environment data is information about the brand useful for management of conversations with consumers and may include, but is not limited to, infrastructure data (e.g., sales locations; contact center locations, capacities, and capabilities, etc.), operational data (e.g., current and scheduled call volumes, etc.), product/service information, fitness parameters (e.g., average 90% retention rate for consumers), all of which is stored in the brand environment database 1050. The CRM data is information about the consumers and their contacts with the brand and includes, but is not limited to, consumer identifications and contact information, histories of interactions with the brand, and products and services purchased, all of which is stored in the CRM database 1030. Note that the information stored in the CRM database 1030 may be exported to and duplicated in the consumer profile database 820.

The environment context manager 1020 is responsible for analyzing the information contained in the brand environment database 1050 and CRM database 1030 to determine whether a campaign of communications should be established with a plurality of consumers. The environment context manager 1020 incorporates a trained machine learning algorithm which analyzes the information brand environment database 1050 and CRM database 1030 using an environment analyzer 1021, further determines whether there are appropriate operational resources (e.g., agents with appropriate skills, sufficient contact center capacity given current or predicted call volumes, etc.) using an operations analyzer 1022, and recommends a corresponding action using an action generator 1023. The training and operation of the machine learning algorithm is described later herein. The output of the environment context manager 1020 may be fed to other components for actions to be taken (e.g., a recommendation to schedule a callbacks by phone with a plurality of consumers may be sent to the schedule manager to schedule the callbacks) or may be fed to the machine learning algorithms of other components for further analysis (e.g., a request to determine a best mode of communication may be sent to the conversation manager for analysis). In this way, the outputs of the machine learning algorithm(s) of each component of the platform may be acted on separately, or may be used as part of a network of machine learning algorithms, or some combination of the two.

The event thrower 1040 throws events to other platform components with instructions to schedule or establish communications with a consumer either associated with an existing conversation or a new conversation.

Figure 11:
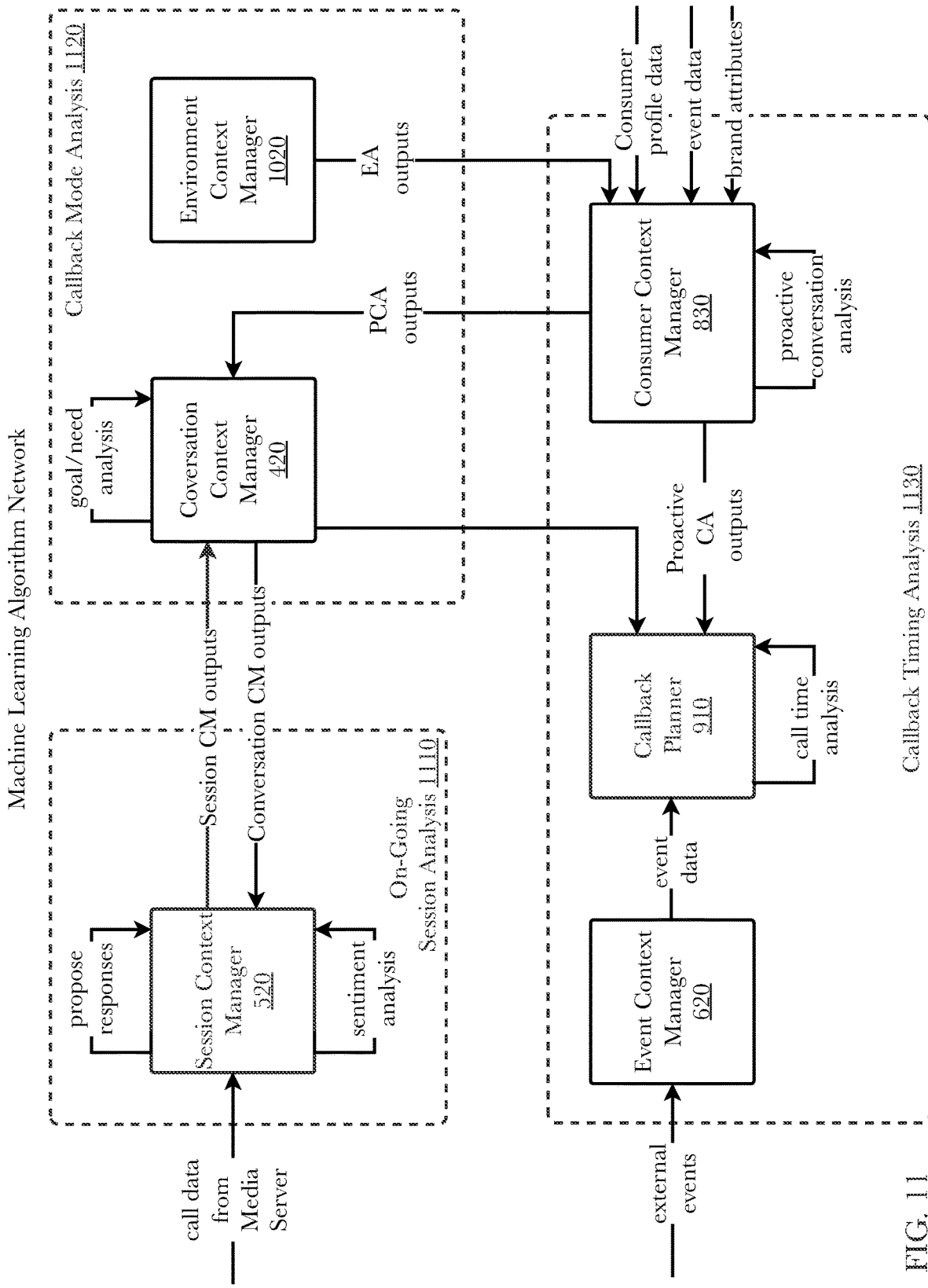
FIG. 11 is a block diagram illustrating an exemplary system architecture for a machine learning algorithm network aspect of an adaptive cloud conversation platform.

FIG. 11 is a block diagram illustrating an exemplary system architecture for a machine learning algorithm network aspect of an adaptive cloud conversation platform. This diagram shows the machine learning algorithm (MLA) of each platform component and an exemplary configuration of such MLAs into a network of MLAs for complex decision-making related to conversations. In this embodiment, the MLA network comprises the session context manager 520, the conversation context manager 420, the environment analyzer 1050, the event context manager 620, the callback planner 911, and the consumer context manager, arranged in a network such that the outputs of certain MLAs can be used as inputs to other MLAs to make more complex or refined decisions than are possible using a single MLA. The components of the MLA network are arranged conceptually into three overall types of analysis. On-going session analyses 1110 (i.e., what is happening in the current communication) are performed by the session context manager 520. Callback mode analyses 1120 (i.e., how a call should be made, what channels, etc.) are performed by the conversation context manager 420 and/or the environment analyzer 1050. Callback timing analyses 1130 (i.e.g, when a call should be made) are performed by the event context manager 620, the callback planner 911, and the consumer context manager 830.

In this embodiment, the session context manager 520 receives real-time or near-real-time text data from the media server for any on-going calls, processes the data through one or more machine learning algorithms to perform sentiment analysis and then propose responses to the consumer based on the sentiment analysis. In some embodiments, the proposed responses may be generated from unsupervised machine learning algorithms or reinforcement machine learning algorithms rather than supervised (i.e., pre-trained) machine learning algorithms. An unsupervised machine learning algorithm learns from the data itself by association, clustering, or dimensionality reduction, rather than having been pre-trained to discriminate between labeled input data. Reinforcement learning algorithms learn from repeated iterations of outcomes based on probabilities with successful outcomes being rewarded. These types of machine learning algorithms are ideal for exploring large number of possible outcomes such as possible outcomes from different approaches to a conversation, and so would be suitable for proposing responses to consumer queries.

In this embodiment, the sentiment analysis and proposed responses may be provided to the conversation context manager 420 for performance of a goals, needs, and intents analysis. For example, the session context manager 520 determines that the consumer's sentiment on the call is negative, the text data and the indication of negative sentiment may be analyzed by the conversation context manager 420 which may determine that the consumer actually wants to buy a replacement product rather than fix the existing one. This intent analysis can then be sent back to the session manager for proposal of an appropriate responses. Alternately, the intent analysis can be sent to the callback planner 911 for scheduling of a callback from a salesperson who can sell the replacement product instead of the current agent trying to fix the product.

In this embodiment, the environment context manager 1020 may likewise determine whether and how to establish a conversation with a consumer by analyzing the information contained in the brand environment database 1020 and CRM database 1030 to determine whether a communication should be scheduled or established with a consumer based on data within the brand's environment. The outputs of the environment context manager 1020 may be sent to a consumer context manager 830 for determination as to whether a proactive conversation should be started based on the combination of environment context manager 1020 outputs and the information in the consumer profile database such as conversation histories. If a conversation is recommended either by the environment context manager 1020 or the consumer context manager 830, the recommendation is sent either to the conversation context manager 420 for determination of a best mode of communication or, if the mode is known or not of particular importance, to the callback planner 911 for determination of a best communication time.

In this embodiment, the consumer context manager 830 performs proactive conversation analysis based on consumer behaviors, consumer preferences, events associated with consumer behaviors and/or preferences, and brand attributes associated with consumer behaviors and/or preferences to determine whether a proactive conversation should be initiated with a consumer. The outputs of the consumer context manager 830 may be sent to the callback planner 910 for scheduling, or to the conversation context manager 420 for determination of a best mode of for initiating a proactive conversation.

Finally, in this embodiment, the event context manager's 620 machine learning algorithms may determine that a communication should be established based on a rule, external event, or analysis of rules or external events combined with information stored in the consumer profile database. In such a case, the outputs of the event context manager 620 are sent to the callback planner 911 for determination of a best communication time.

DETAILED DESCRIPTION OF EXEMPLARY ASPECTS

Figure 12:
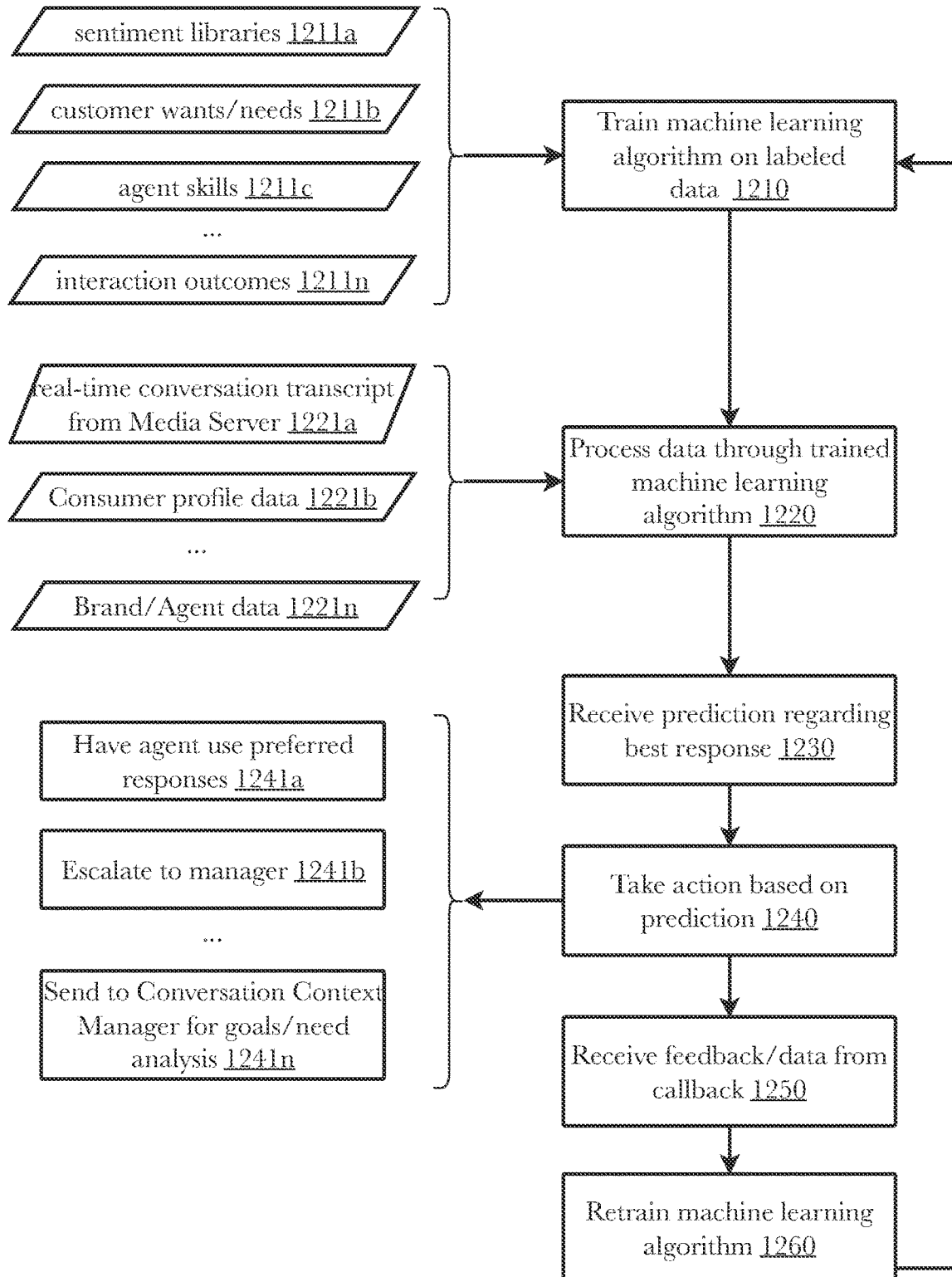
FIG. 12 is a flow diagram illustrating an exemplary method for training and operation of machine learning algorithms for on-going session analysis.

FIG. 12 is a flow diagram illustrating an exemplary method for training and operation of machine learning algorithms for on-going session analysis. In this example, it is assumed that a supervised machine learning algorithm (MLA) is being used, but in other embodiments, unsupervised machine learning algorithms or reinforcement machine learning algorithms may be used if better suited to the analyses being performed. Here, the machine learning algorithm is trained 1210 on labeled data such as sentiment libraries 1211*a*, indications of consumer wants/needs in relation to certain words and phrases 1211*b*, agent skills 1211*c*, and interaction outcomes based on the above 1211*n*. Once the MLA has been trained, actual data is processed 1220 through the trained machine learning algorithm such as a statement from a real-time conversation transcript from the media server 1221*a*, consumer profile data 1221*b*, and brand/agent data 1221*n*. The MLA outputs a prediction regarding the best response 1230 to the consumer's statement, and an action is taken based on the prediction 1240 such as having the agent use the preferred response 1241*a*, escalating the call to a manager 1241*b*, or sending the data to the conversation context manager for a goals, needs, and intents analysis 1241*n* to better determine a response. As feedback data is received from the callback 1250, it may be used to retrain the machine learning algorithm 1260. Over time, the MLA will adapt its outputs to the retraining based on real-world data to provide more accurate predictions.

Figure 13:
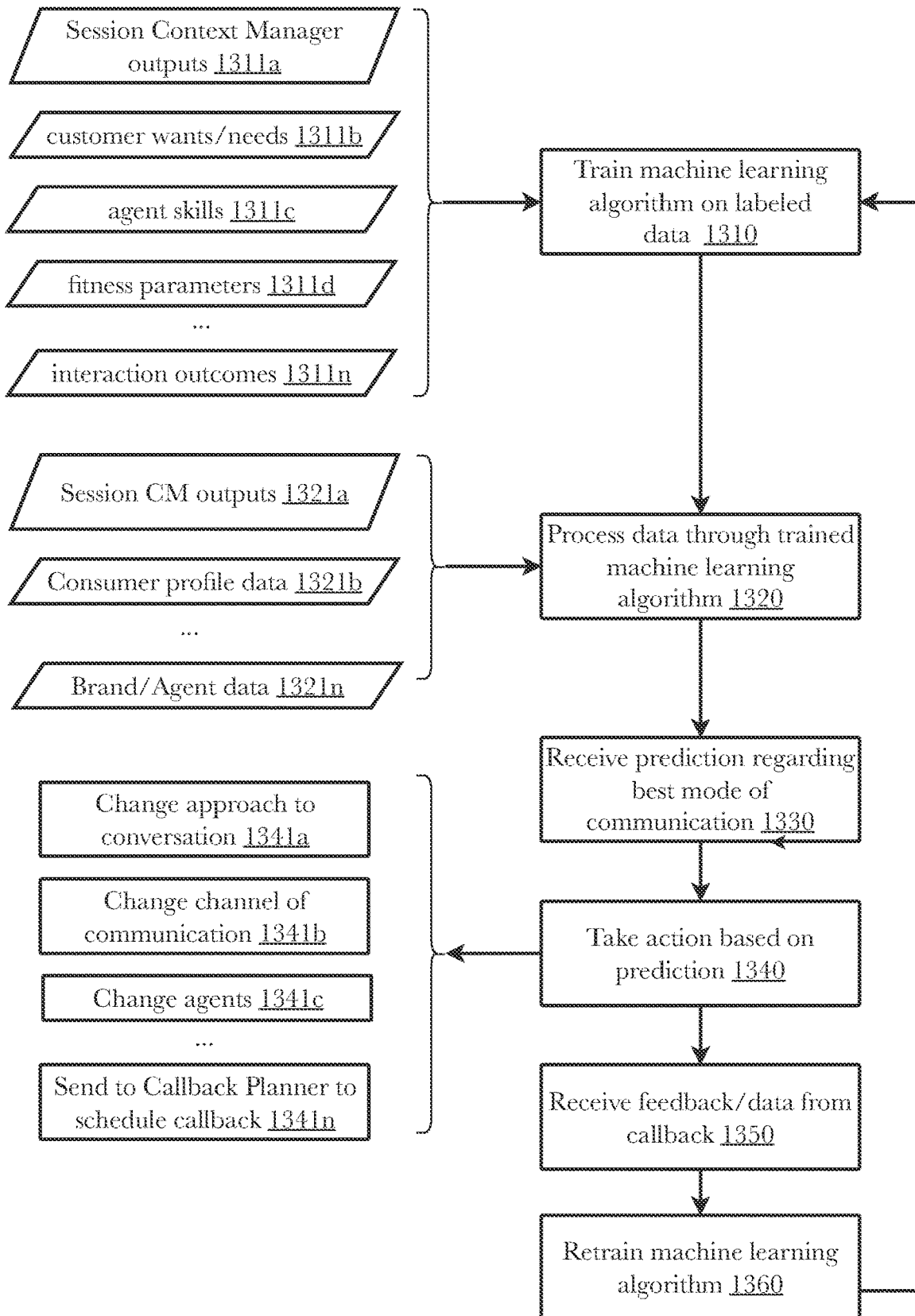
FIG. 13 is a flow diagram illustrating an exemplary method for training and operation of machine learning algorithms for callback mode analysis.

FIG. 13 is a flow diagram illustrating an exemplary method for training and operation of machine learning algorithms for callback mode analysis. In this example, it is assumed that a supervised machine learning algorithm (MLA) is being used, but in other embodiments, unsupervised machine learning algorithms or reinforcement machine learning algorithms may be used if better suited to the analyses being performed. Here, the machine learning algorithm is trained 1310 on labeled data such as session context manager outputs 1311*a*, indications of consumer wants/needs in relation to certain words and phrases 1311*b*, agent skills 1311*c*, fitness parameters established by the brand 1311*d*, and interaction outcomes based on the above 1311*n*. Once the MLA has been trained, actual data is processed 1320 through the trained machine learning algorithm such as session context manager outputs 1321*a*, consumer profile data 1321*b*, and brand/agent data 1321*n*. The MLA outputs a prediction regarding the best mode of communication 1330 with the consumer, and an action is taken based on the prediction 1340 such as changing the approach to the conversation 1341*a*, changing the channel of communication 1341*b*, changing agents 1341*c*, or sending the data to the callback planner to schedule a callback 1341*n* to better determine a response. As feedback data is received from the callback 1350, it may be used to retrain the machine learning algorithm 1360. Over time, the MLA will adapt its outputs to the retraining based on real-world data to provide more accurate predictions.

Figure 14:
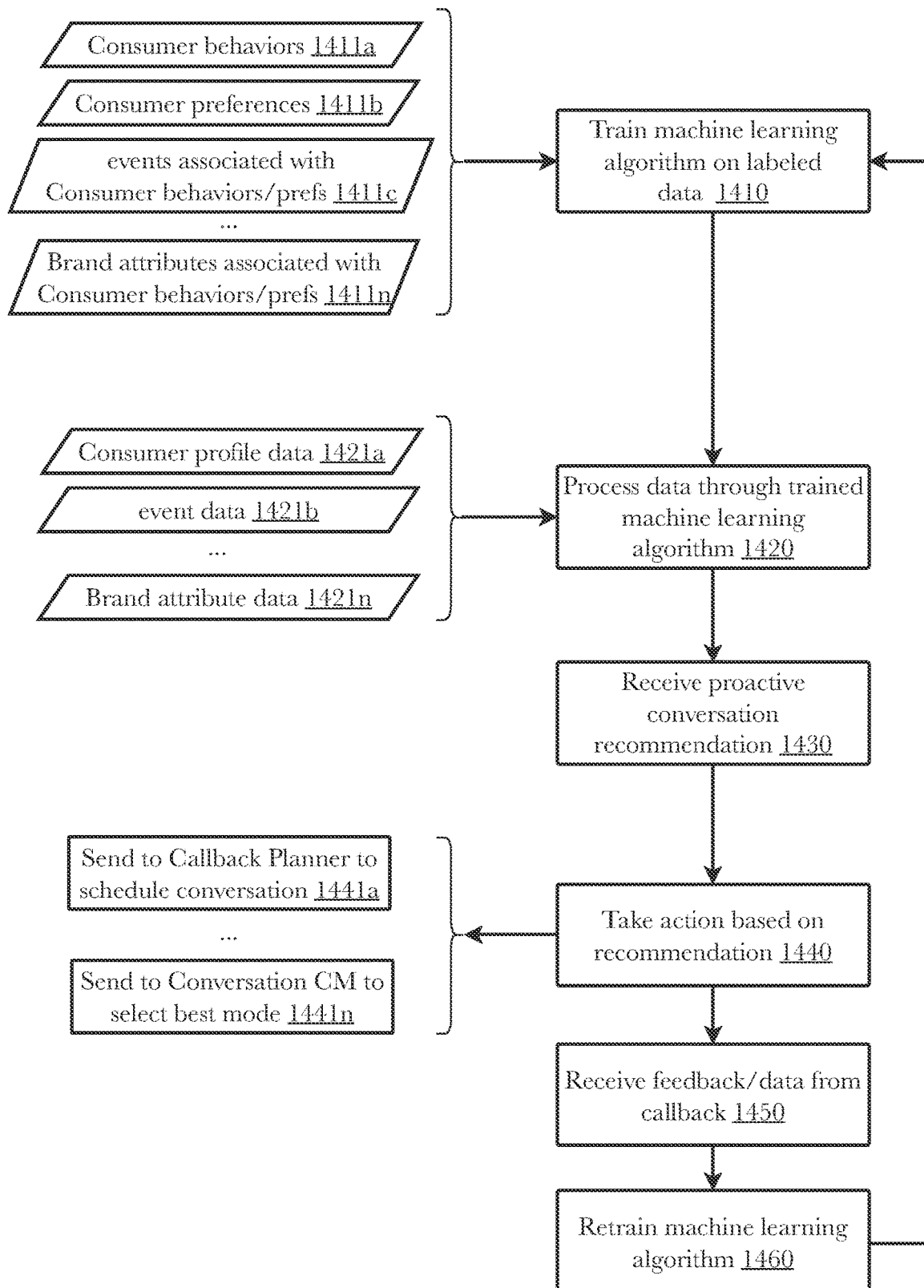
FIG. 14 is a flow diagram illustrating an exemplary method for training and operation of machine learning algorithms for proactive conversation analysis.

FIG. 14 is a flow diagram illustrating an exemplary method for training and operation of machine learning algorithms for proactive conversation analysis. In this example, it is assumed that a supervised machine learning algorithm (MLA) is being used, but in other embodiments, unsupervised machine learning algorithms or reinforcement machine learning algorithms may be used if better suited to the analyses being performed. Here, the machine learning algorithm is trained 1410 on labeled data such as consumer behaviors 1411*a*, consumer preferences 1411*b*, events associated with consumer behaviors and/or preferences 1411*c*, and brand attributes associated with consumer behaviors and/or preferences 1411*n*. Once the MLA has been trained, actual data is processed 1420 through the trained machine learning algorithm such as consumer profile data 1421*a*, and event data 1421*b*, and brand attribute data 1421*n*. The MLA outputs a recommendation regarding a proactive conversation 1430 with the consumer, and an action is taken based on the prediction 1440 such as sending the data to the callback planner to schedule a conversation 1441*a* or sending the data to the conversation context manager 1441*n* to select a best mode for initiating a conversation. As feedback data is received from the callback 1450, it may be used to retrain the machine learning algorithm 1460. Over time, the MLA will adapt its outputs to the retraining based on real-world data to provide more accurate predictions.

Figure 15:
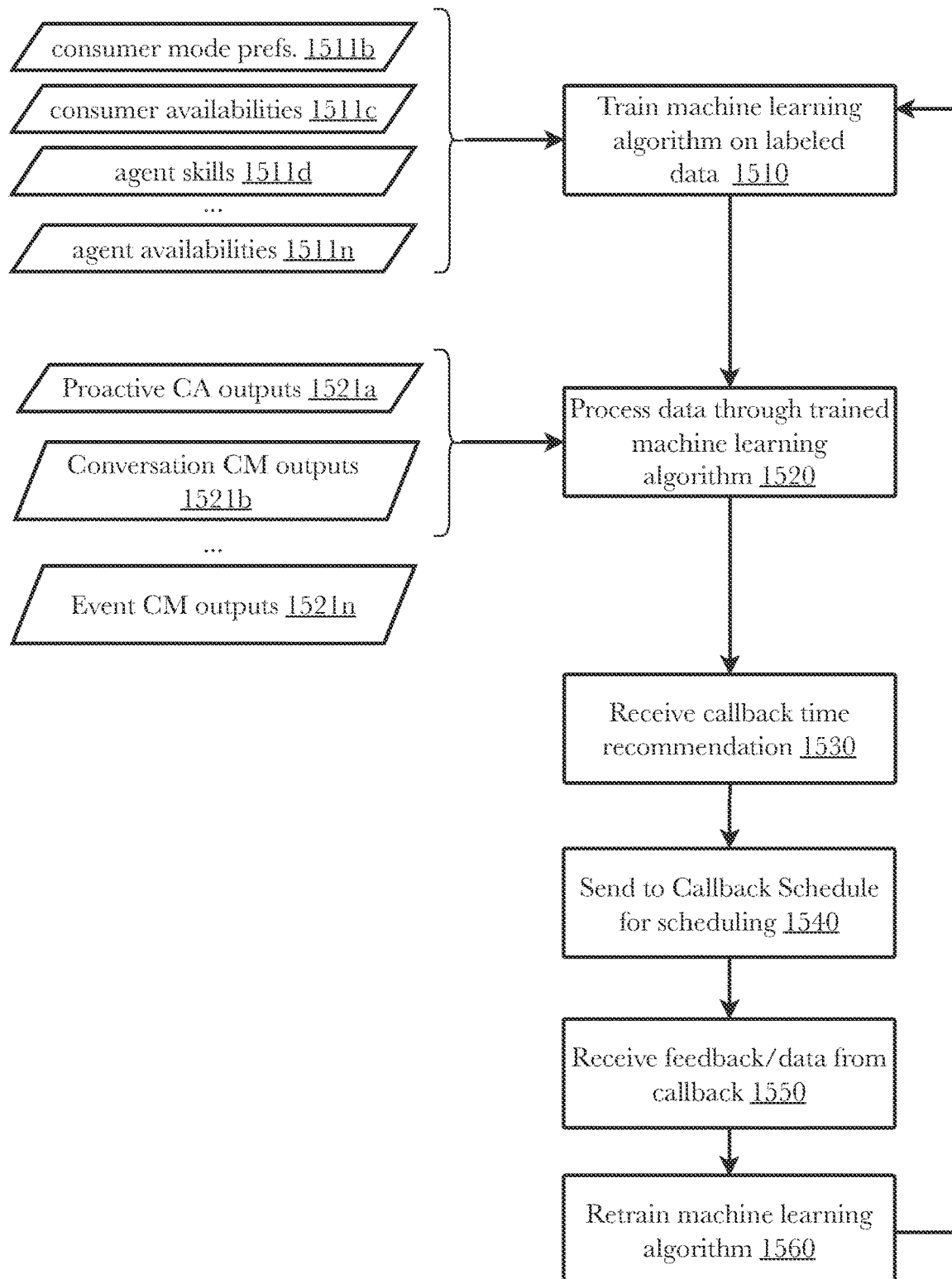
FIG. 15 is a flow diagram illustrating an exemplary method for training and operation of machine learning algorithms for callback planning.

FIG. 15 is a flow diagram illustrating an exemplary method for training and operation of machine learning algorithms for callback planning. In this example, it is assumed that a supervised machine learning algorithm (MLA) is being used, but in other embodiments, unsupervised machine learning algorithms or reinforcement machine learning algorithms may be used if better suited to the analyses being performed. Here, the machine learning algorithm is trained 1510 on labeled data such as consumer mode preferences 1511*b*, consumer availabilities 1511*c*, agent skills 1511*d*, and agent availabilities 1511*n*. Once the MLA has been trained, actual data is processed 1520 through the trained machine learning algorithm such as proactive conversation analysis outputs 1521*a*, conversation context manager outputs 1521*b*, and event context manager outputs 1521*n*. The MLA outputs a recommendation regarding a callback time 1530 with the consumer, and the recommendation is sent to the callback scheduler for scheduling 1540. As feedback data is received from the callback 1550, it may be used to retrain the machine learning algorithm 1560. Over time, the MLA will adapt its outputs to the retraining based on real-world data to provide more accurate predictions.

Figure 16:
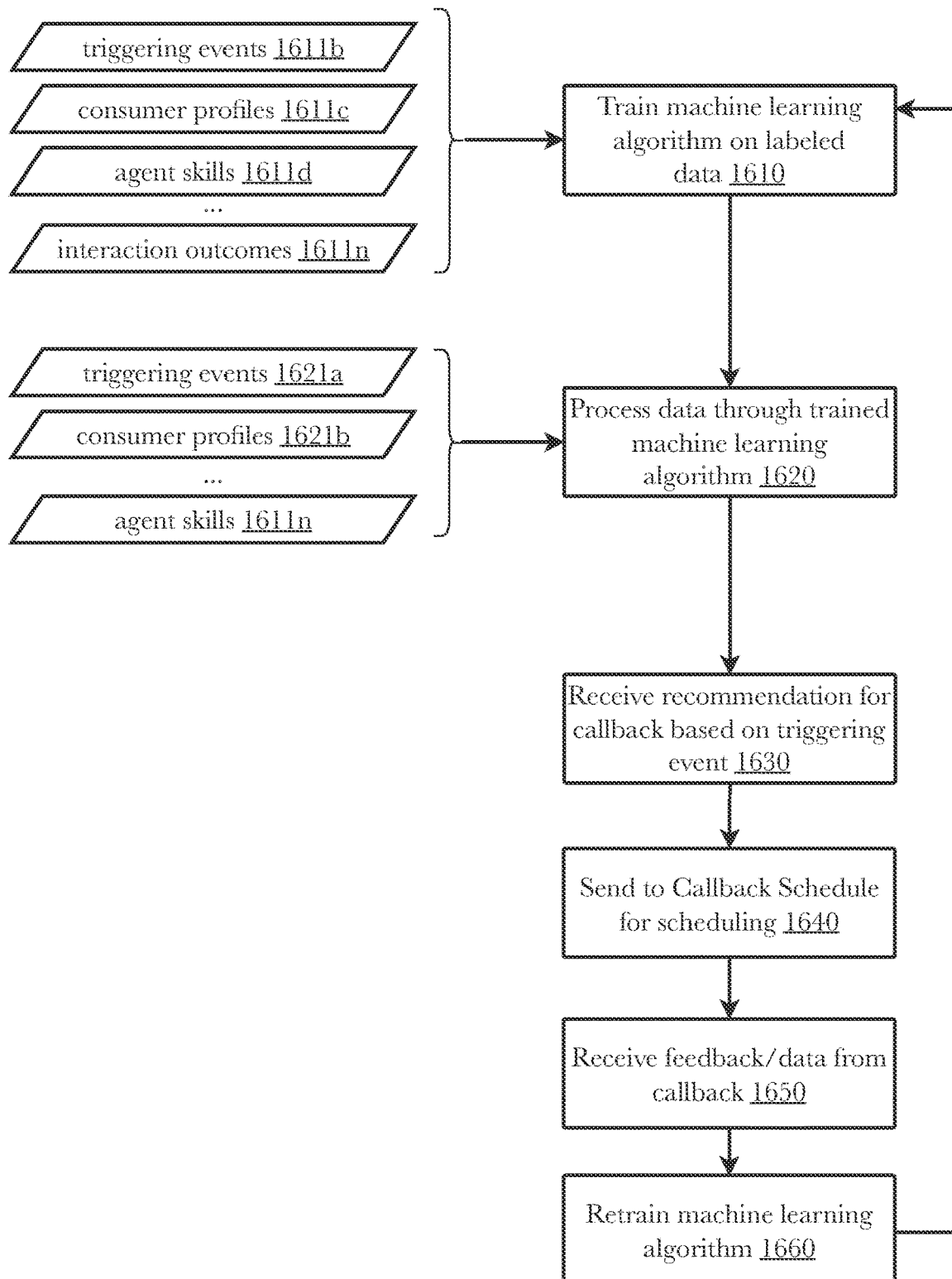
FIG. 16 is a flow diagram illustrating an exemplary method for training and operation of machine learning algorithms for event context analysis.

FIG. 16 is a flow diagram illustrating an exemplary method for training and operation of machine learning algorithms for event context analysis. In this example, it is assumed that a supervised machine learning algorithm (MLA) is being used, but in other embodiments, unsupervised machine learning algorithms or reinforcement machine learning algorithms may be used if better suited to the analyses being performed. Here, the machine learning algorithm is trained 1610 on labeled data such as triggering events 1611*b*, consumer profile information 1611*c*, agent skills 1611*d*, and interaction outcomes from the above 1611*n*. Once the MLA has been trained, actual data is processed 1620 through the trained machine learning algorithm such as triggering events 1621*a* from the event manager, consumer profile data 1621*b*, and available agent skills 1611*n*. The MLA outputs a recommendation for a callback based on the triggering event 1630, and the recommendation is sent to the callback scheduler to schedule a callback 1640. As feedback data is received from the callback 1650, it may be used to retrain the machine learning algorithm 1660. Over time, the MLA will adapt its outputs to the retraining based on real-world data to provide more accurate predictions.

Figure 17:
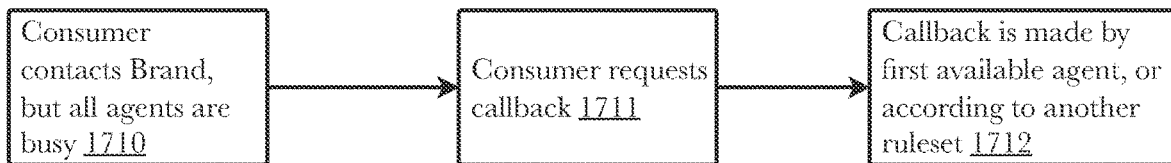
FIG. 17 is a flow diagram illustrating an exemplary use case examples for an adaptive cloud conversation platform.
Figure 17:
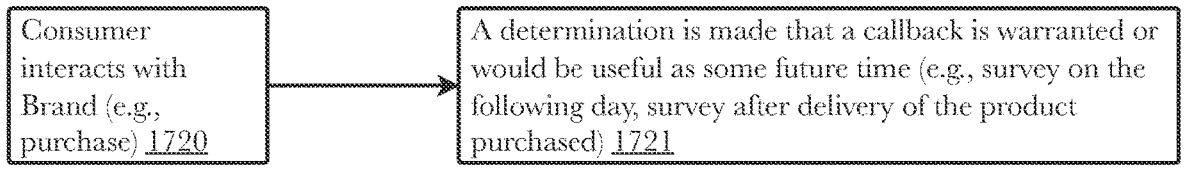
Figure 17:
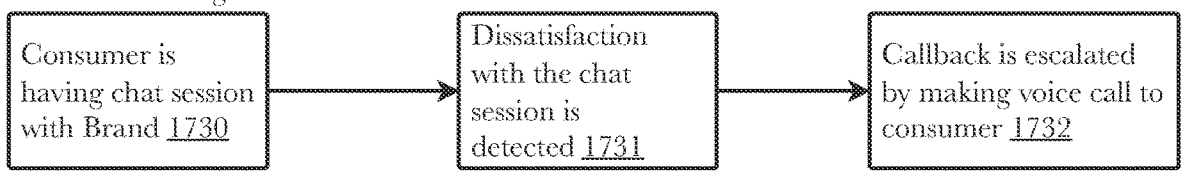
Figure 17:
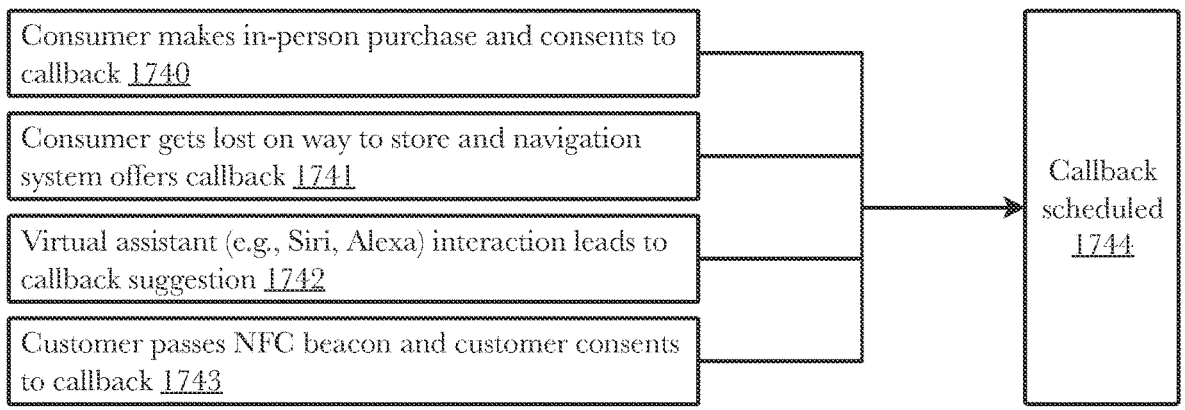
Figure 17:
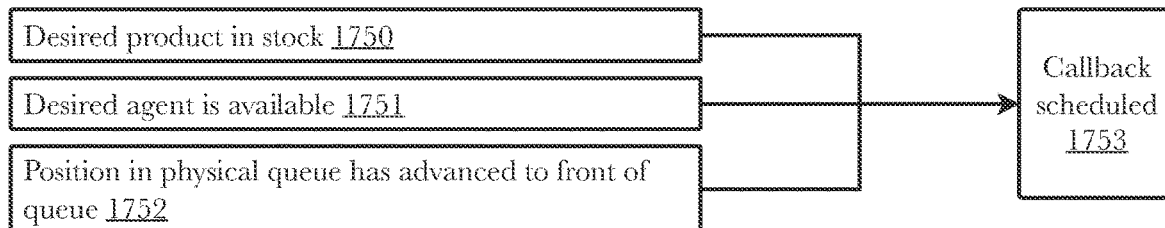

FIG. 17 is a flow diagram illustrating an exemplary use case examples for an adaptive cloud conversation platform. In a standard callback scenario 1710, a consumer may request a callback based on a failed or delayed contact with a brand 1711 (e.g., being put on hold prior to speaking with an agent), and a callback is made either by the first available agent or according to another rule 1712. In a proactive conversation scenario 1720, the consumer may interact with the brand in some way (e.g., by making a purchase) that is entered into the brand environment database. A determination is made that a callback is warranted or would be useful as some future time (e.g., survey on the following day, survey after delivery of the product purchased) 1721. In a media-switching callback scenario 1730, a consumer might be having an active chat session with a brand and the session context manager detects dissatisfaction with the call due to negative sentiment 1731. The chat session is escalated to a voice-based callback to mitigate the negative impact of the dissatisfying chat session 1732. In a consumer event-based callback scenario, a consumer takes some action which generates a callback event such as making an in-person purchase and consenting to a callback at a later time 1740; getting lost on the way to a store, wherein the navigation system detects the off-route driving and offers a callback 1741; communicating with a virtual assistant such as Siri or Alexa, wherein the forwarding of the interaction from the bot interface manager 740 leads to a callback 1742; or a consumer passes by a near field communication (NFC) beacon on a physical display at a store, and consents to a callback sent to the consumer's mobile device by the beacon 1743. In each of these circumstances, a callback is scheduled using the callback scheduler 1744. In a rule-based callback scenario, some pre-established rule triggers a callback such as when a desired product is in stock 1750, when a desired agent is available 1751, or when the consumer's position in a physical queue (e.g., at a restaurant that operates a queue notification system) has advanced to the front of the queue 1752. In each of these circumstances, a callback is schedules using the callback scheduler 1753. The above-listed examples are not intended to be limiting, and many other such use cases may be handled by the platform.

Figure 18:
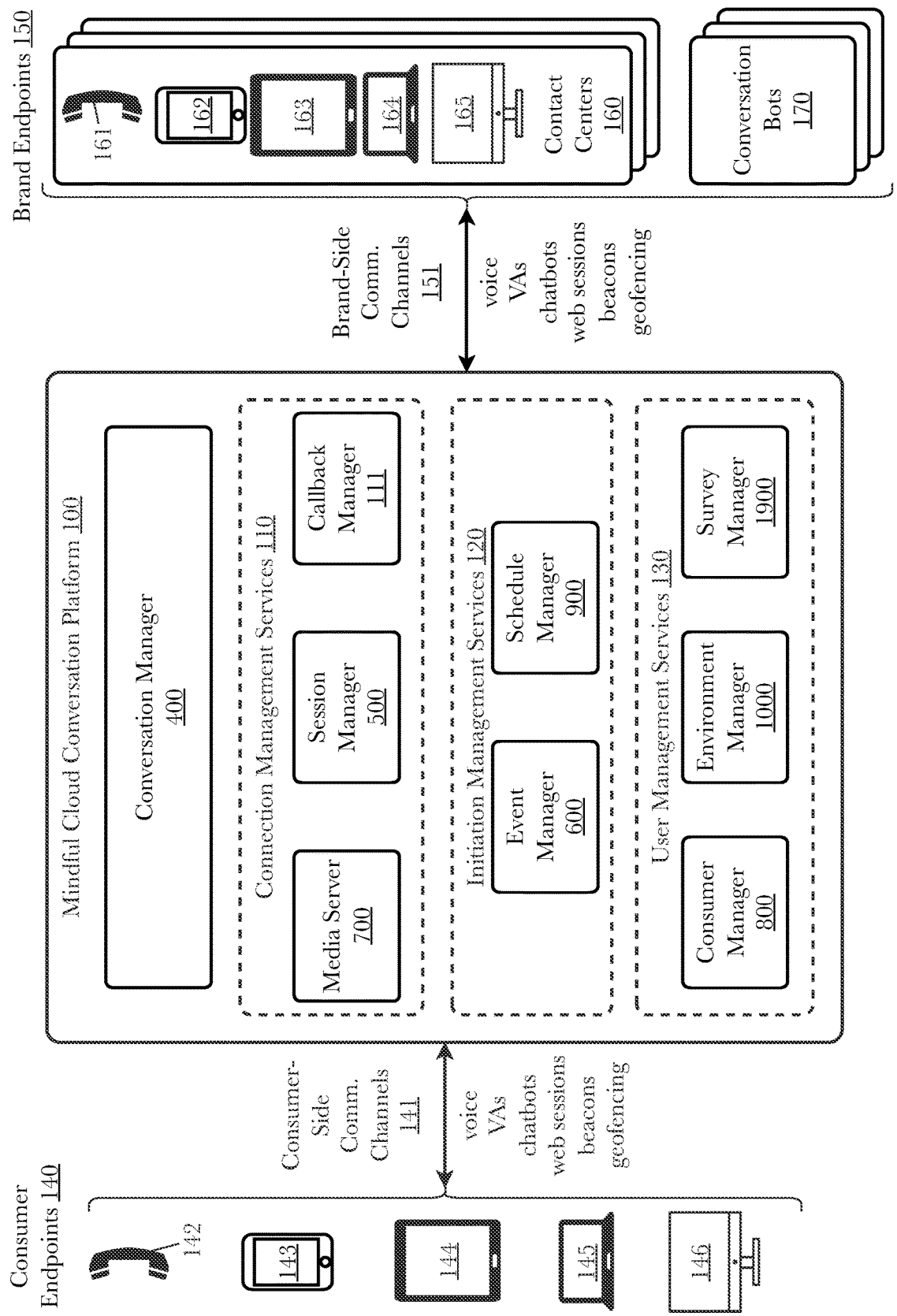
FIG. 18 is a block diagram illustrating an exemplary system architecture for an adaptive cloud conversation platform connected to brand endpoints comprising contact centers.

FIG. 18 is a block diagram illustrating an exemplary system architecture for an adaptive cloud conversation platform connected to brand endpoints comprising contact centers. The exemplary system architecture shown here is the same as that shown for FIG. 1, but with the addition of a conversation negotiation manager 2300. In this embodiment, conversation negotiation manager 2300 is a component of user management layer 130 of adaptive cloud conversation platform 100 and, as such, is capable of communicating with other components of adaptive cloud conversation platform 100, as has been previously described with respect to other components such as conversation manager 400, session manager 500, event manager 600, etc. Conversation negotiation manager 2300 determines when and how feedback from consumers should be requested in the form of surveys and determines when and how such feedback should result in downstream actions such as notifications to a brand manager or escalation to a supervising agent. Conversation negotiation manager 2300 may use machine learning algorithms to dynamically adapt survey strategies to meet certain fitness criteria such as improving the likelihood of obtaining a response, improving the quality of responses, or reducing consumer frustration. Such strategies may include, but are not limited to, changing the type of survey performed; changing the communication channel (s) through which the survey is performed; changing the time of performance of, or the time of invitation to, the survey; changing the questions asked in the survey; changing the order of the questions; and changing the wording of the questions.

Figure 19:
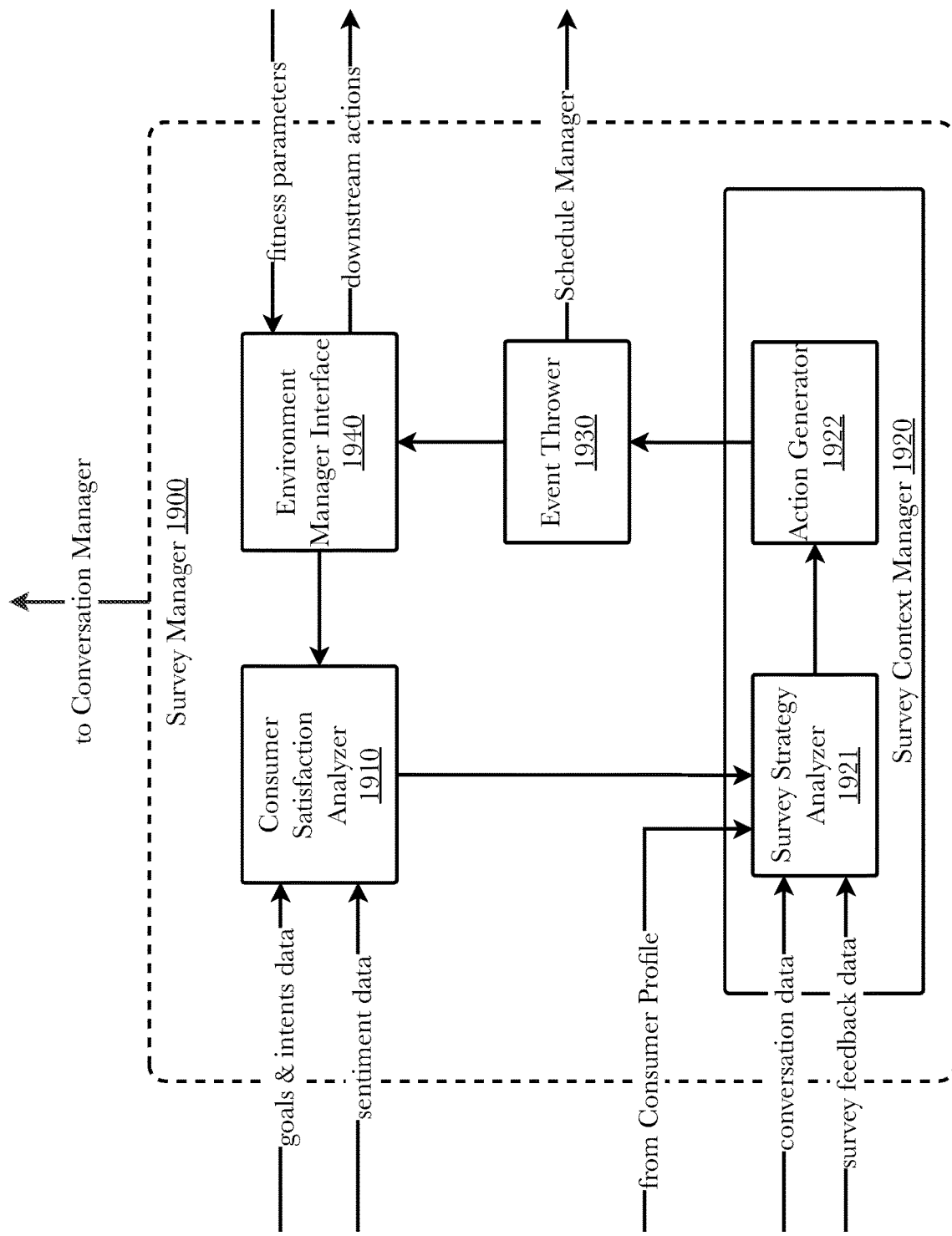
FIG. 19 is a block diagram illustrating an exemplary system architecture for a survey manager aspect of an adaptive cloud conversation platform.

FIG. 19 is a block diagram illustrating an exemplary system architecture for a survey manager aspect of an adaptive cloud conversation platform. In this embodiment, survey manager 1900 is a component of user management layer 130 of adaptive cloud conversation platform 100 and, as such, is capable of communicating with other components of adaptive cloud conversation platform 100, as has been previously described with respect to other components such as conversation manager 400, session manager 500, event manager 600, etc. Survey manager 1900 of this embodiment comprises a consumer satisfaction analyzer 1910, a survey context manager 1920, an event thrower 1930, and an environment manager interface 1940.

Survey manager 1900 determines when and how feedback from consumers should be requested in the form of surveys and determines when and how such feedback should result in downstream actions such as notifications to a brand manager or escalation to a supervising agent. Survey manager 1900 uses machine learning algorithms to dynamically adapt survey strategies to meet certain fitness criteria such as improving the likelihood of obtaining a response, improving the quality of responses, or reducing consumer frustration. Such strategies may include, but are not limited to, changing the type of survey performed; changing the communication channel(s) through which the survey is performed; changing the time of performance of, or the time of invitation to, the survey; changing the questions asked in the survey; changing the order of the questions; and changing the wording of the questions.

Surveys may be of many types including, but not limited to, conversational short message service (SMS) surveys in which questions are sent to the consumer via SMS and the consumer responds via SMS; web SMS surveys in which an invitation to complete a survey and a link to the survey are sent via SMS and the consumer responds by clicking on the link and completing a web-based survey; phone surveys in which the survey takes place via an audio call between the consumer and an agent; chat-based surveys in which the survey takes place via a text chat between the consumer and an agent, or between the consumer and a chatbot; email surveys in which an email is sent to the consumer either with questions to which the consumer can respond by reply email or with a link to a web-based survey; interactive voice response (IVR) surveys in which an outbound call is made to a consumer by an IVR or an inbound consumer's call is routed to an IVR configured to provide survey questions to the consumer via audio and to receive answers from the consumer via the phone keypad (e.g., dual-tone multi-frequency (DTMF) signals) or by speech from the consumer processed through speech-to-text (STT) processing; stand-alone web surveys to which the consumer may be connected after a website interaction such as completing a purchase online; surveys using application programming interfaces (APIs) to provide surveys through a standardized interface that can be integrated into websites, applications, and user interfaces.

Consumer satisfaction analyzer 1910 determines a level of consumer satisfaction. In this embodiment, consumer satisfaction analyzer 1910 received goals and intents data from conversation manager 400 and sentiment data either from session manager 500 or from stored sentiment data from prior interactions. The sentiment data provides a direct indication of satisfaction related to a session, a conversation, a product, overall satisfaction with a brand, or other aspect of a consumer-brand relationship. The sentiment data may be compared with the goals and intents data to obtain a further indirect indication of satisfaction with the session, conversation, product, brand, or other aspect of a consumer-brand relationship. This can provide additional granularity in the determination of a consumer's satisfaction. For example, sentiment is typically analyzed on a discrete three-level scale (e.g., negative, neutral, or positive). If the consumer's sentiment data indicates a positive sentiment, this is a good indicator, but provides little additional information. However, if conversation manager 400 determines that the consumer's goal was to obtain repair of a product, and the brand replaced the product with a new one instead, it can be assumed that the brand exceeded the consumer's goal and a modifier can be added to the sentiment, such as "high" positive sentiment. Conversely, if conversation manager 400 determines that the consumer's goal was to obtain replacement of a product, and the brand repaired the product instead, it can be assumed that the brand fell short of the consumer's goal and a modifier can be added to the sentiment, such as "low" positive sentiment. Likewise, consumer satisfaction analyzer 1910 may receive fitness parameters from environment manager 1000 via environment manager interface. The consumer's determined satisfaction (e.g., "low" positive sentiment) can be further compared against fitness parameters (long-term consumer loyalty) to determine thresholds (brand's goal is minimum of "moderate" positive sentiment) for taking action such as requesting a survey from the consumer.

Survey context manager 1920 receives a determination of satisfaction from consumer satisfaction analyzer 1910 along with information from consumer profile database 820 such as the consumer profile, any relevant conversation data, and any previously obtained survey data, and recommends a strategy for surveying consumers based on the received data. The received data is processed by survey strategy analyzer 1921 to determine whether, when, and how to conduct a survey with the consumer to obtain relevant information about the consumer's satisfaction. Action generator 1922 generates recommended actions based on the outputs from survey strategy analyzer 1921. Survey context manager 1920 learns about the consumer's consumer potential responses to surveys by analyzing data such as satisfaction data produced by the consumer satisfaction analyzer 1910, information from the consumer's profile such as communication channel preferences and time of contact preferences, current and prior conversation data, and prior survey feedback data. Survey context manager 1920 uses machine learning algorithms to dynamically adapt survey strategies to meet certain fitness criteria such as improving the likelihood of obtaining a response, improving the quality of responses, or reducing consumer frustration. Such strategies may include, but are not limited to, changing the type of survey performed; changing the communication channel(s) through which the survey is performed; changing the time of performance of, or the time of invitation to, the survey; changing the questions asked in the survey; changing the order of the questions; and changing the wording of the questions. The training and operation of the machine learning algorithm is described later herein. The output of survey context manager 1920 may be fed to other components for actions to be taken (e.g., scheduling of a survey to determine a consumer's current satisfaction after a period of little or no contact from the consumer) or may be fed to the machine learning algorithms of other components for further analysis (e.g., to the conversation manager to determine the best mode of starting a conversation or session to implement the survey). In this way, the outputs of the machine learning algorithm(s) of each component of the platform may be acted on separately, or may be used as part of a network of machine learning algorithms, or some combination of the two.

Event thrower 1930 throws events to other platform components with instructions to schedule or establish communications with a consumer either associated with an existing conversation or a new conversation. Further, event thrower 1930 passes events related to downstream actions to environment manager interface for handling by environment manager 1000.

Environment manager interface 1940 receives fitness parameters from environment manager 1000 and passes them to consumer satisfaction analyzer 1910. Environment manager interface 1940 further receives events thrown by event thrower 1930 related to downstream actions generated by action generator 1922 and passes them to environment manager 1000. Downstream events are actions to be taken by brand such as sending notifications to a team or group at brand (e.g., via group messaging systems such as Slack, Microsoft® Teams, or brand-proprietary equivalents), sending notifications using native tools in an underlying consumer service (e.g., contact center as a service (CCAAS) platforms); creating a service request in a customer relationship management (CRM) platform; and notifying supervisors of managers via SMS, email, or other means.

Figure 20:
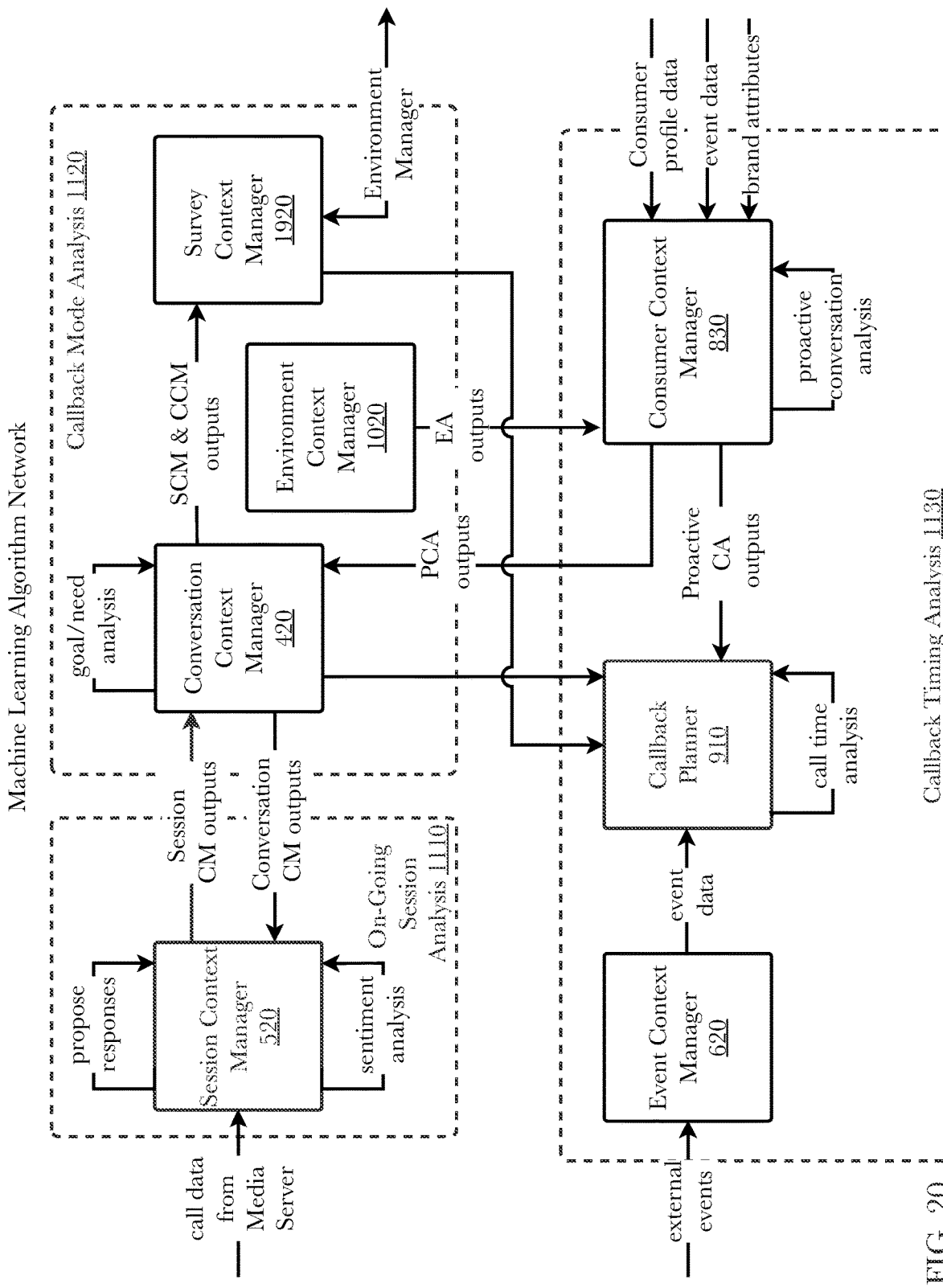
FIG. 20 is a block diagram illustrating an exemplary system architecture for a machine learning algorithm network aspect of an adaptive cloud conversation platform.

FIG. 20 is a block diagram illustrating an exemplary system architecture for a machine learning algorithm network aspect of an adaptive cloud conversation platform. The exemplary system architecture shown here is the same as that shown in FIG. 11, with the addition of a survey context manager 1920. In this embodiment, the survey context manager 1920 sentiment analyses (Session CM outputs) as a pass-through from conversation context manager 420 and goals/needs analyses (Conversation CM outputs) from conversation context manager 420, as well as fitness parameters from environment manager 1000. Survey context manager 1920 determines a level of consumer satisfaction from the sentiment analyses and goals/needs analyses, and uses machine learning algorithms to dynamically adapt survey strategies to the fitness criteria such as improving the likelihood of obtaining a response, improving the quality of responses, or reducing consumer frustration. Such strategies may include, but are not limited to, changing the type of survey performed; changing the communication channel(s) through which the survey is performed; changing the time of performance of, or the time of invitation to, the survey; changing the questions asked in the survey; changing the order of the questions; and changing the wording of the questions. The output of survey context manager 1920 may be fed to other components for actions to be taken (e.g., scheduling of a survey to determine a consumer's current satisfaction after a period of little or no contact from the consumer) or may be fed to the machine learning algorithms of other components for further analysis (e.g., to the conversation manager to determine the best mode of starting a conversation or session to implement the survey). In this way, the outputs of the machine learning algorithm(s) of each component of the platform may be acted on separately, or may be used as part of a network of machine learning algorithms, or some combination of the two.

The training and operation of the machine learning algorithm is described later herein. In some embodiments, the survey strategies may be generated from unsupervised machine learning algorithms or reinforcement machine learning algorithms rather than supervised (i.e., pre-trained) machine learning algorithms. An unsupervised machine learning algorithm learns from the data itself by association, clustering, or dimensionality reduction, rather than having been pre-trained to discriminate between labeled input data. Reinforcement learning algorithms learn from repeated iterations of outcomes based on probabilities with successful outcomes being rewarded. These types of machine learning algorithms are ideal for exploring large number of possible outcomes such as possible outcomes from different approaches to a conversation, and so would be suitable for proposing responses to consumer queries.

Figure 21:
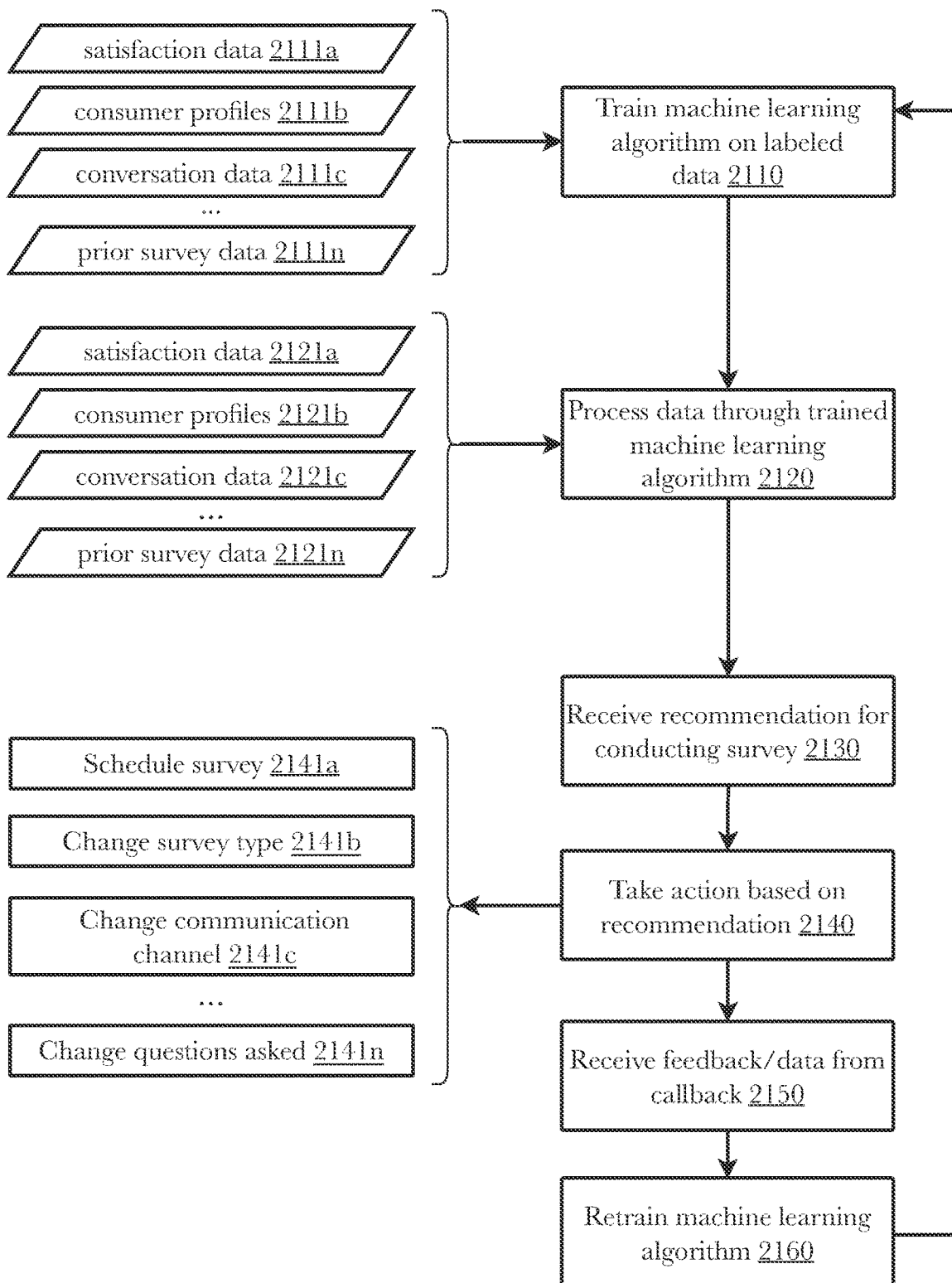
FIG. 21 is a flow diagram illustrating an exemplary method for training and operation of machine learning algorithms for survey context manager.

FIG. 21 is a flow diagram illustrating an exemplary method for training and operation of machine learning algorithms for survey context manager. In this example, it is assumed that a supervised machine learning algorithm (MLA) is being used, but in other embodiments, unsupervised machine learning algorithms or reinforcement machine learning algorithms may be used if better suited to the analyses being performed. Here, machine learning algorithm is trained 2110 on labeled data such as satisfaction data 2111*a*, consumer profile information 2111*b*, conversation and session data 2111*c*, and prior survey information 2111*n*. Once MLA has been trained, actual data is processed 2120 through trained machine learning algorithm such as satisfaction data 2121*a* from consumer satisfaction analyzer 2110, consumer profile data 2121*b*, and conversation and session data 2121*c*, and prior survey data 2111*n*. MLA outputs a strategy for conducting the survey 2130, and an action is taken based on the strategy 2140 such as scheduling a survey 2141*a*, changing the survey type 2141*b*, changing the channel of communication 2141*c*, changing the questions asked 2141*n*, etc. As feedback data is received from the callback 2150, it may be used to retrain the machine learning algorithm 2160. Over time, the MLA will adapt its outputs to the retraining based on real-world data to provide more accurate predictions.

Figure 22:
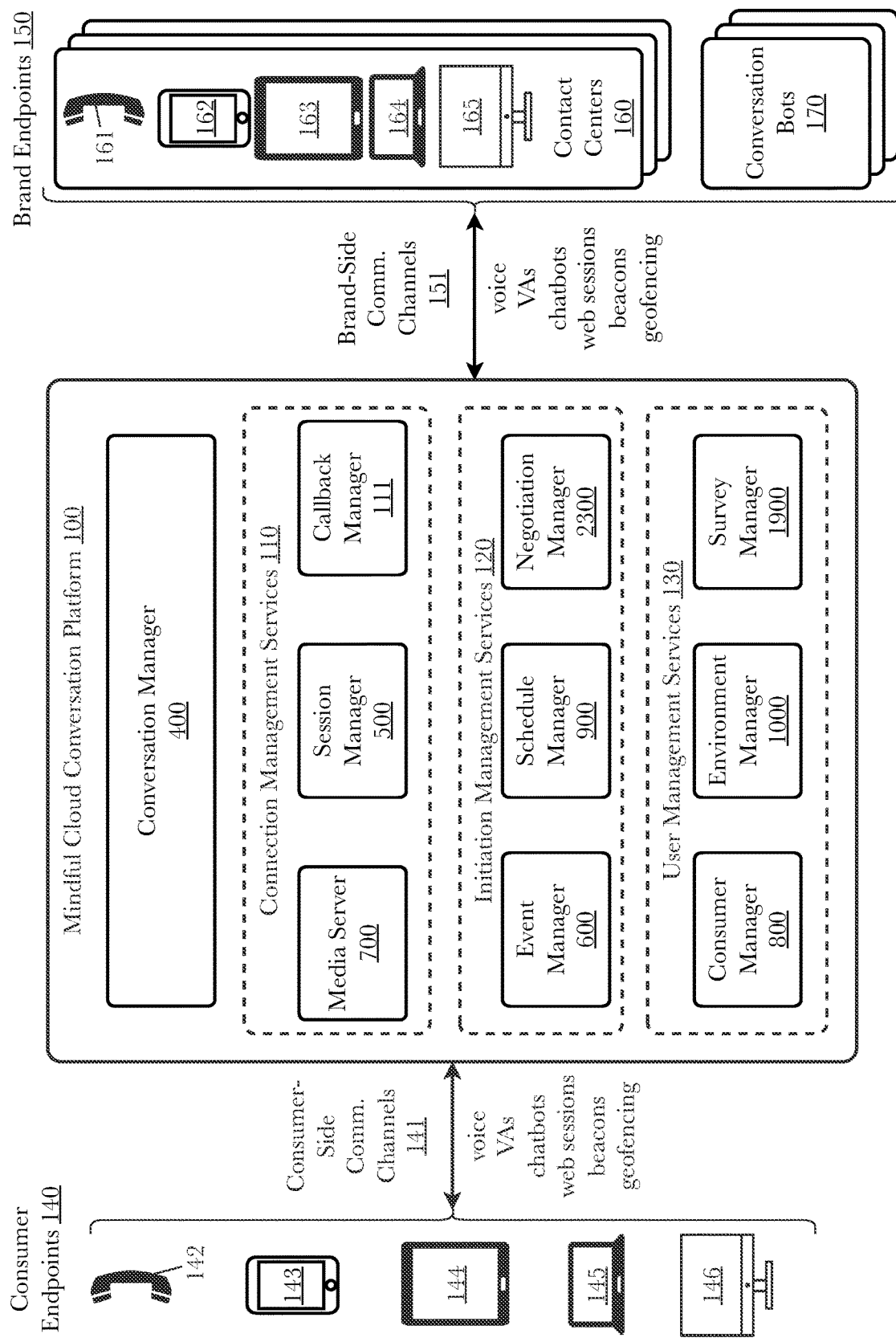
FIG. 22 is a block diagram illustrating an exemplary system architecture for an adaptive cloud conversation platform connected to brand endpoints comprising contact centers.

FIG. 22 is a block diagram illustrating an exemplary system architecture for an adaptive cloud conversation platform connected to brand endpoints comprising contact centers. The exemplary system architecture shown here is the same as that shown for FIG. 18, but with the addition of a conversation negotiation manager 2300. In this embodiment, conversation negotiation manager 2300 is a component of initiation management layer 120 of adaptive cloud conversation platform 100 and, as such, is capable of communicating with other components of adaptive cloud conversation platform 100, as has been previously described with respect to other components such as conversation manager 400, session manager 500, event manager 600, etc. Conversation negotiation manager 2300 is responsible for negotiating when, where, and how conversations and/or callbacks will be initiated between and consumer and brand. Conversation negotiation manager 2300 may use machine learning algorithms to implement behavioral artificial intelligence (behavioral AI) pairing to recommend matches between consumers and agents based on conversation data, consumer attributes, and agent attributes, with the goal of improved consumer satisfaction with the overall consumer experience (CX) or transaction experience (TX).

Figure 23:
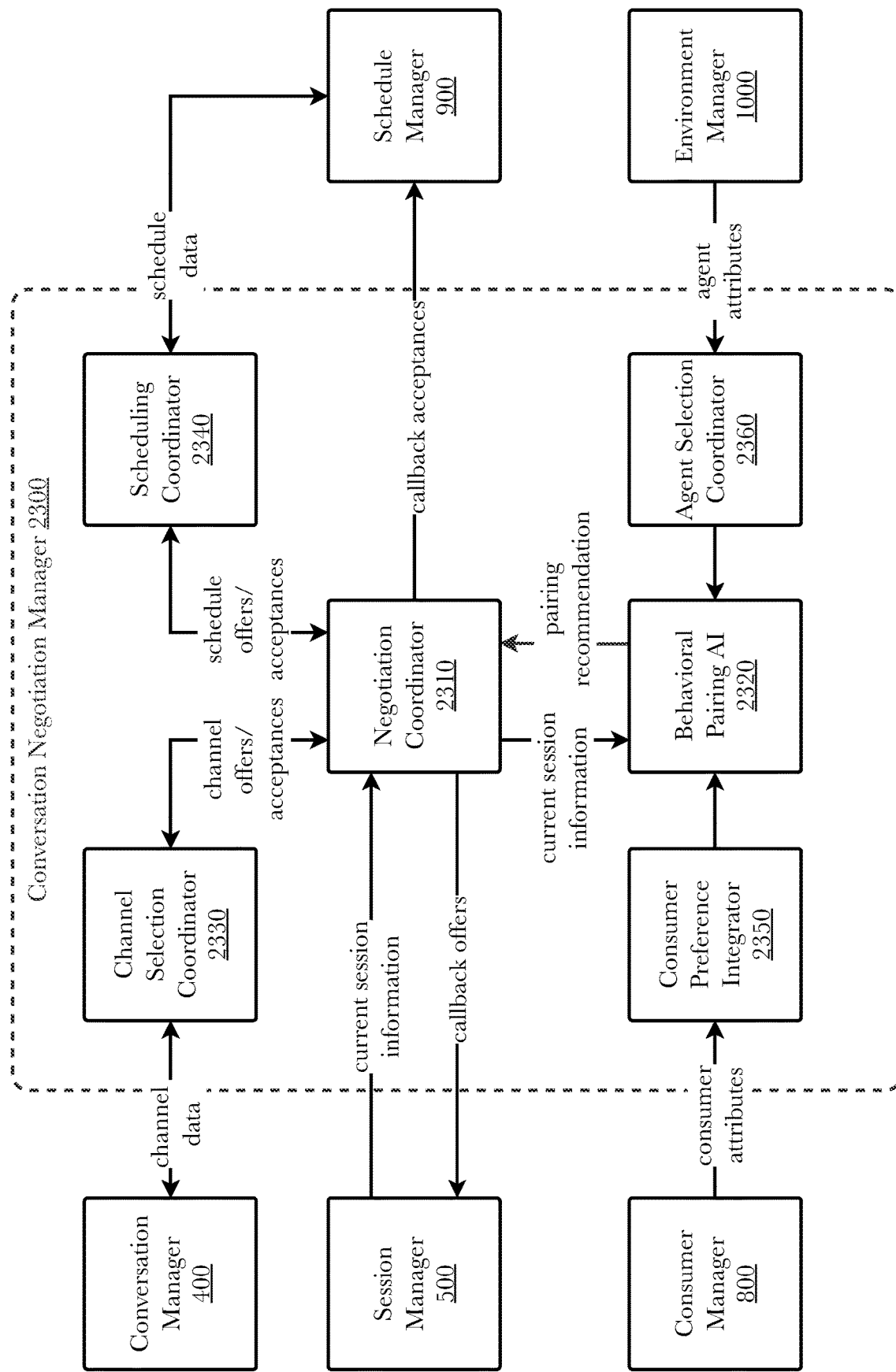
FIG. 23 is a block diagram illustrating an exemplary system architecture for a negotiated CX/TX aspect of an adaptive cloud conversation platform.

FIG. 23 is a block diagram illustrating an exemplary system architecture for a negotiated CX/TX aspect of an adaptive cloud conversation platform. The purpose of the negotiated overall consumer experience (CX) or transaction experience (TX) aspect is to provide an enhanced total consumer experience with callbacks being offered and/or negotiated based on the consumer's expressed or implied preferences plus a machine learning analysis of consumers, agents, and situations with similar attributes. Depending on configuration, the enhanced total consumer experience would include aspects such as having consumer preferences define available communication channels (for example, if a consumer prefers channels X, Y, and Z, those channels would be proactively pushed to the foreground and other channels would be suppressed); pre-population of attributes and information such as retrieving stored information from consumer profiles, feedback, and/or surveys to control the experience flow to better suit the consumer's needs and preferences while avoiding presentation of repetitive and redundant information to the consumer; and incorporation of agent attributes into the decision-making process such as scheduling and routing callbacks to preferred agents or agents with preferred attributes, scheduling callbacks around agent availability and consumer preferences, optionally using weighted values or making proactive callback offers with options for the consumer to choose (e.g., "Would you like to wait for callback with your preferred agent, or would you like for us to schedule an earlier call with an agent having similar attributes?") Negotiated consumer CA/TX callback offers may incorporate real-time queue information (e.g., "Your preferred agent is on a call, but should be available in X minutes.") and may incorporate information about an agent's activities beyond his or her hours of work such as detailed information on other scheduled callbacks.

The negotiation of the CX/TX experience is handled by a conversation negotiation manager 2300. In this embodiment, conversation negotiation manager 2300 is a component of initiation management layer 120 of adaptive cloud conversation platform 100 and, as such, is capable of communicating with other components of adaptive cloud conversation platform 100, as has been previously described with respect to other components such as conversation manager 400, session manager 500, event manager 600, etc. Conversation negotiation manager 2300 of this embodiment comprises a negotiation coordinator 2310, a behavioral pairing artificial intelligence (AI) engine 2320, a channel selection coordinator 2330, a scheduling coordinator 2340, a consumer preference integrator 2350, and an agent selection coordinator 2360.

Negotiation coordinator 2310 coordinates the recommendations from other components of the system for negotiation with the consumer. Negotiations are conducted via session manager 500, whereby current session information is received, incorporated into the various analyses by other components, and callback offers including the various recommendations are sent to the consumer for approval. Depending on the circumstances and configuration, each element of a callback may be negotiated separately (e.g., agent, channel, timing, etc.) or elements may be combined into a callback offer and sent for client approval as a package (e.g., a callback offer including a proposed agent, proposed channel, and proposed time). Consumer approvals or acceptances of callback offers are sent to schedule manager 900 for scheduling of a callback according to the callback parameters negotiated with the client.

Behavioral pairing artificial intelligence (AI) engine 2320 provides consumer/agent pairing recommendations using a machine learning algorithm that takes into consideration a variety of data about the conversation, the consumer, and agents, including data such as the current and past demeanor of the consumer and agent, the typical vocabulary used by the consumer and agent, the level of knowledge and/or expertise of the consumer and agent regarding the brand's products and services, the language(s) spoken by the consumer and agent, personality traits such as extroversion or introversion, tone of voice, loudness of voice, and the outcomes of previous interactions between a particular consumer and agent or similar consumers and agents. In this embodiment, the output of behavioral pairing AI engine 2320 is fed to negotiation coordinator 2310 for coordination of the pairing recommendation with outputs of other machine learning algorithms (e.g., a channel selection or communication mode output of conversation context manager 520, or a time of callback recommendation output of callback planner 911) for negotiation of callback parameters with consumer. In other embodiments, output of behavioral pairing AI engine 2320 may be fed to other components for actions to be taken (e.g., scheduling of a survey to determine a consumer's current satisfaction after a period of little or no contact from the consumer) or may be fed to the machine learning algorithms of other components for further analysis (e.g., to the conversation manager to determine the best mode of starting a conversation or session to implement the survey). In this way, the outputs of the machine learning algorithm(s) of each component of the platform may be acted on separately, or may be used as part of a network of machine learning algorithms, or some combination of the two.

Behavioral pairing AI engine 2320 may be further enhanced by taking into account agent-specific feedback for the purpose of queuing callbacks. For example, the customer may prefer speaking with a particular agent, or with an agent having specific attributes (e.g., agents that are experts in a particular field, agents that speak a particular language, dialect, regional dialect similar to that of the consumer; agents who have certain personality traits such as politeness, a cheerful disposition, etc.). Behavioral pairing AI engine 2320 will learn these consumer preferences based on feedback from pairings of consumers and agents having certain attributes. When a consumer provides feedback on the pairings recommended by behavioral pairing AI engine 2320 the pairing may be sent to the preferences to consumer manager 800 for storage in a given consumer's profile. Behavioral pairing AI engine 2320 will also learn which agents to avoid, such as those who have received negative feedback when paired with consumers having certain characteristics. In some embodiments, these consumer preferences may be directly expressed by the consumer (e.g., "I prefer to speak with agent X."), in which case processing through the behavioral pairing AI engine 2320 may be bypassed in favor of retrieving the preference from the consumer's profile. In some embodiments, combinations of stated and/or stored preferences may be combined with pairing recommendations from behavioral pairing AI engine 2320. For example, a consumer may state a preference for a callback within a specific time window. The analysis by behavioral pairing AI engine 2320 may then be constrained to only those agents available within that time window. If no agents with suitable attributes are available, a callback offer (negotiation) may be sent to the consumer to reschedule for a time when the preferred agent is available or with an offer to substitute another agent with similar attributes. In some embodiments, weighting may be used to give greater or lesser weight to certain aspects of the analysis (e.g., more weight given to the time preference than the agent preference).

The training and operation of the machine learning algorithm is described later herein. In some embodiments, pairing recommendations may be generated from unsupervised machine learning algorithms or reinforcement machine learning algorithms rather than supervised (i.e., pre-trained) machine learning algorithms. An unsupervised machine learning algorithm learns from the data itself by association, clustering, or dimensionality reduction, rather than having been pre-trained to discriminate between labeled input data. Reinforcement learning algorithms learn from repeated iterations of outcomes based on probabilities with successful outcomes being rewarded. These types of machine learning algorithms are ideal for exploring large number of possible outcomes such as possible outcomes from different approaches to a conversation, and so would be suitable for proposing responses to consumer queries.

Channel selection coordinator 2330 coordinates with conversation manager 400 or other components at connection management services 110 layer to select a communication channel or mode of communication with the consumer, as described above. Channel or mode of communication recommendations are sent to negotiation coordinator 2310 for negotiation of callback offers with client.

Scheduling coordinator 2340 coordinates with schedule manager 900 or other components at initiation management services 120 layer to select a time for communication with the consumer, as described above. Time of communication recommendations are sent to negotiation coordinator 2310 for negotiation of callback offers with client.

Consumer preference integrator 2350 coordinates with consumer manager 800 or other components at user management services 120 layer to obtain consumer attributes and other relevant behavioral data regarding the consumer for analysis by behavioral pairing AI 2320. Consumer attributes may be stored in a database such as consumer profile database 820. Consumer attributes may comprise such things as demeanor, vocabulary, language and/or dialects, knowledge of brand products/services, personality traits such as extroversion or introversion, tone of voice, loudness of voice, etc. Pairing recommendations are sent to negotiation coordinator 2310 for negotiation of callback offers with client.

Agent selection coordinator 2360 coordinates with environment manager 1000 or other components at user management services 120 layer to obtain agent attributes and other relevant behavioral data regarding the agent and/or brand for analysis by behavioral pairing AI 2320. Agent attributes may be stored in an agent profile database which may be included, for example, within brand environment database 1050. Agent attributes may comprise such things as demeanor, vocabulary, language and/or dialects, knowledge of brand products/services, personality traits such as extroversion or introversion, tone of voice, loudness of voice, skill in reducing conflict, etc. Pairing recommendations are sent to negotiation coordinator 2310 for negotiation of callback offers with client.

Figure 24:
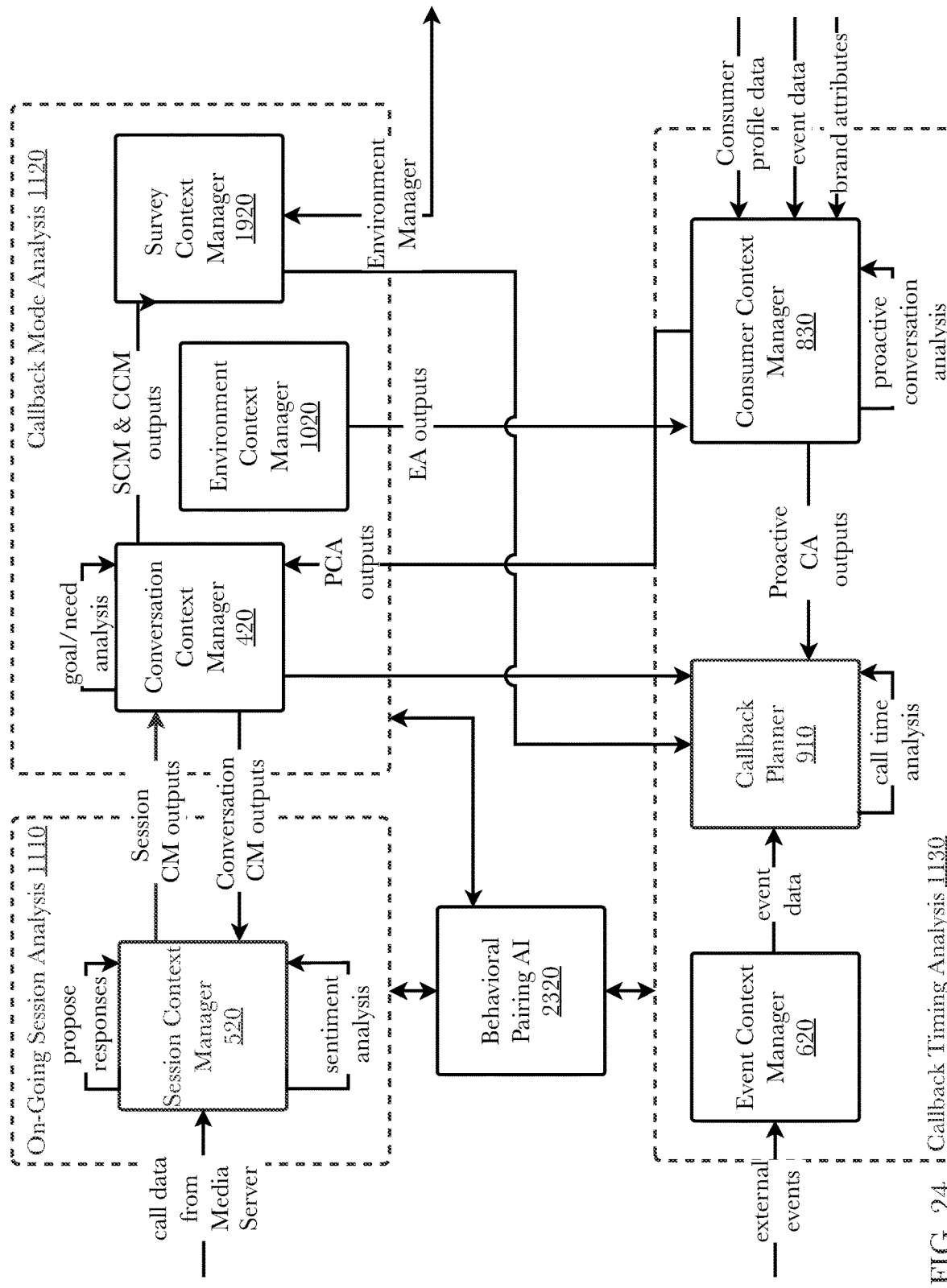
FIG. 24 is a block diagram illustrating an exemplary system architecture for a machine learning algorithm network aspect of an adaptive cloud conversation platform.

FIG. 24 is a block diagram illustrating an exemplary system architecture for a machine learning algorithm network aspect of an adaptive cloud conversation platform. The exemplary system architecture shown here is the same as that shown in FIG. 20, with the addition of a behavioral pairing artificial intelligence (AI) engine 2320. In this embodiment, the behavioral pairing AI engine 2320 recommends a consumer/agent pairing based on situational attributes, consumer attributes, and agent attributes. Here, the pairing recommendations provided by behavioral pairing AI engine 2320 may be applied to callback recommendations made at any other stage of the process including on-going session analysis 1110, callback mode analysis 1120, and callback timing analysis 1130, so behavioral pairing AI engine 2320 is shown in this diagram as being independent from those stages.

Behavioral pairing AI engine 2320 provides consumer/agent pairing recommendations using a machine learning algorithm that takes into consideration a variety of data about the conversation, the consumer, and agents, including attributes such as the current and past demeanor of the consumer and agent, the typical vocabulary used by the consumer and agent, the level of knowledge and/or expertise of the consumer and agent regarding the brand's products and services, the language(s) spoken by the consumer and agent, personality traits such as extroversion or introversion, tone of voice, loudness of voice, and the outcomes of previous interactions between a particular consumer and agent or similar consumers and agents. The output of behavioral pairing AI engine 2320 may be fed to other components for actions to be taken (e.g., scheduling of a survey to determine a consumer's current satisfaction after a period of little or no contact from the consumer) or may be fed to the machine learning algorithms of other components for further analysis (e.g., to the conversation manager to determine the best mode of starting a conversation or session to implement the survey). In this way, the outputs of the machine learning algorithm(s) of each component of the platform may be acted on separately, or may be used as part of a network of machine learning algorithms, or some combination of the two.

Behavioral pairing AI engine 2320 may be further enhanced by taking into account agent-specific feedback for the purpose of queuing callbacks. For example, the customer may prefer speaking with a particular agent, or with an agent having specific attributes (e.g., agents that are experts in a particular field, agents that speak a particular language, dialect, regional dialect similar to that of the consumer; agents who have certain personality traits such as politeness, a cheerful disposition, etc.). Behavioral pairing AI engine 2320 will learn these consumer preferences based on feedback from pairings of consumers and agents having certain attributes. When a consumer provides feedback on the pairings recommended by behavioral pairing AI engine 2320 the pairing may be sent to consumer manager 800 for storage in a given consumer's profile. Behavioral pairing AI engine 2320 will also learn which agents to avoid, such as those who have received negative feedback when paired with consumers having certain characteristics. In some embodiments, these consumer preferences may be directly expressed by the consumer (e.g., "I prefer to speak with agent X."), in which case processing through the behavioral pairing AI engine 2320 may be bypassed in favor of retrieving the preference from the consumer's profile. In some embodiments, combinations of stated and/or stored preferences may be combined with pairing recommendations from behavioral pairing AI engine 2320. For example, a consumer may state a preference for a callback within a specific time window. The analysis by behavioral pairing AI engine 2320 may then be constrained to only those agents available within that time window. If no agents with suitable attributes are available, a callback offer (negotiation) may be sent to the consumer to reschedule for a time when the preferred agent is available or with an offer to substitute another agent with similar attributes. In some embodiments, weighting may be used to give greater or lesser weight to certain aspects of the analysis (e.g., more weight given to the time preference than the agent preference).

The training and operation of the machine learning algorithm is described later herein. In some embodiments, pairing recommendations may be generated from unsupervised machine learning algorithms or reinforcement machine learning algorithms rather than supervised (i.e., pre-trained) machine learning algorithms. An unsupervised machine learning algorithm learns from the data itself by association, clustering, or dimensionality reduction, rather than having been pre-trained to discriminate between labeled input data. Reinforcement learning algorithms learn from repeated iterations of outcomes based on probabilities with successful outcomes being rewarded. These types of machine learning algorithms are ideal for exploring large number of possible outcomes such as possible outcomes from different approaches to a conversation, and so would be suitable for proposing responses to consumer queries.

Figure 25:
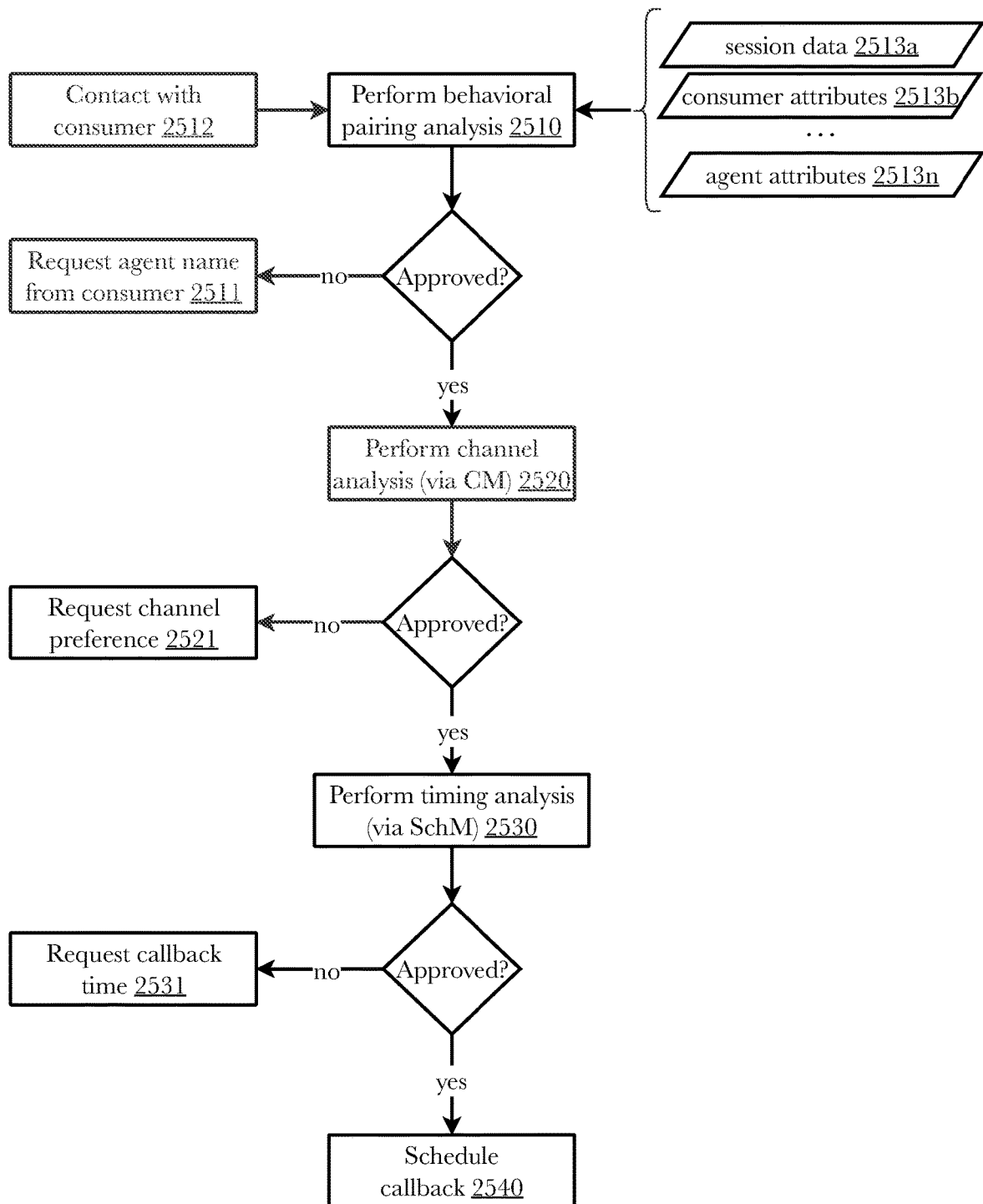
FIG. 25 is a flow diagram illustrating an exemplary process for negotiated CX/TX management with behavioral pairing analysis.

FIG. 25 is a flow diagram illustrating an exemplary process for negotiated CX/TX management with behavioral pairing analysis. The exemplary process shown here is necessarily simplified for clarity, but provides a basic outline of a negotiated CX/TX experience with a consumer. In response to a contact with a consumer 2512, a behavioral pairing analysis is performed 2510 for the purpose of pairing the consumer with a compatible agent. The behavioral pairing analysis is performed by a machine learning algorithm trained to consider a variety of data about the conversation, the consumer, and agents, including data such as the current and past demeanor of the consumer and agent, the typical vocabulary used by the consumer and agent, the level of knowledge and/or expertise of the consumer and agent regarding the brand's products and services, the language(s) spoken by the consumer and agent, personality traits such as extroversion or introversion, tone of voice, loudness of voice, and the outcomes of previous interactions between a particular consumer and agent or similar consumers and agents. In this example, inputs to the behavioral pairing analysis 2510 comprise session data 2513a such as that retrievable from session manager 500, consumer attributes 2513b such as that retrievable from consumer manager 800, and agent attributes 2513n such as that retrievable from environment manager 1000. A consumer/agent pairing recommendation from the behavioral pairing analysis 2510 is offered to the consumer for approval. If the recommendation is rejected, the consumer is asked to provide the name of a preferred agent to handle the callback 2511. If the recommendation is accepted, the process proceeds to a channel selection analysis 2520 such as that previously described for conversation manager 500. A channel recommendation from the channel selection analysis 2520 is offered to the consumer for approval. If the recommendation is rejected, the consumer is asked to provide a preferred communication channel for the callback 2521. If the recommendation is accepted, the process proceeds to a callback timing analysis 2530 such as that previously described for schedule manager 900. A callback timing recommendation from the callback timing analysis 2530 is offered to the consumer for approval. If the recommendation is rejected, the consumer is asked to provide a preferred time for the callback 2531. If the recommendation is accepted, the process proceeds to scheduling of the callback 2540 via the schedule manager 900. In some embodiments, the recommendations for pairing, channel, and timing may be combined into a single callback offer (e.g., a text message to consumer asking: "Would you like a callback from agent X via phone tomorrow at 9 am?") which may be accepted by consumer or may be responded to by consumer with a counter-offer (e.g., a text message response from consumer stating: "Let's make it 10 am."). Many other such interactions are possible in the negotiated CX/TX experience and these examples are not intended to be limiting.

Figure 26:
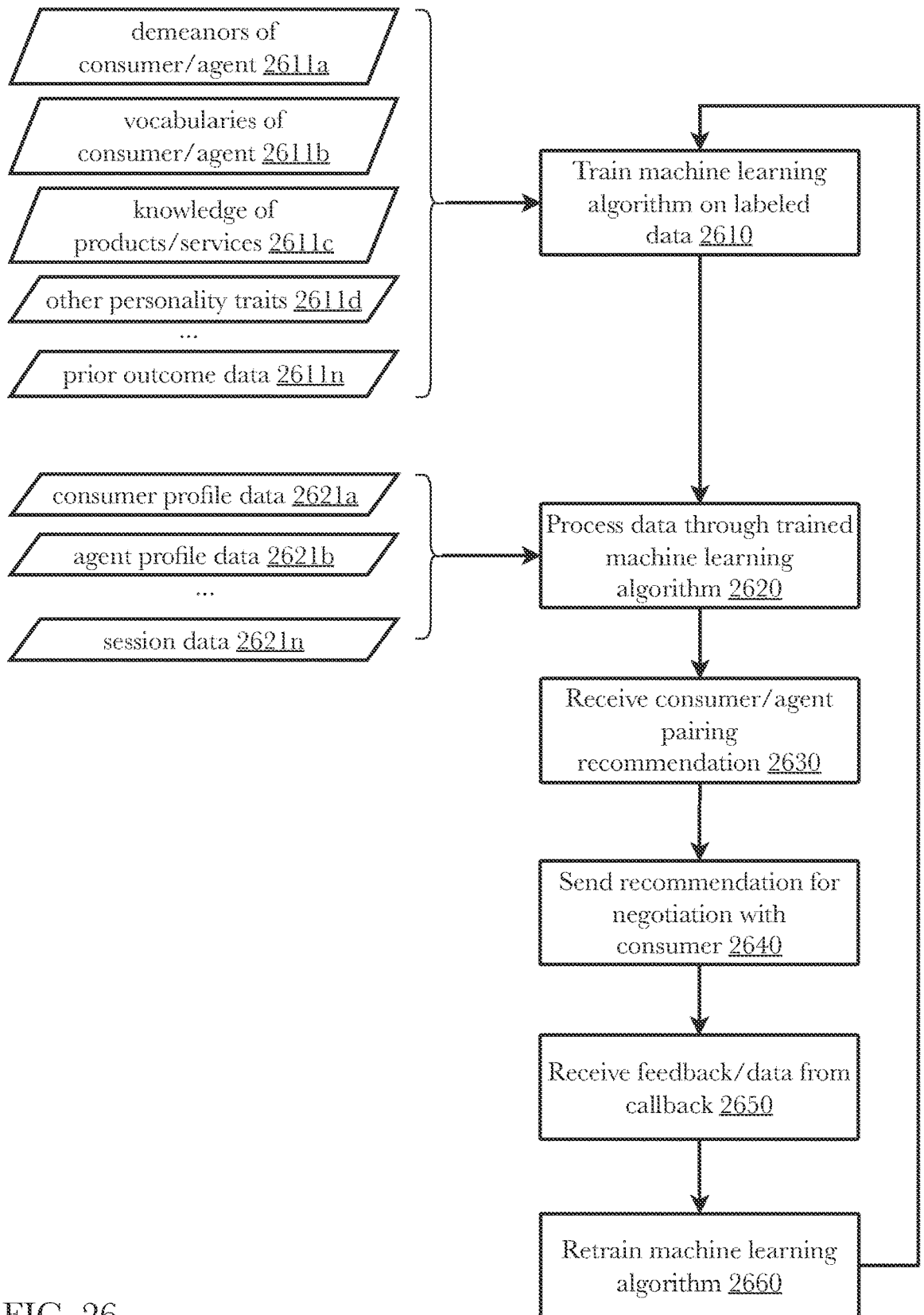
FIG. 26 is a flow diagram illustrating an exemplary method for training and operation of machine learning algorithms for survey context manager.

FIG. 26 is a flow diagram illustrating an exemplary method for training and operation of machine learning algorithms for behavioral pairing. In this example, it is assumed that a supervised machine learning algorithm (MLA) is being used, but in other embodiments, unsupervised machine learning algorithms or reinforcement machine learning algorithms may be used if better suited to the analyses being performed. Here, machine learning algorithm is trained 2610 on labeled data such as demeanors of consumer/agent 2611a, vocabularies of consumer/agent 2611b, consumer/agent knowledge of the brand's products and services 2611c, other personality traits of consumer/agent 2611d such as moods, languages and dialects, etc., and outcome data from prior interactions between consumers and agents with certain attributes 2611n. Once MLA has been trained, actual data is processed 2620 through trained machine learning algorithm such as consumer profile data 2621a and agent profile data 2621b, and session data 2621n such as the products or services about which the consumer is calling. MLA outputs a recommended agent for pairing with consumer 2630 for this interaction or a callback to be scheduled for later, and the recommendation is negotiated with consumer (e.g., "Agent X is a specialist in this type of inquiry. Would you like to speak with Agent X?") 2640. As feedback data is received from the callback 2650, it may be used to retrain the machine learning algorithm 2660. Over time, the MLA will adapt its outputs to the retraining based on real-world data to provide more accurate predictions.

Figure 27:
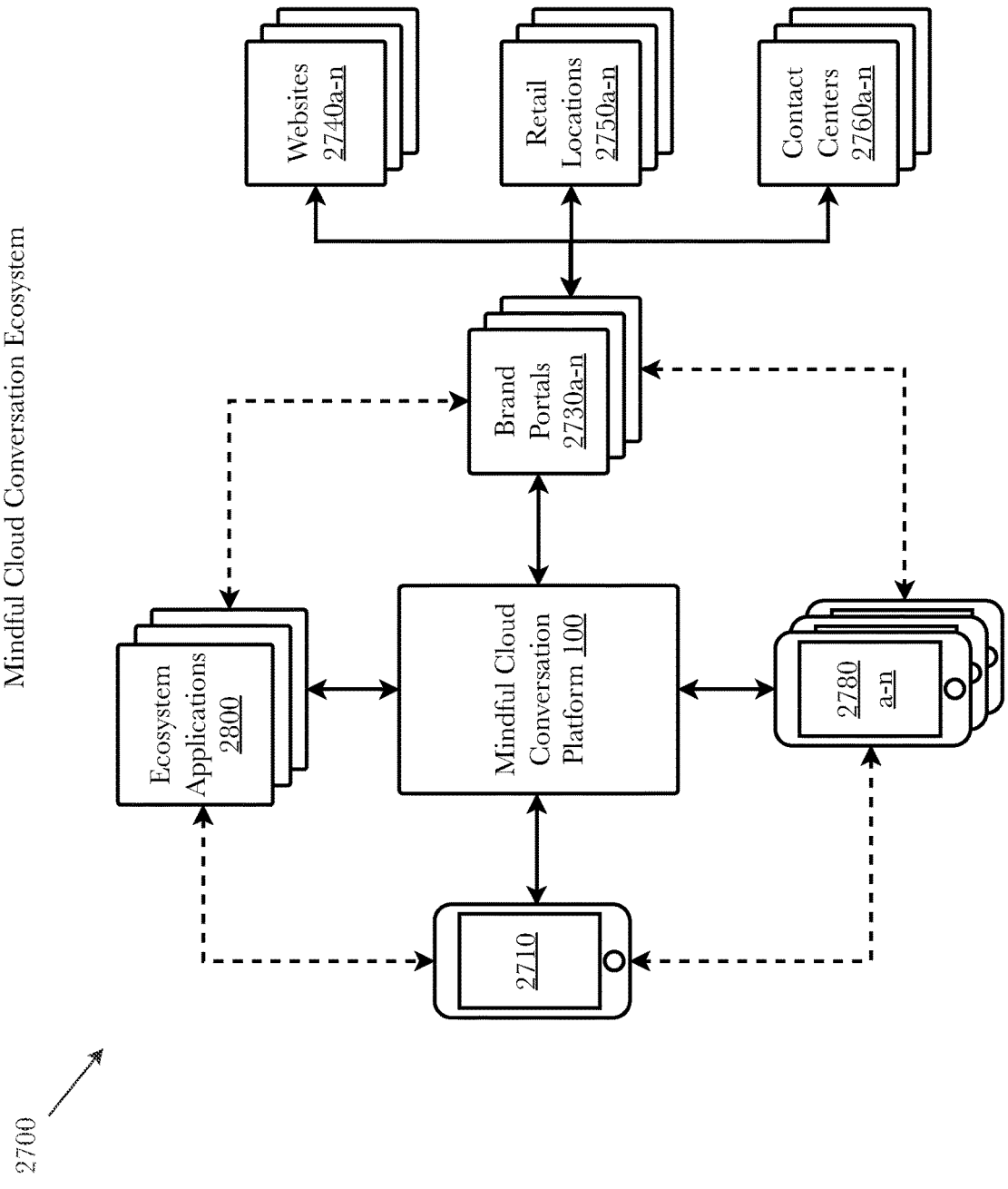
FIG. 27 is a block diagram illustrating an exemplary system architecture for an adaptive cloud conversation ecosystem comprising an adaptive cloud conversation platform.

FIG. 27 is a block diagram illustrating an exemplary system architecture for an adaptive cloud conversation ecosystem 2700 comprising an adaptive cloud conversation platform 100. Adaptive cloud conversation ecosystem 2700 is an expansion of adaptive cloud conversation platform 100 to include edge computing in which consumer devices 2710, 2780a-n act as distributed computing extensions of adaptive cloud conversation platform 100. In this way, not only can consumer devices 2710, 2780a-n communicate directly with one another to more efficiently allocate data within adaptive cloud conversation ecosystem 2700, but can also add to the computing power of adaptive cloud conversation platform 100 by performing certain processing on consumer devices 2710, 2780a-n and integrating that processing with processing on adaptive cloud conversation platform 100. Adaptive cloud conversation ecosystem further comprises a plurality of compatible applications 2800 installable on consumer devices 2710, 2780a-n which expand the capabilities of platform 100, allowing for certain activities to be performed offline and later coordinated with platform 100.

In this embodiment, adaptive cloud conversation ecosystem 2700 comprises adaptive cloud conversation platform 100, a first consumer device 2710 running an adaptive ecosystem application 2800, a plurality of other consumer devices 2780a-n each running an adaptive ecosystem application 2800, and a plurality of brand portals 2730a-n each comprising operations involving one or more websites, retail locations, contact centers, or any combination of the above.

First consumer device 2710 may be any type of computing device (e.g., desktop computer, laptop computer, mobile phone, tablet computer, etc.), but in this example is assumed to be a mobile phone capable of cellular data communications in addition to other wireless communication technologies (e.g., WiFi, Bluetooth) such that first consumer device 2710 can maintain a wireless data connection with adaptive cloud conversation ecosystem from a broad range of locations. First consumer device 2710 has software or firmware installed comprising an adaptive ecosystem application 2800 which allows for integration with adaptive cloud conversation platform 100, expanding the capabilities of platform 100 and allowing for greater functionality for both consumers and brands. First consumer device 2710 may communicate directly with other consumer devices 2780a-n, and/or brand portals 2730a-n to more efficiently allocate data within ecosystem. For example, rather than have all ecosystem 2700 data pass through adaptive cloud conversation platform 100, it may be more efficient to have consumer device 2710 communicate directly with brand portals 2730a-n to obtain certain information, process it on consumer device 2710, and communicate the outcome of the communication and processing to platform 100. This example of edge computing would reduce or eliminate data bottlenecks caused by bandwidth or processing limitations associated with platform 100, and expands the processing power of platform 100 as a result of having certain processing performed on consumer device 2710 instead of on platform 100. Having the same edge computing process apply to a large number of other consumer devices 2780a-n creates a distributed computing network that avoids the need for all processing to occur at a central location such as platform 100. Many separate computing processes can be offloaded to other consumer devices 2780a-n, and/or brand portals 2730a-n, and larger computing processes can be distributed to these devices and processed as parallel computing processes. In some embodiments, the entire functionality of adaptive cloud computing platform 100 can be distributed among these devices on a peer-to-peer basis such that a separate computing device or server for adaptive cloud computing platform 100 is not required.

Adaptive ecosystem applications 2800 expand on the capabilities of platform by providing context-specific utility (e.g., concierge and/or personal helper applications, shopping applications, health & fitness applications, medical help application, real estate applications, etc.) that are compatible with platform 100 and therefore capable of taking advantage of the platform's 100 adaptive conversation capabilities, such establishment of a single account for coordination with the plurality of other consumer devices 2780a-n and brand portals 2730a-n, and management of conversations with brands over time. Ecosystem 2700 by virtue of its being an electronic "ecosystem" comprising a distributed network environment and all computing devices within the distributed network allows for a single account to be maintained for use with the platform 100, all conversations with brand portals 2730a-n, and even conversations with other consumers through their other consumer devices 2780a-n. Separate accounts would not be required for each brand 2730a-n, and data for a given account would be accessible (subject to permissions) by all computing nodes (e.g., other consumer devices 2780a-n and/or brand portals 2730a-n) of the distributed, edge computing network.

The plurality of other consumer devices 2780a-n of this embodiment each have the same characteristics of first consumer device 2700, but are owned and/or operated by other consumers. In other words, each other consumer device 2780a-n may be any type of computing device, but is assumed in this example to be mobile phone operating adaptive ecosystem application 2800 capable of all of the functions described above for first consumer device 2710.

Brand portals 2730a-n provide access to a variety of brand resources for each brand such as websites for the brand 2740a-n, retail locations of the brand 2750a-n, and contact centers for the brand 2760a-n. In this embodiment, brand resources 2740a-n, 2750a-n, 2760a-n are accessed through brand portals 2730a-n, but in other embodiments brand resources 2740a-n, 2750a-n, 2760a-n, may be configured to communicate directly with adaptive cloud conversation platform 100 and other computing devices comprising adaptive cloud conversation platform 2700 (e.g., consumer device 2710, other consumer devices 2780a-n, IoT devices 2770a-n. Brand resources 2740a-n, 2750a-n, 2760a-n shown here are exemplary and not intended to be limiting.

Figure 28:
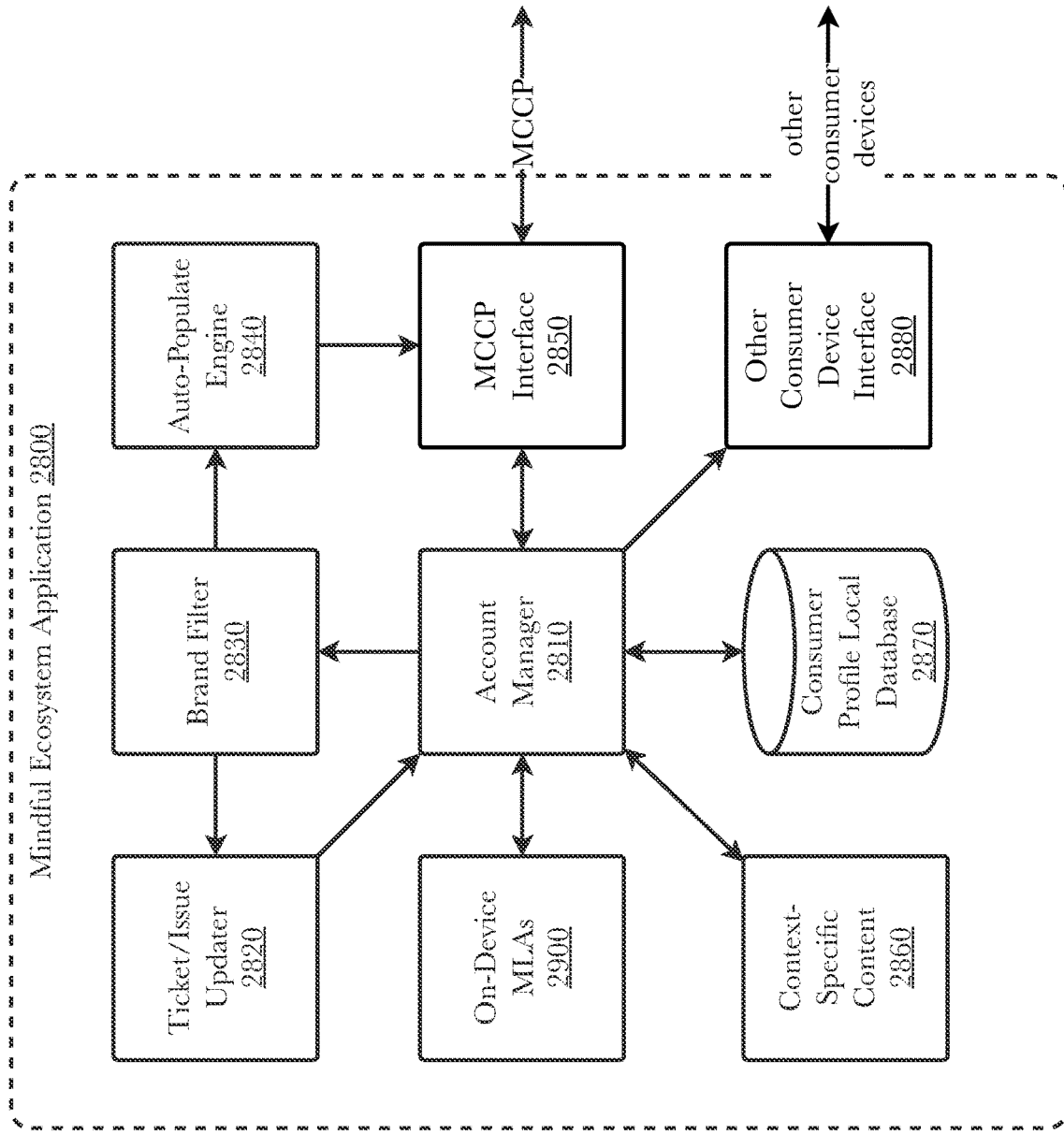
FIG. 28 is a block diagram illustrating an exemplary system architecture for an adaptive ecosystem application aspect of an adaptive cloud conversation platform.

FIG. 28 is a block diagram illustrating an exemplary system architecture for an adaptive ecosystem application aspect of an adaptive cloud conversation platform 100. This exemplary architecture is representative of a multitude of applications compatible with platform 100, each application having a different subject matter or purpose. For example, compatible applications in the application ecosystem may include concierge and/or personal helper applications, shopping applications, health & fitness applications, medical help application, real estate applications, brand-specific applications, and the like. As an example of usage, a concierge application installed on consumer device 2710 may monitor the device's Internet usage via its browser, recognize that the user is searching for travel destinations, and coordinate with platform 100 to recommend conversations with certain brands based on the consumer's profile and the search history that triggered the coordination with platform 100. As another example of usage, a medical monitoring application operating on consumer device 2710 may track user's heart rate or blood pressure via a wirelessly-connected, wearable fitness monitor, may detect an anomaly suggesting a possible medical problem, and may coordinate with platform 100 to have the user's doctor call the user on his or her consumer device 2710 (a type of callback implementation coordinated by platform 100).

Adaptive ecosystem application 2800 operates on one or more computing devices separate from adaptive cloud conversation platform 2800 such as consumer device 2710 and other consumer devices 2780a-n. Adaptive ecosystem application 2800 may reside in memory or may be installed in firmware. Adaptive ecosystem application 2800 communicates with platform 100 to provide additional functionality to consumer and, depending on configuration, to cause consumer devices 2710, 2780a-n to act as edge computing devices for ecosystem 2700, expanding the capabilities of platform 100. Accordingly, each instance of adaptive ecosystem application 2800 installed on a computing device (e.g., consumer device 2710, 2780a-n, etc.) can be logically perceived as an extension of platform 100 into an ecosystem 2700 of devices, applications, brands, and the platform. In some embodiments, the entire functionality of adaptive cloud computing platform 100 can be distributed among these devices on a peer-to-peer basis such that a separate computing device or server for adaptive cloud computing platform 100 is not required.

In this embodiment, adaptive ecosystem application 2800 comprises an account manager 2810, a ticket/issue updater 2820, a brand filter 2830, an auto-populate engine 2840, an adaptive cloud conversation platform interface 2850, subject-matter-specific content and/or programming 2860, a consumer profile local database 2870, an other consumer device interface 2880, and one or more on-device machine learning algorithms (MLAs) 2900.

Account manager 2810 is responsible for managing on-device aspects of a consumer account associated with a consumer profile on platform 100, for coordinating operation of various components of adaptive ecosystem application 2800, and for integrating on-device data and operations with adaptive cloud conversation platform 100 through an adaptive cloud conversation platform (ACCP) interface 2850. While account manager is capable of handling multiple accounts, and advantage of certain configurations is use of a single account for access to resources 2740a-n, 2750a-n, 2760a-n of multiple brands and communication with multiple other consumer devices 2780a-n. This embodiment assumes use of a single account for each consumer.

Incoming data from platform 100 is received by account manager 2810 via ACCP interface 2850. Account manager 2810 passes the incoming data through brand filter 2830 to identify a brand or brands with which the data is associated 2830. This filtering may be done in a variety of ways, depending on the structure of the data packets in the data stream. Examples of such filtering include use of a brand identifier (number, name, etc.) and/or identification of a product or service in the data by comparison to known products and services of certain brands. Use of brand filter 2830 allows a single account to interact with multiple brands even where the incoming data does not explicitly contain brand identifying information.

After filtering, the incoming data is processed by a ticket/issue updater 2820 which updates on-device information according to new or updated information contained in the incoming data. Processing of data for ticket/issue updating may be done in a variety of ways, depending on the structure of the data packets in the data stream. Examples of such processing include use of a customer support ticket identifier (number, name, etc.) and/or association of incoming data with a query made from consumer device 2710 (e.g., via text or email). Ticket/issue updates may be any sort of update to the consumer account in relation to a brand including, but not limited to, updates to the status of a repair or support ticket number, notifications of availability of agents for callbacks, notifications of system outages associated with a brand, offers for purchase of products or services, etc. Ticket/issue updates may be stored in consumer profile local database 2870 which is a local copy of all of, or a portion of, consumer's profile stored in consumer profile database 820 or platform 100. Changes to consumer profile local database 2870 may be synchronized with changes to consumer profile database 820, and vice-versa, either on a real-time basis or on a delayed basis (e.g., if no network connection is available or on a periodic schedule to reduce data usage).

Auto-populate engine 2840 is used to improve consumer satisfaction and ease of interaction with brands 2760a-n by auto-populating (also known as auto-filling) certain information in brand websites 2740a-n and in communications with other brand resources such as retail locations 2750a-n and contact centers 2760a-n. For example, after identification of a brand in a communication by brand filter 2830 and notification to consumer about an offer on a new product by ticket/issue updater 2830, consumer may click on a "buy now" button contained in the offer, causing consumer device 2710 to connect to the brand's website 2740a-n via platform 100. Auto-populate engine 2840 retrieves relevant account information from consumer profile local database 2870, identifies relevant field names in the brand's website 2740a-n, and automatically fills in data in the fields using scripts in the consumer device's 2710 web browser. Non-text variations of this scenario are possible, as well. For example, in a phone call to a brand placed by consumer device 2710, auto-populate engine may be configured to listen for key words in the audio received from the brand (e.g., "account number"), retrieve the relevant information from consumer profile local database, and use a text-to-speech engine to automatically provide the account number to the brand in audio form on the call. This would alleviate the common problem of having to remove one's mobile phone from one's ear to use the screen of the mobile phone to find the account information.

Subject-matter-specific content and/or programming 2860 is the content and/or programming relevant to the specific subject matter of the application. For example, the subject matter of a particular application may be concierge and/or personal helper functionality, shopping functionality, health & fitness functionality, medical help functionality, real estate functionality, brand-specific functionality, and the like. As an example of the subject matter of an application, a concierge application installed on consumer device 2710 may monitor the device's Internet usage via its browser, recognize that the user is searching for travel destinations, and coordinate with platform 100 to recommend conversations with certain brands based on the consumer's profile and the search history that triggered the coordination with platform 100. As an example of the subject matter of an application, a medical monitoring application operating on consumer device 2710 may track user's heart rate or blood pressure via a wirelessly-connected, wearable fitness monitor, may detect an anomaly suggesting a possible medical problem by comparing the heart rate or blood pressure against one or more attributes of the consumer stored in a local database (e.g., attributes indicating the consumer's age and expected heart rate or blood pressure values for the consumer based on age), and may coordinate with platform 100 to have the user's doctor call the user on his or her consumer device 2710 (a type of callback implementation coordinated by platform 100).

Other consumer device interface 2880 provides an interface for sending and receiving communications from other consumer devices 2780a-n associated with the ecosystem. A common communications protocol may be established for establishment of communications with such devices. For example, other consumer devices 2780a-n may be configured to transmit beacons containing certain data packets which, when received by any listening consumer devices 2710, 2780a-n operating application 2800, identify the beacon as having been transmitted by an other consumer devices 2780a-n associated with ecosystem 2700 and allow application 2800 to automatically react to beacon (e.g., notifying consumer of nearby other consumer devices 2780a-n available for interaction). In this embodiment, each consumer device 2710, 2780a-n will have an other consumer device interface 2880, allowing for direct communications and exchange of data between consumer devices 2710, 2780a-n. For example, consumer device 2710 may send out a request via a network connection (local, wide-area, Internet, etc.) for product reviews for a certain product. Other consumer devices 2780a-n may directly send product reviews to consumer device 2710 for the user of consumer device 2710 to make product decisions. Such reviews may, depending on configuration, also be forwarded to platform 100 for storage in a relevant database or for processing through a relevant machine learning algorithm as information about a brand's products and/or services.

On-device machine learning algorithms (MLAs) 2900 perform the same function as their platform-based counterparts. Learning data and decisions from on-device machine learning algorithms (MLAs) 2900 can be incorporated into the training of platform-based MLAs. Further explanation of on-device MLAs is provided below.

Figure 29:
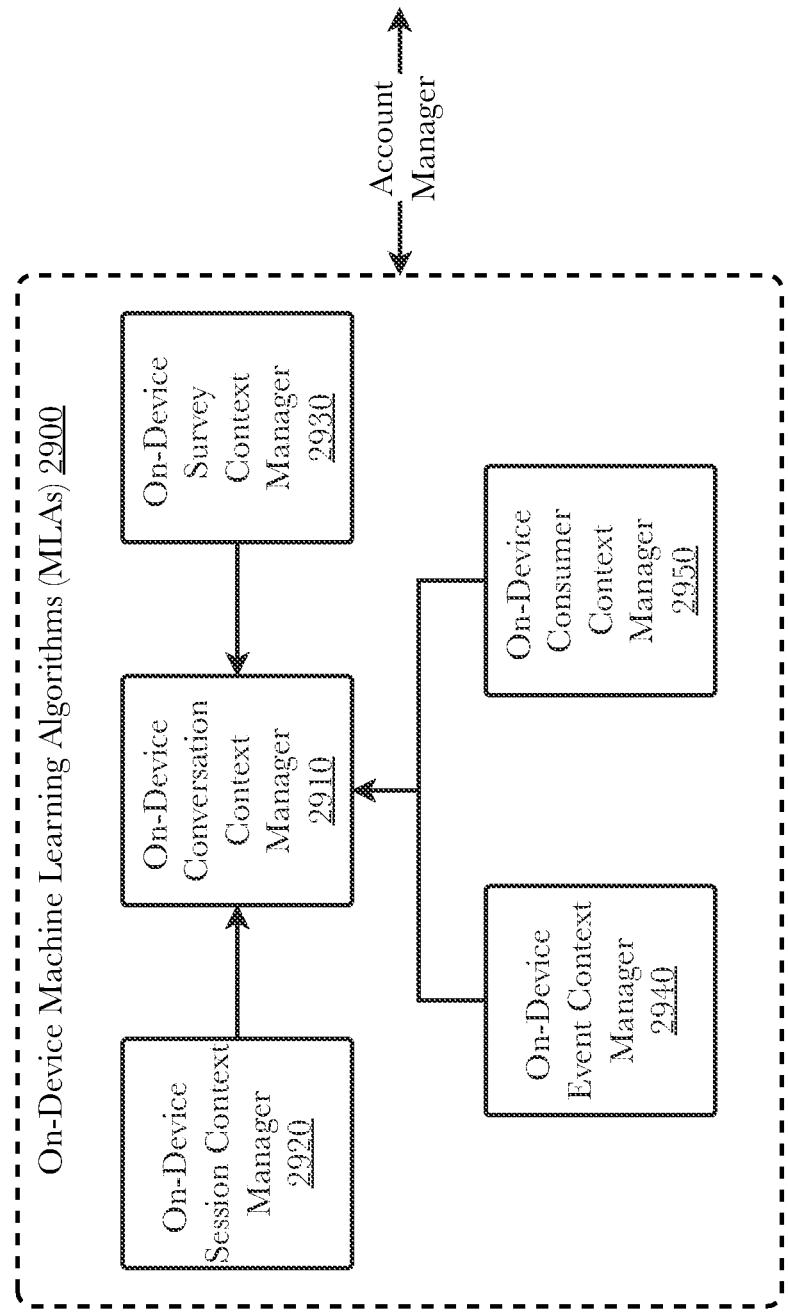
FIG. 29 is a block diagram illustrating an exemplary system architecture for an on-device machine learning algorithm network aspect of an adaptive cloud conversation platform.

FIG. 29 is a block diagram illustrating an exemplary system architecture for an on-device machine learning algorithm network aspect of an adaptive cloud conversation platform. On-device machine learning algorithms (MLAs) 2900 perform the same function as their platform-based counterparts. Learning data and decisions from on-device machine learning algorithms (MLAs) 2900 can be incorporated into the training of platform-based MLAs. While on-device machine learning algorithms will be limited in terms of computing power available on the device, they can be configured to take into account a more limited set of circumstances to improve processing speed. If sufficiently large number of on-board MLAs are used, the total processing power of the on-device MLAs 2900 may exceed that of the platform-based MLAs (see FIGS. 11, 19, 24). In some embodiments, platform-based MLAs may be replaced entirely by parallelized decision-making from a large number of on-device MLAs 2900 (i.e., a peer-to-peer distributed computing network of on-device MLAs).

The on-device MLAs 2900 of this embodiment comprise an on-device conversation context manager 2910, an on-device session context manager 2920, an on-device survey context manager 2930, an on-device event context manager 2940, and an on-device consumer context manager 2950. In this embodiment, on-device versions of callback planner 910, environment context manager 1020, and behavioral pairing AI 2320 are not used as it is assumed that data for those functions will not be transferred to consumer devices 2710, 2780a-n. However, in other embodiments, on-device versions of callback planner 910, environment context manager 1020, and behavioral pairing AI 2320 may be used. Each of the on-device MLAs is trained and operated in a manner corresponding to that previously described for its corresponding platform-based MLA, although the total number of variables used for training and operation of the on-device MLAs may be restricted due to limitations of computing power available in consumer devices 2710, 2870a-n. Thus, on-device conversation context manager 2910 has functionality corresponding to that of conversation context manager 420, on-device session context manager 2920 has functionality corresponding to that of session context manager 520, on-device survey context manager 2930 has functionality corresponding to that of survey context manager 1920, on-device event context manager 2940 has functionality corresponding to that of event context manager 620, and an on-device consumer context manager 2950 has functionality corresponding to that of event consumer manager 620. Training data and operational data from on-device MLAs may be shared with platform-based MLAs (and vice-versa) and/or MLAs on other consumer devices 2780a-n to reduce computing times and/or improve performance of those MLAs.

Figure 30:
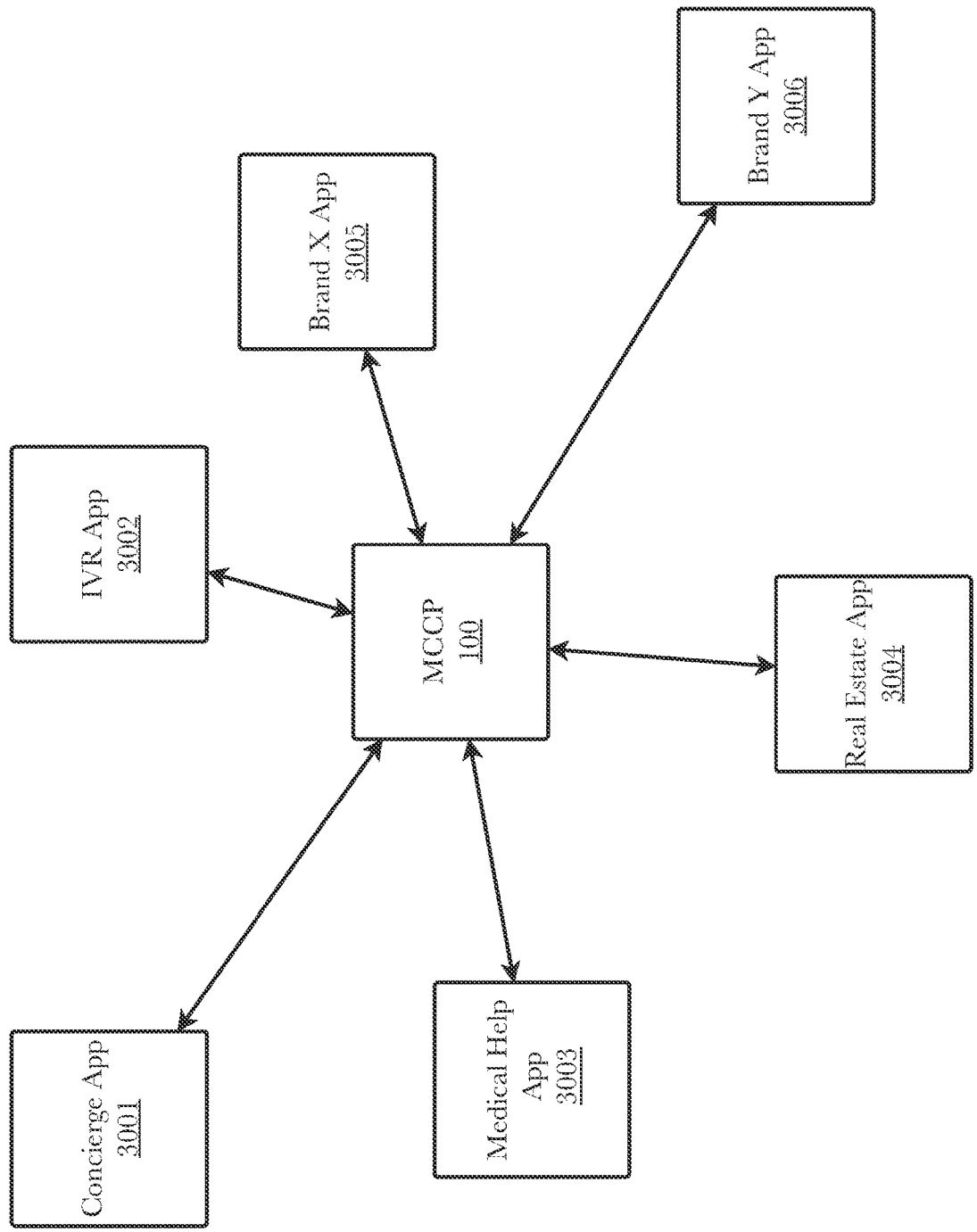
FIG. 30 is a relational diagram showing relationships between exemplary ecosystem applications and the platform.

FIG. 30 is a relational diagram showing relationships between exemplary ecosystem applications and the platform. Subject-matter-specific content and/or programming 2860 is the content and/or programming relevant to the specific subject matter of the application. For example, the subject matter of a particular application may be concierge and/or personal helper functionality, shopping functionality, health & fitness functionality, medical help functionality, real estate functionality, brand-specific functionality, and the like. As an example of the subject matter of an application, a concierge application installed on consumer device 2710 may monitor the device's Internet usage via its browser, recognize that the user is searching for travel destinations, and coordinate with platform 100 to recommend conversations with certain brands based on the consumer's profile and the search history that triggered the coordination with platform 100. As an example of the subject matter of an application, a medical monitoring application operating on consumer device 2710 may track user's heart rate or blood pressure via a wirelessly-connected, wearable fitness monitor, may detect an anomaly suggesting a possible medical problem, and may coordinate with platform 100 to have the user's doctor call the user on his or her consumer device 2710 (a type of callback implementation coordinated by platform 100).

Here, several examples of platform-compatible subject-matter-specific ecosystem applications are shown, including a concierge and/or personal helper application 3001, an interactive voice response (IVR) helper application 3002, a medical help application 3003, real estate application 3004, and two brand-specific applications, one for Brand X 3005 and one for Brand Y 3006. Exemplary functionality of the concierge application 3001 and the medical help application 3003 are described above. The IVR application 3002 may be used to automatically respond to IVR prompts to turn a manual process into an automated one. For example, if the user calls a customer service IVR that prompts "Press 1 to speak with an agent," the IVR application can be programmed to listen for keywords such as "agent," and automatically select the appropriate option via the phone's touch-tone codes. The real estate application 3004 may suggest nearby properties that match the user's criteria while the user is driving, prompting platform 100 to have the appropriate real estate agent call back if the user indicates interest. The Brand X 3005 and Brand Y 3006 applications may be applications for advertising and sales of products from those brands, and interaction with the applications (e.g., a purchase via the application) can trigger conversations between the consumer and brand via the platform 100.

Figure 31:
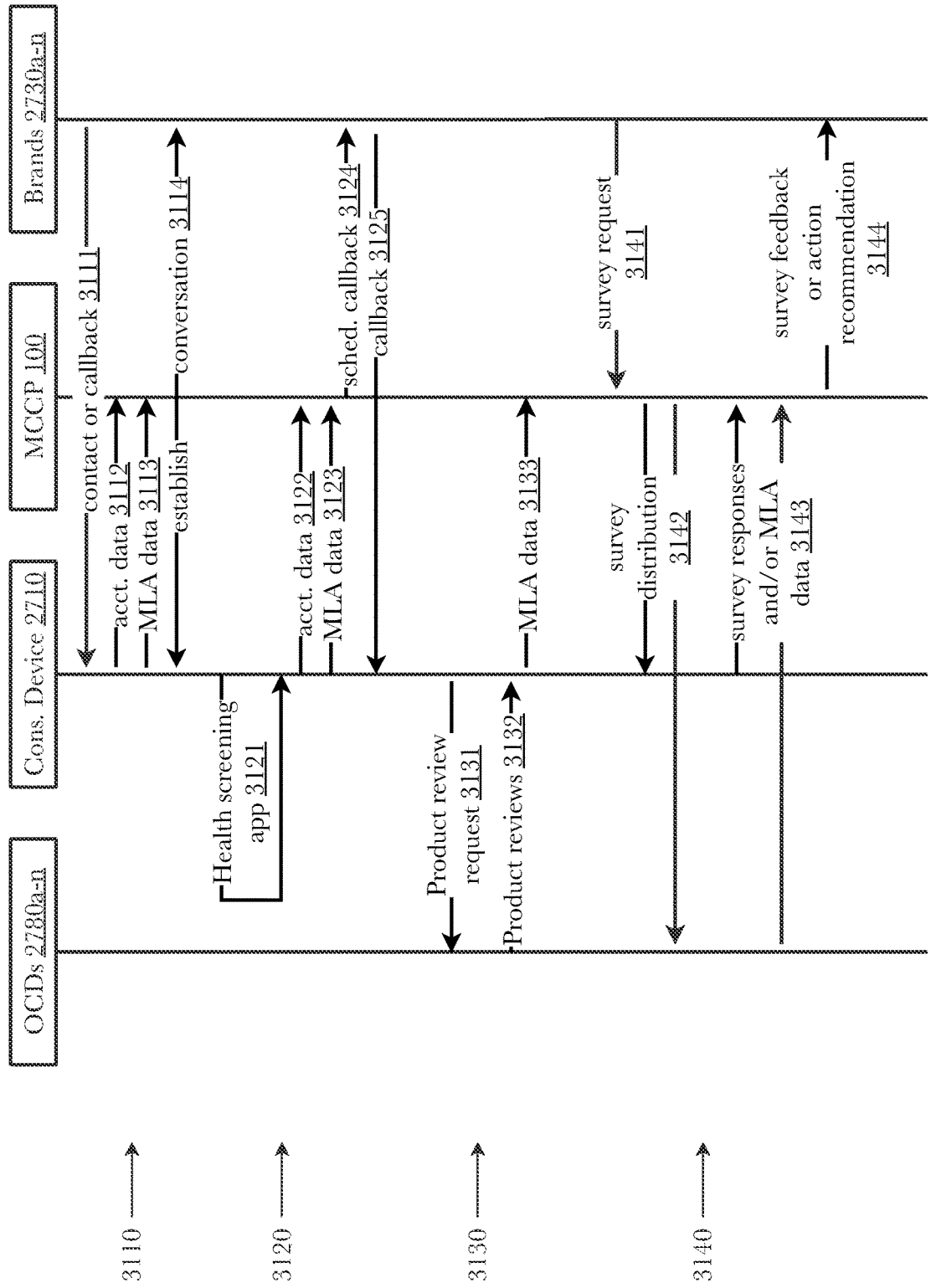
FIG. 31 is a messaging diagram illustrating exemplary processes that may occur in an adaptive cloud conversation ecosystem.

FIG. 31 is a messaging diagram illustrating exemplary processes that may occur in an adaptive cloud conversation ecosystem. In a first exemplary process 3110, contact may be initiated by a brand from a brand portal 2731a-n to a consumer device 2710. Using account manager 2810, consumer device 2710 retrieves account data from consumer profile local database 2870 relevant to the initiated contact, runs MLAs 2920-2950 related to the information in the contact 3111 initiated by brand, and sends account data 3112 and any relevant MLA data 3113 to adaptive cloud conversation platform 100 for establishment of an appropriate conversation 3114 between brand 2731a-n and consumer device 2710.

In a second exemplary process 3120, a health screening application 3121 identifies that the user may have a medical issue that needs attention (for example, by tracking the user's heart rate or blood pressure via a wirelessly-connected, wearable fitness monitor). Using account manager 2810, consumer device 2710 retrieves account data 3122 from consumer profile local database 2870 relevant to the medical issue, runs MLAs 2920-2950 related to the medical issue to confirm that the issue needs a callback from the user's doctor, and sends account data 3122 and any relevant MLA data 3123 to adaptive cloud conversation platform 100. Platform 100 schedules a callback 3124 from the user's doctor based on the outputs of the platform-based MLAs (e.g., callback planner 911). The user's doctor 3125 initiates callback at the time and using the channel set forth in the scheduled callback.

In a third exemplary process 3130, consumer device 2710 requests product reviews of a certain product 3131. The post is distributed directly to other consumer devices 2780a-n using adaptive ecosystem application 2800 operating on consumer devices 2710, 2780a-n. Other consumer devices 2780a-n provide product reviews 3132 to consumer device 2710, which assists the user of consumer device 2710 to make a decision regarding the certain product. The reviews received by consumer device 2710 may be processed through relevant on-device MLAs for the purpose of scheduling conversations with brands, and the outputs of the on-device MLAs 3133 may be passed to platform 100 for incorporation into platform-based MLA analyses.

In a fourth exemplary process 3140, a brand 2731a-n requests a survey 3141 from consumer devices 2710, 2780a-n related to a product or service provided by brand 2731a-n. The survey request 3141 is received by platform 100, which distributes 3142 an appropriate survey to consumer devices 2710, 2780a-n as determined by survey manager 1900. Users of consumer devices 2710, 2780a-n provide survey responses 3143, each of which may be processed through relevant on-device MLAs for the purpose of scheduling and/or initiating conversations with brands, and the survey responses and outputs of the on-device MLAs may be passed 3143 to platform 100 for incorporation into platform-based MLA analyses. The survey results and outputs of platform-based MLAs are passed to the requesting brand 2731*a-n* as survey feedback and/or action recommendations 3144.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit ("ASIC"), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 32:
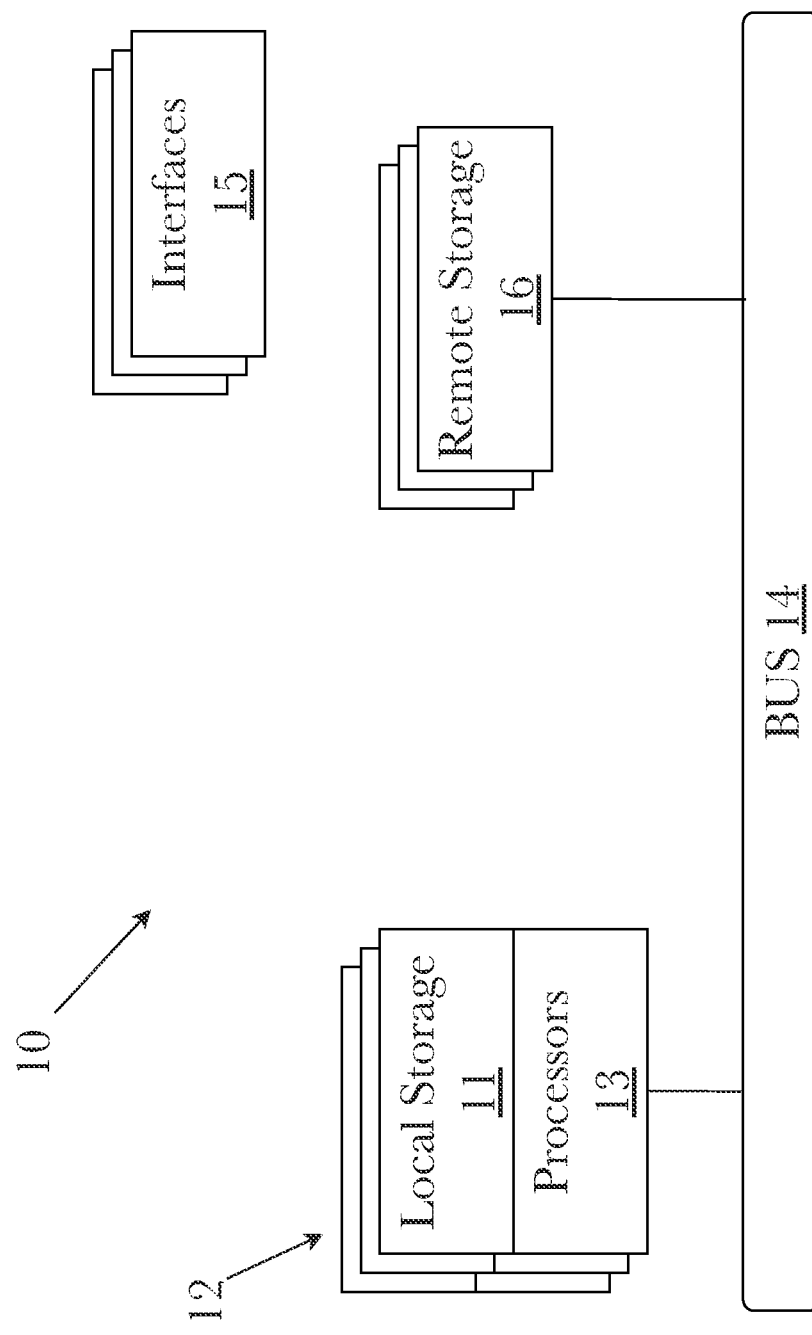
FIG. 32 is a block diagram illustrating an exemplary hardware architecture of a computing device.

Referring now to FIG. 32, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/N hardware interfaces) and, in some instances, volatile and/or non-volatile memory (e.g., RAM).

Although the system shown in FIG. 32 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 33:
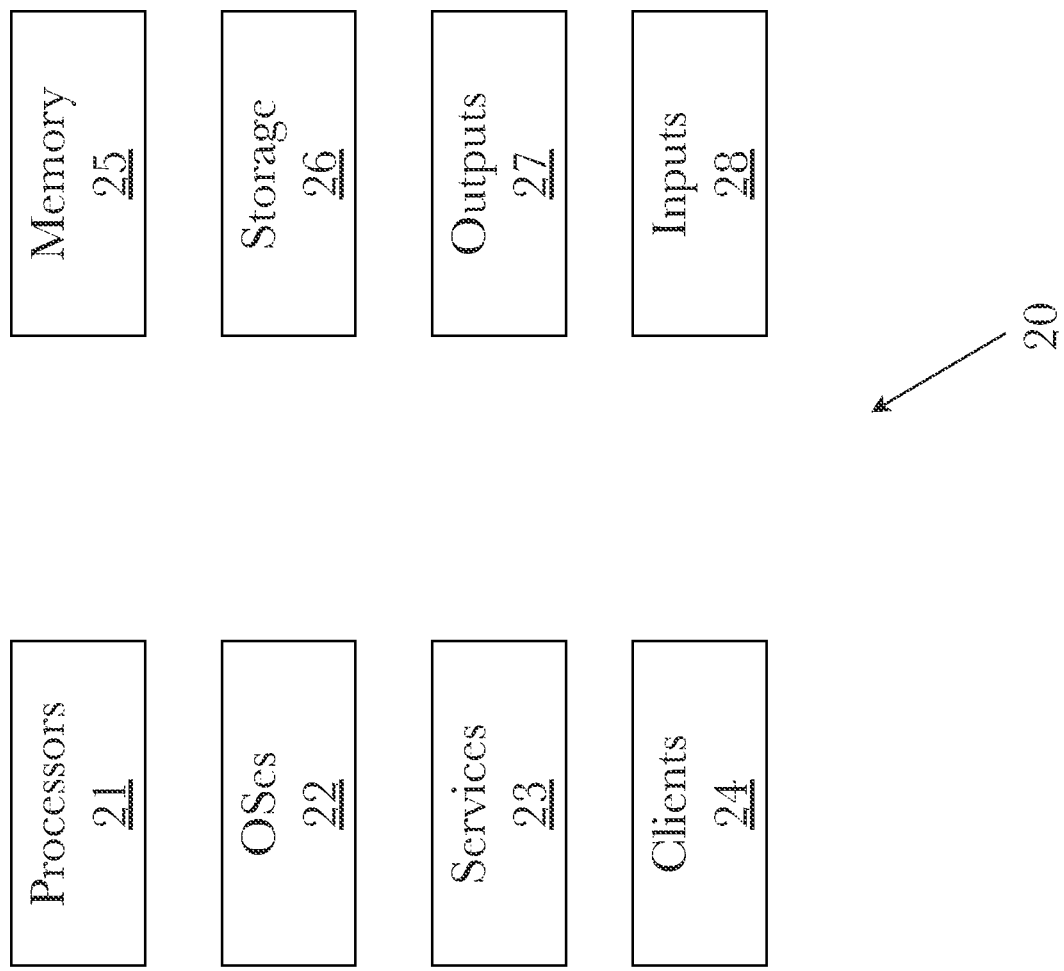
FIG. 33 is a block diagram illustrating an exemplary logical architecture for a client device.

In some embodiments, systems according to the present invention may be implemented on a standalone computing system. Referring now to FIG. 33, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 32). Examples of storage devices 26 include flash memory, magnetic hard drive, CD-ROM, and/or the like.

Figure 34:
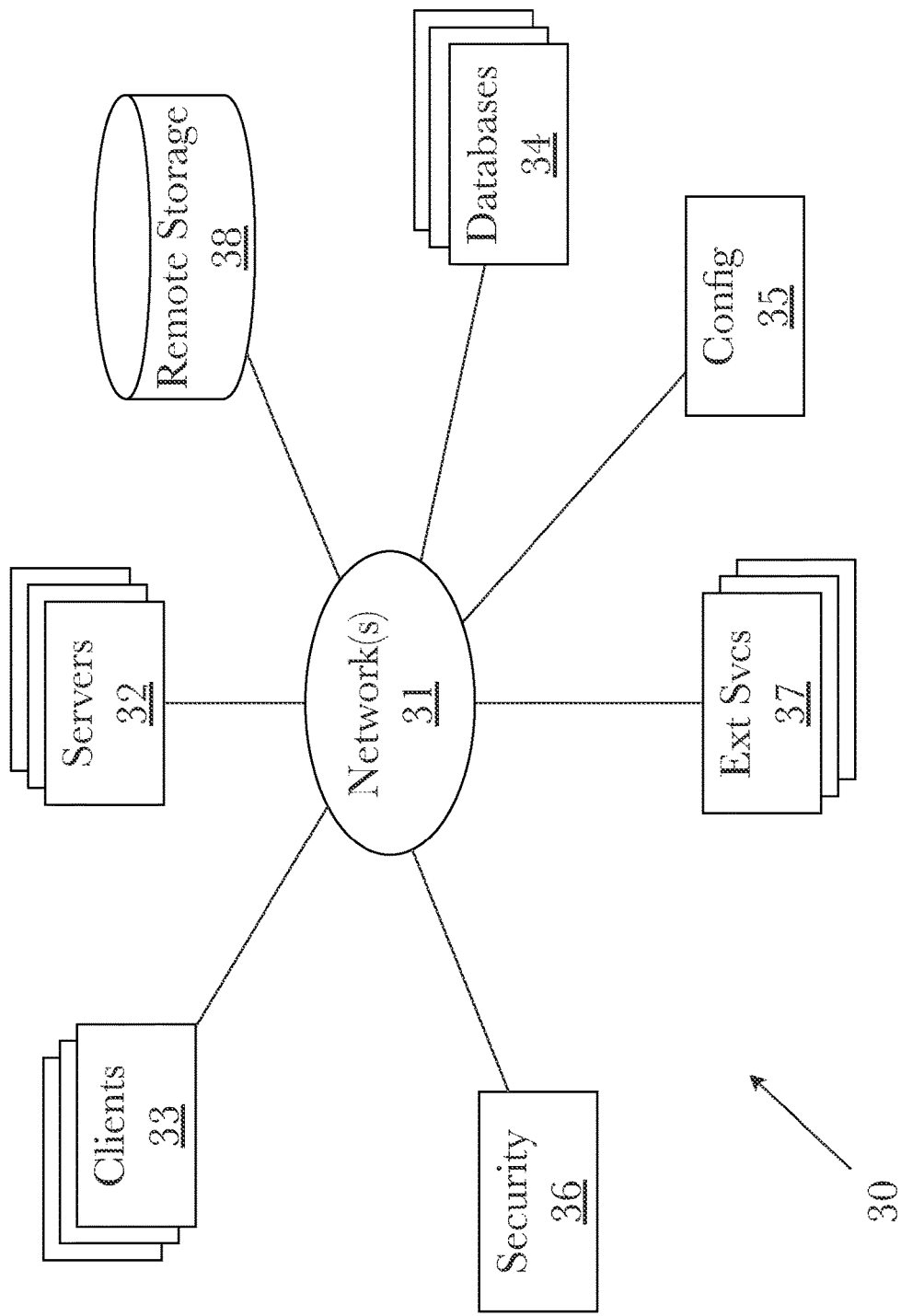
FIG. 34 is a block diagram showing an exemplary architectural arrangement of clients, servers, and external services.

In some embodiments, systems of the present invention may be implemented on a distributed computing network, such as one having any number of clients and/or servers. Referring now to FIG. 34, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 33. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 35:
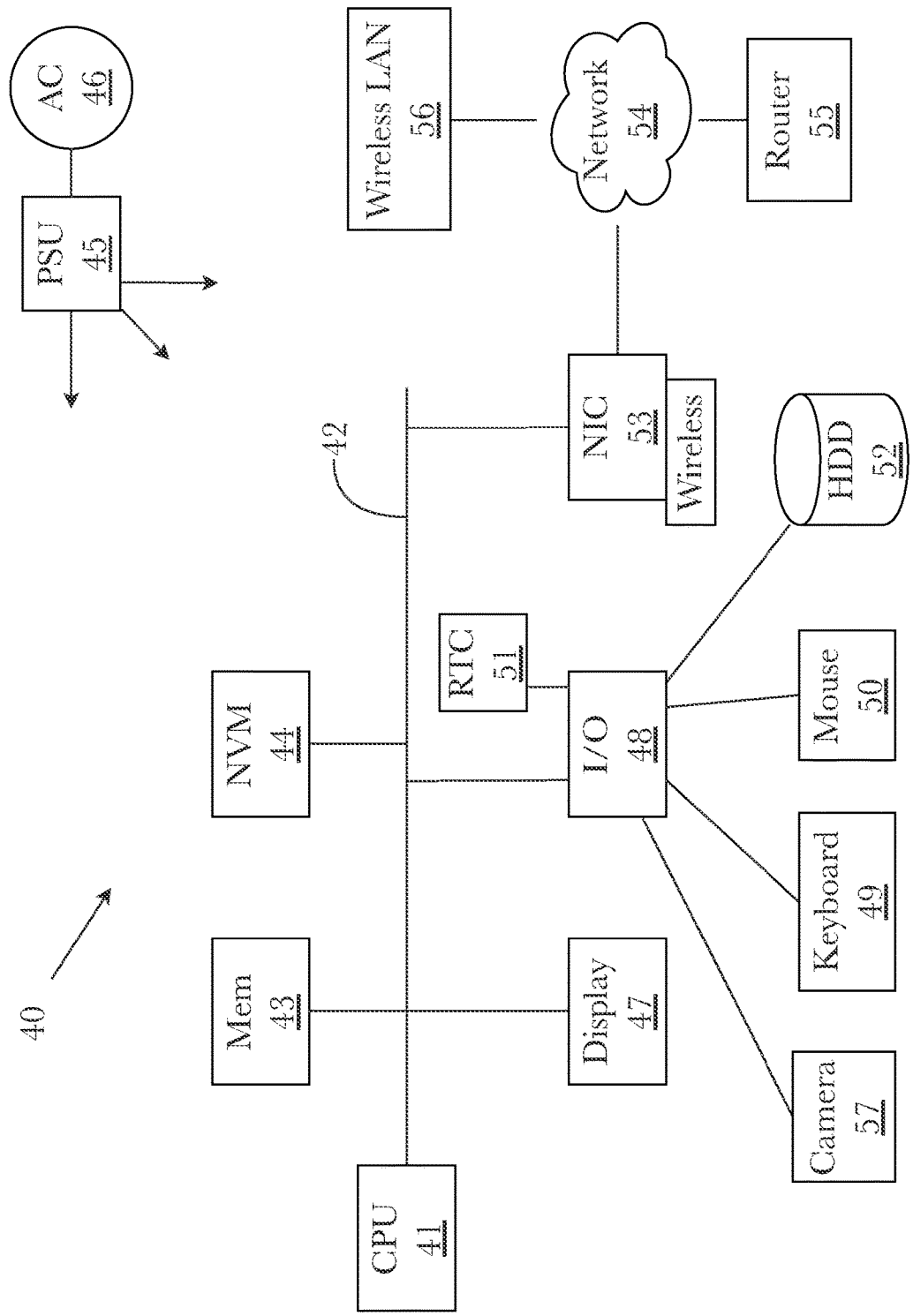
FIG. 35 is another block diagram illustrating an exemplary hardware architecture of a computing device.

FIG. 35 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. An adaptive cloud conversation platform, comprising:
an adaptive platform client application operating on a first computing device comprising a first memory and a first processor, the adaptive platform client application configured to cause the first computing device to:
receive input regarding a subject matter;
retrieve a first consumer profile for a consumer operating the first computing device from a local consumer profile database stored on the first computing device, the first consumer profile comprising a consumer identifier and one or more attributes of the consumer;
compare the input to the one or more attributes to determine whether a conversation should be initiated with a brand; and
where the determination is that a conversation should be initiated, send a request for initiation of a conversation to the conversation manager, the request comprising the consumer identifier and the subject matter;
a second computing device comprising a second memory, a second processor, and a non-volatile data storage device;
a cloud consumer profile database stored on the non-volatile data storage device, the cloud consumer profile database comprising a plurality of consumer profiles, each comprising a plurality of consumer data and a plurality of consumer contact preferences pertaining to a specific consumer;
a brand database stored on the non-volatile data storage device, the brand database comprising brand information comprising product information, service information, or both, for a plurality of brands and one or more contact channels for each brand;
the conversation manager comprising a first plurality of programming instructions stored in the second memory which, when operating on the second processor, causes the second computing device to:
receive the request for initiation of the conversation from the adaptive ecosystem application;

using the consumer identifier, retrieve a second consumer profile for the consumer from the cloud consumer profile database, the second consumer profile comprising a plurality of consumer data about the consumer and a plurality of consumer contact preferences for the consumer;

retrieve brand information for a plurality of brands from the brand database;

process the consumer data of the second consumer profile, the subject matter, and the brand information through a first machine learning algorithm to obtain a brand recommendation for initiating a conversation with the consumer;

process the consumer contact preferences of the consumer profile and the contact channels of the brand information through a second machine learning algorithm to obtain a recommended callback time and a recommended callback channel for a callback from the brand to the consumer about the subject matter;

schedule the callback from the brand to the consumer about the subject matter at the callback time through the callback channel; and send the scheduled callback to a callback manager for implementation;

the callback manager comprising a second plurality of programming instructions stored in the first memory which, when operating on the first processor, causes the first computing device to:

receive the callback schedule; and execute the callback schedule by establishing communications between the brand and the consumer at the selected time through the selected channel as indicated in the callback schedule.

2. The method of claim 1, wherein the adaptive platform application is downloaded to the first computing device from a set of applications stored in and compatible with the platform, each application of the set of applications having a different subject matter.

3. The method of claim 2, wherein the adaptive platform application comprises concierge functionality configured to:
monitor the consumer's usage of other applications on the first computing device;
identify a common theme of the consumer's usage; and
include the common theme in the subject matter of the request.

4. The method of claim 2, wherein the adaptive platform application comprises health functionality configured to:
receive biometric data for the consumer;
detect an anomaly suggesting a possible health problem by comparing the biometric data to the one or more attributes in the first consumer profile; and
include the anomaly in the subject matter of the request.

5. The method of claim 2, wherein the adaptive platform application comprises real estate functionality configured to:
determine a location of the first consumer device;
suggest real estate properties nearby the location that match the one or more attributes in the first consumer profile; and
include the suggested nearby real estate properties in the subject matter of the request.

6. The method of claim 2, wherein the adaptive platform application comprises brand-specific functionality configured to:
provide information about a brand-specific product or service;
receive an interaction from the consumer indicating interest in the brand-specific product or service; and include the brand-specific product or service and the consumer's interest in the subject matter of the request.

7. A method for operating an adaptive cloud conversation platform, comprising the steps of:

using an adaptive platform client application operating on a first computing device to:
receive input regarding a subject matter;
retrieve a first consumer profile for a consumer operating the first computing device from a local consumer profile database stored on the first computing device, the first consumer profile comprising a consumer identifier and one or more attributes of the consumer;
compare the input to the one or more attributes to determine whether a conversation should be initiated with a brand; and
where the determination is that a conversation should be initiated, send a request for initiation of a conversation to a conversation manager operating on a second computing device, the request comprising the consumer identifier and the subject matter;

using the conversation manager to:
receive the request for initiation of the conversation from the adaptive ecosystem application;
using the consumer identifier, retrieve a second consumer profile for the consumer from a cloud consumer profile database stored on the second computing device, the cloud consumer profile database comprising a plurality of consumer profiles, each comprising a plurality of consumer data and a plurality of consumer contact preferences pertaining to a specific consumer, and the second consumer profile comprising a plurality of consumer data about the consumer and a plurality of consumer contact preferences for the consumer;
retrieve brand information for a plurality of brands from a brand database stored on the second computing device, the brand database comprising brand information comprising product information, service information, or both, for a plurality of brands and one or more contact channels for each brand;
process the consumer data of the second consumer profile, the subject matter, and the brand information through a first machine learning algorithm to obtain a brand recommendation for initiating a conversation with the consumer;
process the consumer contact preferences of the consumer profile and the contact channels of the brand information through a second machine learning algorithm to obtain a recommended callback time and a recommended callback channel for a callback from the brand to the consumer about the subject matter;
schedule the callback from the brand to the consumer about the subject matter at the callback time through the callback channel; and
send the scheduled callback to a callback manager operating on the second computing device for implementation;

using the callback manager to:
receive the callback schedule; and
execute the callback schedule by establishing communications between the brand and the consumer at the selected time through the selected channel as indicated in the callback schedule.

8. The method of claim 7, further comprising the step of downloading the adaptive platform application to the first computing device from a set of applications stored in and compatible with the platform, each application of the set of applications having a different subject matter.

9. The method of claim 8, wherein the adaptive platform application comprises concierge functionality configured to:
monitor the consumer's usage of other applications on the first computing device;
identify a common theme of the consumer's usage; and
include the common theme in the subject matter of the request.

10. The method of claim 8, wherein the adaptive platform application comprises health functionality configured to:
receive biometric data for the consumer;
detect an anomaly suggesting a possible health problem by comparing the biometric data to the one or more attributes in the first consumer profile; and
include the anomaly in the subject matter of the request.

11. The method of claim 8, wherein the adaptive platform application comprises real estate functionality configured to:
determine a location of the first consumer device;
suggest real estate properties nearby the location that match the one or more attributes in the first consumer profile; and
include the suggested nearby real estate properties in the subject matter of the request.

12. The method of claim 8, wherein the adaptive platform application comprises brand-specific functionality configured to:
provide information about a brand-specific product or service;
receive an interaction from the consumer indicating interest in the brand-specific product or service; and
include the brand-specific product or service and the consumer's interest in the subject matter of the request.

* * * * *